(12) United States Patent
Friedman et al.

(10) Patent No.: US 12,041,540 B2
(45) Date of Patent: *Jul. 16, 2024

(54) DISTRIBUTED RADIOHEAD SYSTEM

(71) Applicant: Intel Corporation, Santa Clara, CA (US)

(72) Inventors: Avishay Friedman, Petach Tikva (IL); Hagay Barel, Kiriat Bialik (IL); Ehud Reshef, Qiryat Tivon (IL); Eytan Mann, Modiin (IL); Ofir Klein, Petach Tikwa (IL)

(73) Assignee: INTEL CORPORATION, Santa Clara, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 17/469,955

(22) Filed: Sep. 9, 2021

(65) Prior Publication Data
US 2022/0210731 A1     Jun. 30, 2022

(30) Foreign Application Priority Data
Dec. 24, 2020  (EP) ................................. 20217199

(51) Int. Cl.
*H04W 52/02* (2009.01)
*H04B 17/318* (2015.01)
*H04L 27/00* (2006.01)

(52) U.S. Cl.
CPC ...... *H04W 52/0203* (2013.01); *H04B 17/318* (2015.01); *H04L 27/0002* (2013.01)

(58) Field of Classification Search
CPC .. Y02D 30/70; H04W 48/16; H04W 52/0216; H04W 52/0229; H04W 74/0808;
(Continued)

(56) References Cited

U.S. PATENT DOCUMENTS 6,192,238 B1 *  2/2001  Piirainen ............... H04L 1/06
                                                                  455/422.1
6,873,644 B1 *  3/2005  Barrett ................... H04B 1/69
                                                                  375/138
(Continued)

FOREIGN PATENT DOCUMENTS

EP    2838294 A1    2/2015
EP    3264674 A1    1/2018

OTHER PUBLICATIONS

European Search Report issued for the corresponding european application No. EP 20 21 7199.7, dated Jun. 14, 2021, 8 pages (for informational purposes only).

*Primary Examiner* — Dung B Huynh
(74) *Attorney, Agent, or Firm* — VIERING, JENTSCHURA & PARTNER mbB

(57) ABSTRACT

Various aspects provide a radiohead circuit and a communication device including the radiohead circuit. In an example, the radiohead circuit includes an antenna interface, a radio frequency front end configured to receive a wireless communication signal via the antenna interface, and a processor configured to perform an initial signal detection to detect if a wireless communication signal has been received based on whether a signal the processor received from the radio frequency front end fulfill a predefined radiohead circuit detection criterion, generate an initial signal detection information comprising an information as to whether the wireless communication signal has been received based on the initial signal detection; and provide the initial signal detection information to a communication interface for a final signal detection; the communication interface configured to couple the processor to a radiohead circuit-external processor external to the radiohead circuit.

11 Claims, 32 Drawing Sheets

(58) Field of Classification Search
CPC ........... H04W 74/0816; H04W 88/085; H04W 24/10; H04W 24/02; H04W 24/08; H04L 27/0002; H04B 1/18; H04B 17/327; H04B 7/024
See application file for complete search history.

(56) References Cited

U.S. PATENT DOCUMENTS

| | | | | |
|---|---|---|---|---|
| 7,920,599 | B1* | 4/2011 | Subramanian | H04L 27/2656 370/292 |
| 8,125,988 | B1* | 2/2012 | Sullivan | H04L 69/22 709/219 |
| 8,862,076 | B2* | 10/2014 | Whinnett | H04W 24/10 455/115.2 |
| 8,886,200 | B2* | 11/2014 | Gogic | H04W 36/0085 455/63.2 |
| 9,825,720 | B2* | 11/2017 | Österling | H04B 17/318 |
| 10,085,220 | B1* | 9/2018 | Marupaduga | H04W 36/0069 |
| 10,517,136 | B1* | 12/2019 | Chukka | H04W 76/27 |
| 11,337,100 | B1* | 5/2022 | Korpi | H04L 25/0202 |
| 11,647,407 | B1* | 5/2023 | McKibben | H04W 16/02 370/329 |
| 11,812,317 | B2* | 11/2023 | Raghothaman | H04W 36/06 |
| 11,812,467 | B2* | 11/2023 | Viger | H04W 74/0808 |
| 2002/0036569 | A1* | 3/2002 | Martin | G08B 21/0222 340/572.1 |
| 2007/0072638 | A1* | 3/2007 | Yang | H04W 52/50 455/522 |
| 2007/0225013 | A1* | 9/2007 | Pflum | H04W 36/18 455/452.2 |
| 2007/0291632 | A1* | 12/2007 | Li | H04L 27/2665 370/203 |
| 2008/0031197 | A1* | 2/2008 | Wang | H04W 72/54 370/329 |
| 2008/0075149 | A1* | 3/2008 | Botha | H04B 1/70735 375/148 |
| 2008/0080466 | A1* | 4/2008 | Kang | H04B 7/2628 370/342 |
| 2010/0013551 | A1* | 1/2010 | Reams | H04N 21/42204 327/544 |
| 2010/0067422 | A1* | 3/2010 | Kadous | H04W 52/0229 455/574 |
| 2010/0069072 | A1* | 3/2010 | Gogic | H04W 36/08 455/436 |
| 2010/0130210 | A1* | 5/2010 | Tokgoz | H04W 36/04 455/437 |
| 2011/0111714 | A1* | 5/2011 | Balakrishnan | H04B 17/318 455/161.3 |
| 2011/0115680 | A1* | 5/2011 | Phan Huy | H04L 1/0026 343/703 |
| 2011/0150149 | A1* | 6/2011 | Lee | H04L 27/2656 375/343 |
| 2011/0237243 | A1* | 9/2011 | Guvenc | H04W 72/542 455/423 |
| 2011/0242999 | A1* | 10/2011 | Palanki | H04W 24/08 370/252 |
| 2011/0274021 | A1* | 11/2011 | He | H04W 52/0238 370/311 |
| 2012/0099451 | A1* | 4/2012 | Su | H04L 27/26035 370/252 |
| 2012/0202552 | A1* | 8/2012 | Minemura | H04W 52/0229 455/522 |
| 2012/0275363 | A1* | 11/2012 | Hu | H04W 52/0206 370/311 |
| 2012/0281554 | A1* | 11/2012 | Gao | H04L 5/0053 370/252 |
| 2012/0281565 | A1* | 11/2012 | Sauer | H04B 7/0413 370/252 |
| 2012/0287914 | A1* | 11/2012 | Smith | H04W 4/06 370/338 |
| 2012/0294162 | A1* | 11/2012 | Pajukoski | H04B 7/0874 370/312 |
| 2013/0040676 | A1* | 2/2013 | Kang | H04B 7/0495 455/562.1 |
| 2013/0070635 | A1* | 3/2013 | Suo | H04W 52/0206 370/252 |
| 2013/0142054 | A1* | 6/2013 | Ahmadi | H04W 60/00 370/252 |
| 2013/0295980 | A1* | 11/2013 | Reuven | H04B 17/345 455/226.3 |
| 2014/0105056 | A1* | 4/2014 | Li | H04W 52/0203 370/252 |
| 2014/0120947 | A1* | 5/2014 | Siomina | G01S 5/02213 455/456.1 |
| 2014/0126438 | A1* | 5/2014 | Zhu | H04J 11/0093 370/328 |
| 2014/0171073 | A1* | 6/2014 | Kim | H04W 24/10 455/434 |
| 2014/0269322 | A1* | 9/2014 | Li | G06F 9/505 370/236 |
| 2014/0364128 | A1* | 12/2014 | Lee | H04W 36/18 455/442 |
| 2015/0003348 | A1* | 1/2015 | Ishii | H04L 5/0048 370/329 |
| 2015/0087324 | A1* | 3/2015 | Ishida | H04W 16/08 455/452.2 |
| 2015/0131606 | A1* | 5/2015 | Kobayashi | H04W 72/542 370/330 |
| 2015/0215903 | A1* | 7/2015 | Zhao | H04W 72/02 370/329 |
| 2015/0244430 | A1* | 8/2015 | Shattil | H04L 41/0816 370/254 |
| 2016/0036403 | A1* | 2/2016 | Ashworth | H03F 3/68 330/284 |
| 2016/0192181 | A1* | 6/2016 | Choi | H04W 8/245 455/422.1 |
| 2016/0197745 | A1* | 7/2016 | Yi | H04L 25/03343 370/329 |
| 2016/0227396 | A1* | 8/2016 | Lee | H04W 8/18 |
| 2016/0234773 | A1* | 8/2016 | Choi | H04W 52/0206 |
| 2016/0242147 | A1* | 8/2016 | Tarlazzi | H04W 88/085 |
| 2016/0249268 | A1* | 8/2016 | Usui | H04W 16/32 |
| 2016/0337057 | A1* | 11/2016 | Österling | H04B 1/109 |
| 2016/0338075 | A1* | 11/2016 | Mckibben | H04W 16/02 |
| 2017/0048879 | A1* | 2/2017 | Zhang | H04W 76/27 |
| 2017/0055231 | A1* | 2/2017 | Cook | H04W 52/0229 |
| 2017/0063486 | A1* | 3/2017 | Sarashina | H04B 10/27 |
| 2017/0214567 | A1* | 7/2017 | Salkintzis | H04L 43/16 |
| 2017/0223603 | A1* | 8/2017 | Doi | H04W 40/22 |
| 2017/0237477 | A1* | 8/2017 | Fujio | H04B 7/0617 370/329 |
| 2017/0245162 | A1* | 8/2017 | Beck | H04L 43/50 |
| 2017/0251380 | A1* | 8/2017 | Schabel | H04W 16/14 |
| 2017/0265104 | A1* | 9/2017 | Arslan | H04W 28/16 |
| 2017/0272180 | A1* | 9/2017 | Jitsukawa | H04B 7/0617 |
| 2017/0331577 | A1* | 11/2017 | Parkvall | H04W 8/18 |
| 2017/0353975 | A1* | 12/2017 | Khawer | H04W 8/005 |
| 2017/0359108 | A1* | 12/2017 | Abdel Khalek | H04B 7/0456 |
| 2017/0359763 | A1* | 12/2017 | Pan | H04B 7/022 |
| 2017/0373890 | A1* | 12/2017 | Fertonani | H04L 9/40 |
| 2018/0007562 | A1* | 1/2018 | Auer | H04W 16/32 |
| 2018/0084511 | A1* | 3/2018 | Wu | H04W 72/23 |
| 2018/0139655 | A1* | 5/2018 | Hsu | H04W 24/04 |
| 2018/0152966 | A1* | 5/2018 | Goldhamer | H04W 74/002 |
| 2018/0160416 | A1* | 6/2018 | Mitsui | H04W 24/10 |
| 2018/0184454 | A1* | 6/2018 | Viger | H04W 74/0808 |
| 2018/0234886 | A1* | 8/2018 | Bhorkar | H04W 28/18 |
| 2018/0269921 | A1* | 9/2018 | Pawliuk | H04B 1/44 |
| 2018/0332617 | A1* | 11/2018 | Zeng | H04W 72/0453 |
| 2018/0343577 | A1* | 11/2018 | Takiguchi | H04W 72/542 |
| 2019/0053278 | A1* | 2/2019 | Kecicioglu | H04W 74/0808 |
| 2019/0074876 | A1* | 3/2019 | Kakishima | H04B 7/0417 |
| 2019/0089562 | A1* | 3/2019 | Miyamoto | H04L 25/067 |
| 2019/0097689 | A1* | 3/2019 | Noam | H04B 7/0626 |
| 2019/0159066 | A1* | 5/2019 | Zhao | H04W 24/00 |
| 2019/0199559 | A1* | 6/2019 | Wang | H03M 3/45 |
| 2019/0230707 | A1* | 7/2019 | Bergljung | H04L 5/0073 |
| 2019/0254047 | A1* | 8/2019 | Ahmed | H04W 28/0231 |
| 2020/0045635 | A1* | 2/2020 | Lin | H04W 52/0248 |

(56) References Cited

U.S. PATENT DOCUMENTS

| | | | |
|---|---|---|---|
| 2020/0119772 A1* | 4/2020 | Interdonato | H04B 7/0452 |
| 2020/0120458 A1* | 4/2020 | Aldana | H04W 72/23 |
| 2020/0204248 A1* | 6/2020 | Lu | H04B 7/0857 |
| 2020/0229022 A1* | 7/2020 | Vargantwar | H04B 17/318 |
| 2020/0235788 A1* | 7/2020 | Rajagopal | H04B 7/0848 |
| 2020/0245173 A1* | 7/2020 | Kusashima | H04B 17/24 |
| 2020/0245412 A1* | 7/2020 | Kumar | H04B 7/0617 |
| 2020/0252100 A1* | 8/2020 | Jacobs | H04W 8/24 |
| 2020/0329382 A1* | 10/2020 | Sahoo | H04W 16/10 |
| 2020/0374079 A1* | 11/2020 | Chervyakov | H04L 27/2657 |
| 2020/0382169 A1* | 12/2020 | Zhao | H04B 7/024 |
| 2020/0382196 A1* | 12/2020 | Mohandoss | H04B 7/0695 |
| 2020/0389880 A1* | 12/2020 | Lu | H04W 72/541 |
| 2020/0396679 A1* | 12/2020 | Akkarakaran | H04W 72/044 |
| 2021/0045046 A1* | 2/2021 | Mukherjee | H04W 4/029 |
| 2021/0076416 A1* | 3/2021 | Shah | H04W 74/006 |
| 2021/0112536 A1* | 4/2021 | Shah | H04L 5/0048 |
| 2021/0119674 A1* | 4/2021 | Yuan | H04B 7/0456 |
| 2021/0168008 A1* | 6/2021 | Ohashi | H04L 5/0007 |
| 2021/0194736 A1* | 6/2021 | Wesemann | H04B 7/0617 |
| 2021/0195529 A1* | 6/2021 | Yang | H04W 72/0453 |
| 2021/0204318 A1* | 7/2021 | Babaei | H04W 76/19 |
| 2021/0235384 A1* | 7/2021 | Yang | H04W 52/0248 |
| 2021/0243617 A1* | 8/2021 | Cooper | H04W 72/0453 |
| 2021/0274405 A1* | 9/2021 | Raghothaman | H04B 7/022 |
| 2021/0281283 A1* | 9/2021 | Burra | H04B 1/1607 |
| 2021/0314935 A1* | 10/2021 | Luo | H04W 72/51 |
| 2021/0352607 A1* | 11/2021 | Miao | H04W 56/0045 |
| 2021/0360530 A1* | 11/2021 | Shahidi | H04W 76/27 |
| 2021/0360654 A1* | 11/2021 | Akkarakaran | H04W 72/02 |
| 2021/0392634 A1* | 12/2021 | Guo | H04B 7/088 |
| 2022/0038849 A1* | 2/2022 | Speidel | H04W 64/006 |
| 2022/0038902 A1* | 2/2022 | Mueck | G06F 21/57 |
| 2022/0045712 A1* | 2/2022 | Berhane | H04B 1/525 |
| 2022/0086624 A1* | 3/2022 | Cui | H04W 74/0808 |
| 2022/0095234 A1* | 3/2022 | Li | H04W 52/0229 |
| 2022/0124622 A1* | 4/2022 | Islam | H04W 72/542 |
| 2022/0167397 A1* | 5/2022 | Thangarasa | H04W 74/08 |
| 2022/0174739 A1* | 6/2022 | Kwak | H04W 72/0446 |
| 2022/0191956 A1* | 6/2022 | Manthrayil Sachidanandan H04B 5/0062 |
| 2022/0201522 A1* | 6/2022 | Tao | H04W 74/0841 |
| 2022/0201600 A1* | 6/2022 | Reshef | H04W 52/0229 455/522 |
| 2022/0201746 A1* | 6/2022 | Kwak | H04L 1/0013 |
| 2022/0214407 A1* | 7/2022 | Hu | H04B 17/14 |
| 2022/0225195 A1* | 7/2022 | Park | H04W 36/0058 |
| 2022/0225234 A1* | 7/2022 | Tie | H04W 72/0453 |
| 2022/0231763 A1* | 7/2022 | Luo | H04B 10/07955 |
| 2022/0255596 A1* | 8/2022 | Lu | H04B 7/0413 |
| 2022/0264349 A1* | 8/2022 | Liu | H04W 24/10 |
| 2022/0322439 A1* | 10/2022 | Baek | H04W 74/0808 |
| 2022/0329289 A1* | 10/2022 | Huang | H04B 7/0617 |
| 2022/0346004 A1* | 10/2022 | Gong | H04W 52/0206 |
| 2022/0358785 A1* | 11/2022 | Bechadergue | G06V 40/172 |
| 2022/0394526 A1* | 12/2022 | Wang | H04W 72/542 |
| 2022/0408482 A1* | 12/2022 | Liu | H04W 74/0808 |
| 2022/0417923 A1* | 12/2022 | Uchiyama | H04W 4/40 |
| 2023/0079334 A1* | 3/2023 | Chitrakar | H04W 74/0816 370/329 |
| 2023/0199782 A1* | 6/2023 | Takeda | H04W 72/1263 370/329 |
| 2023/0224731 A1* | 7/2023 | Ma | H04W 24/02 370/216 |
| 2023/0224739 A1* | 7/2023 | Deixler | H04W 48/16 370/252 |
| 2023/0353984 A1* | 11/2023 | Iun | H04W 4/021 |

\* cited by examiner

DISTRIBUTED RADIOHEAD SYSTEM

CROSS-REFERENCE TO RELATED APPLICATION

This application claims priority under 35 U.S.C. § 119 to EP Patent Application No. 20217199, filed on Dec. 24, 2020, which is incorporated by reference herein in its entirety.

TECHNICAL FIELD

Various aspects of this disclosure generally relate to compact radiohead circuits and a communication device including at least one compact radiohead circuits.

BACKGROUND

To support increases in wireless data traffic, wireless transceivers need to support wider bandwidths (BW) and higher-order modulations schemes. For example, to increase throughput, wireless transceivers may be configured to implement a Multiple Input Multiple Output (MIMO) scheme, which may require an increased amount of wireless transceivers in the platform. However, the usage of the co-located wireless transceivers may result in cross interference, power consumption limitations, thermal limitations, and other technical problems. Attempts using existing technologies to try to remedy the above problems, such as, by separating the antennas and connecting the antennas to co-located transceivers using coax cable to connect the components results in a substantial increase in costs and degradation in wireless performance. Further the use of coax cables does not easily support many form factors.

Another consideration is that using an increasing number of co-located transceivers is not easily scalable in many cases, and does not allow for modular certification. Many applications or implementations require a complete device or platform certification, e.g., a complete certification from a known bus interface all the way to an antenna connector. However, in increasing the number of transceivers and associated components, the cost per unit of certifying a platform becomes prohibitive.

BRIEF DESCRIPTION OF THE EXEMPLARY DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which:

FIG. 1 exemplarily shows a block diagram of a wireless communication device including a conventional radiohead system;

FIG. 2A exemplarily shows a radiohead circuit in accordance with various aspects of this disclosure;

FIG. 2B shows an exemplary representation of distributed radiohead system;

FIG. 3 exemplarily shows a distributed radio system in accordance with various aspects of this disclosure;

FIG. 4 exemplarily shows a RF front end portion in accordance with various aspects of this disclosure;

FIGS. 5 and 6 exemplarily show a transceiver chain in accordance with various aspects of this disclosure;

FIG. 7 exemplarily shows an antenna structure in accordance with various aspects of this disclosure;

FIG. 8 exemplarily shows a device in accordance with various aspects of this disclosure;

Figure 19:
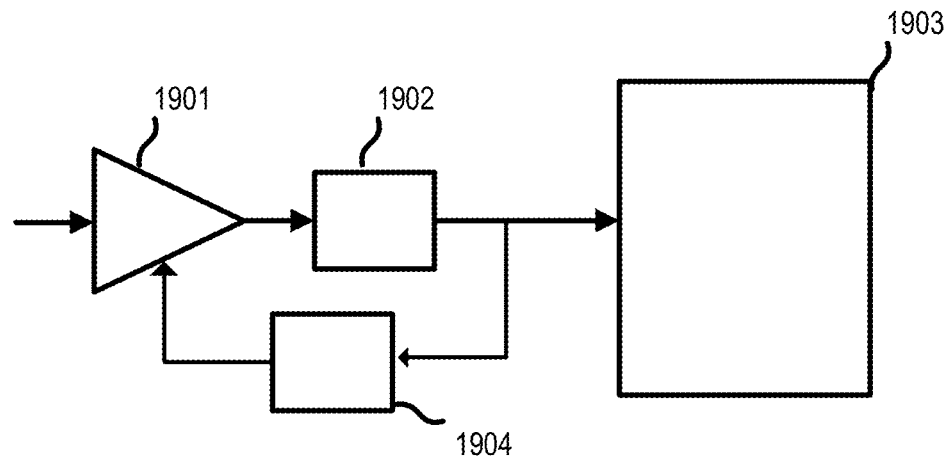
Figure 20A:
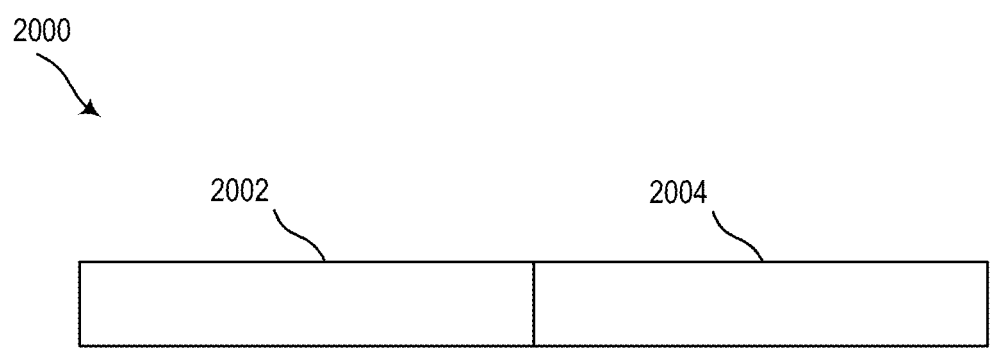
Figure 20B:
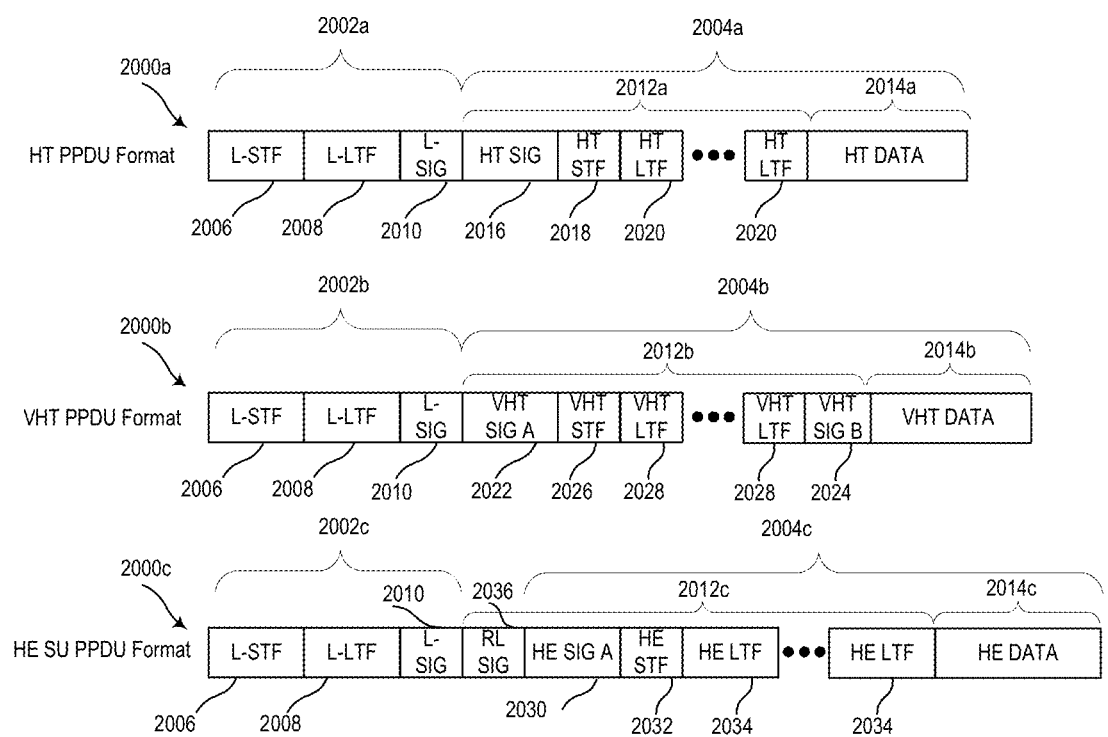
Figure 21:
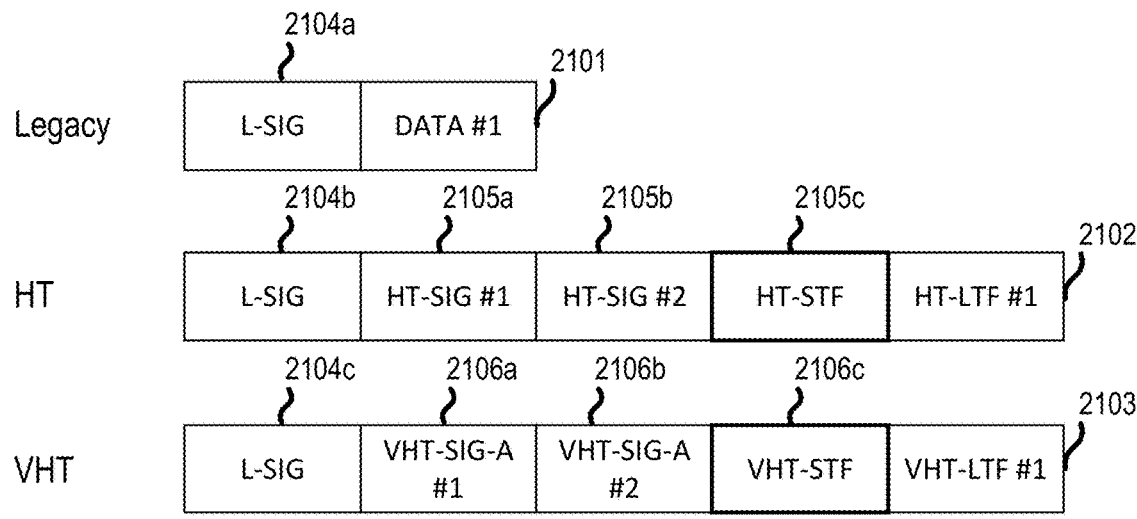
Figures 22A, 22B:
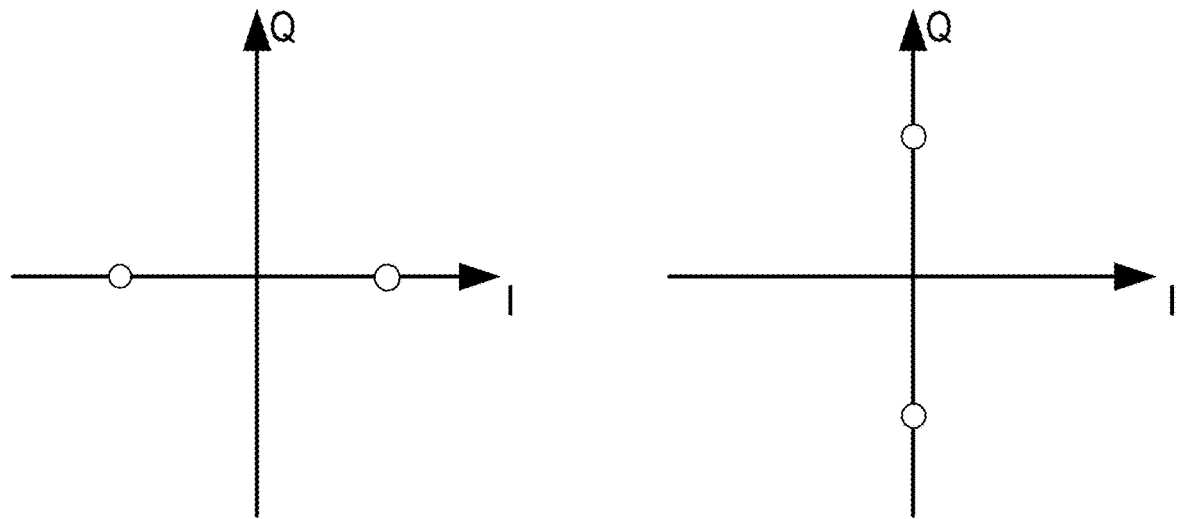
Figure 23:
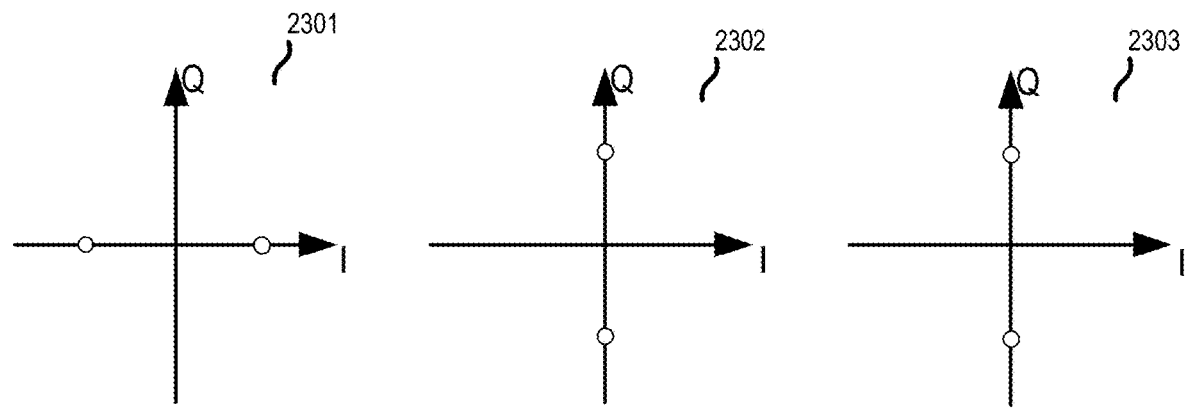
Figure 24:
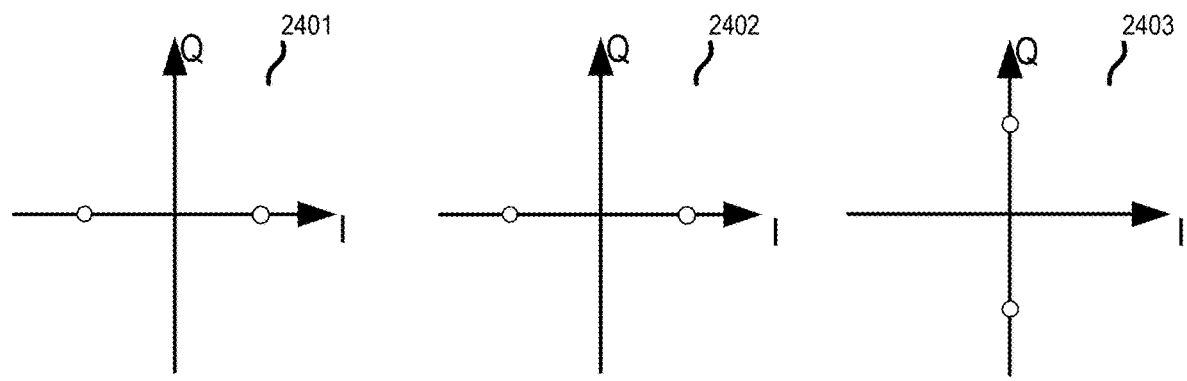
Figure 25:
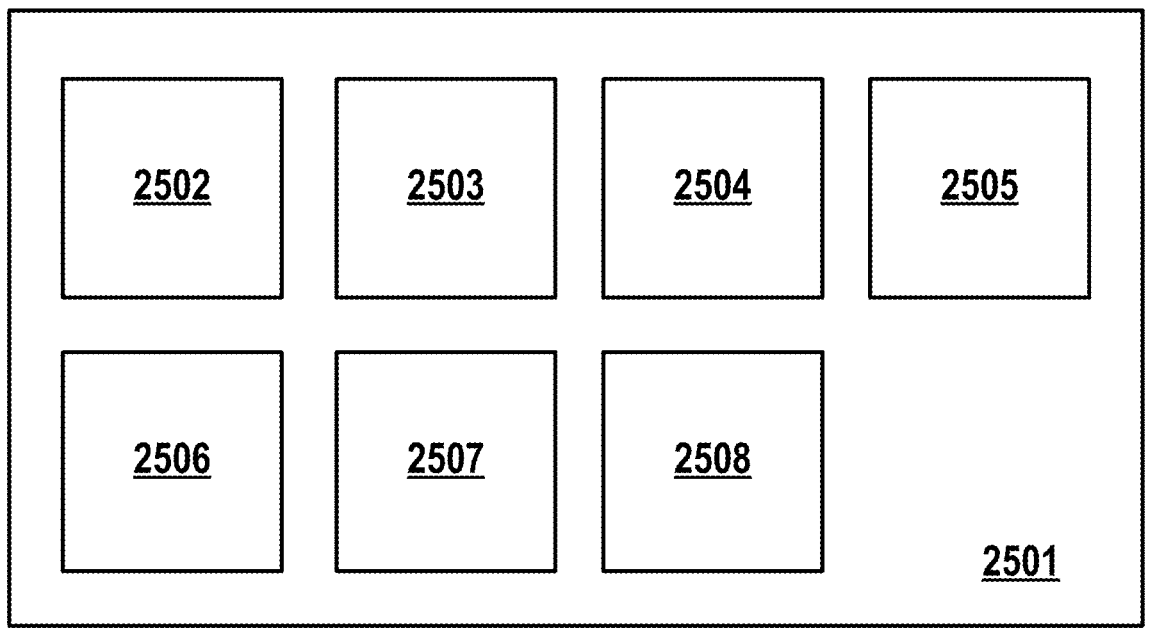
Figure 26:
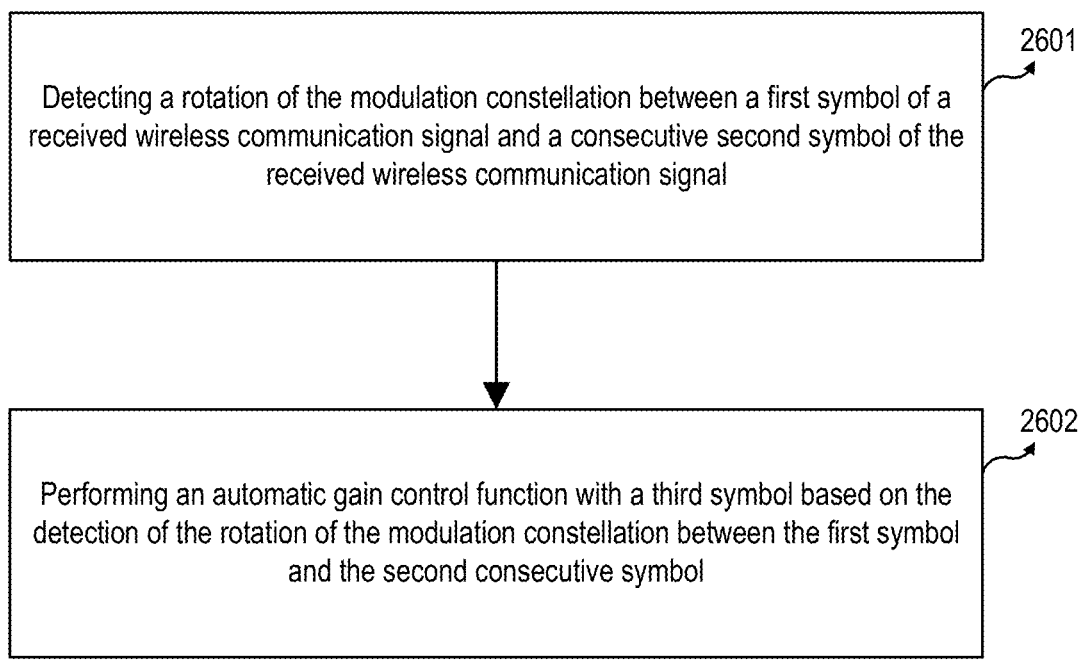
Figure 27:
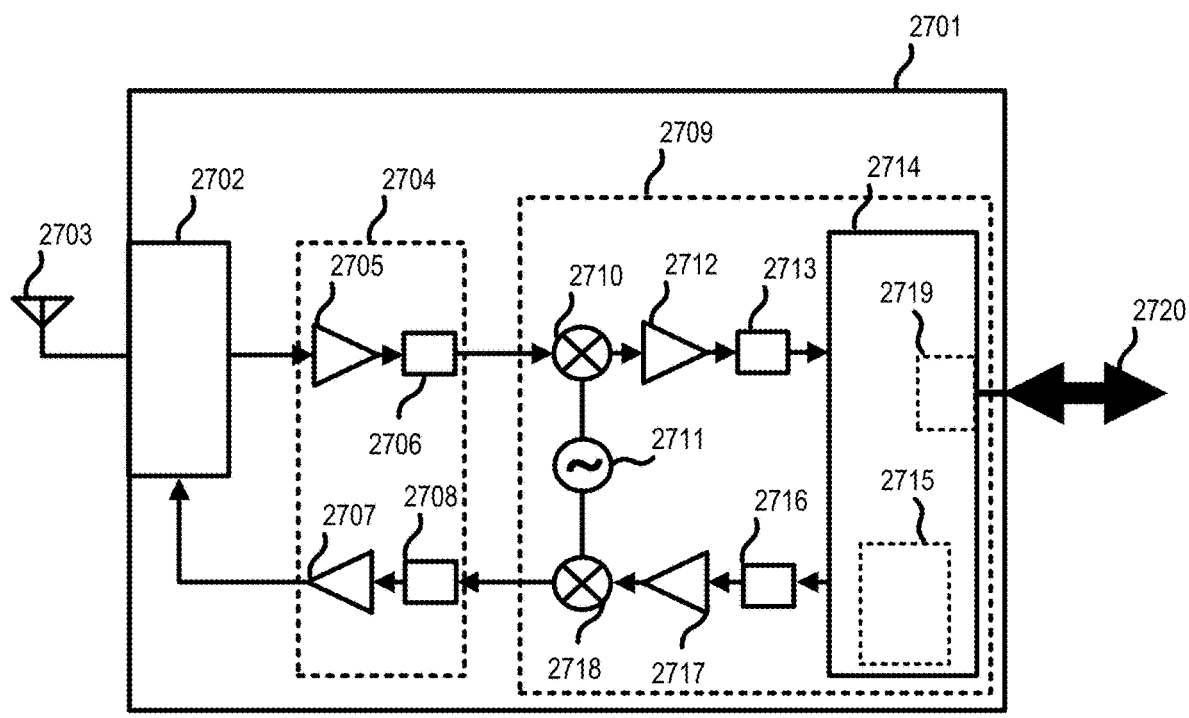
Figure 28:
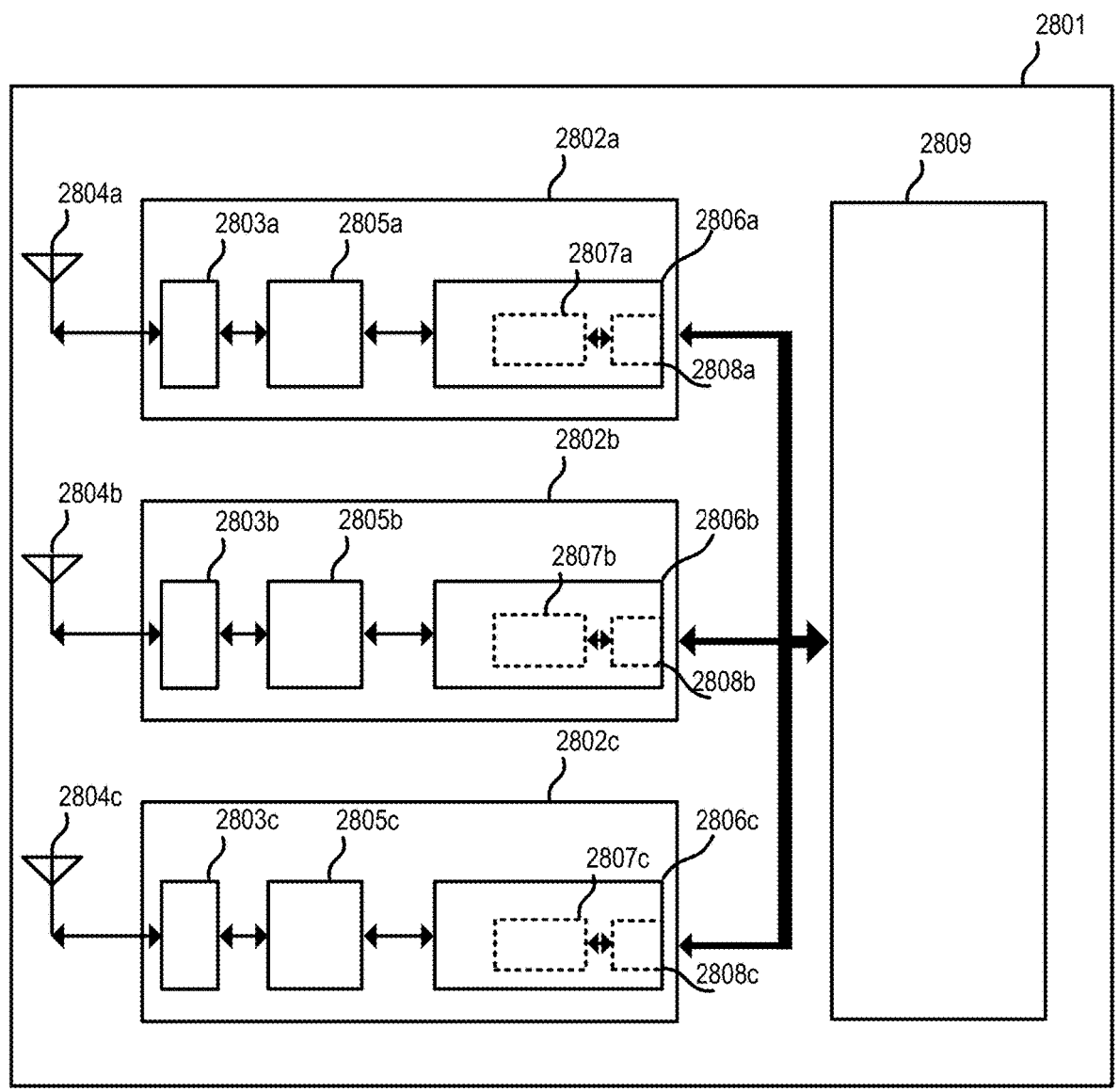
Figure 29:
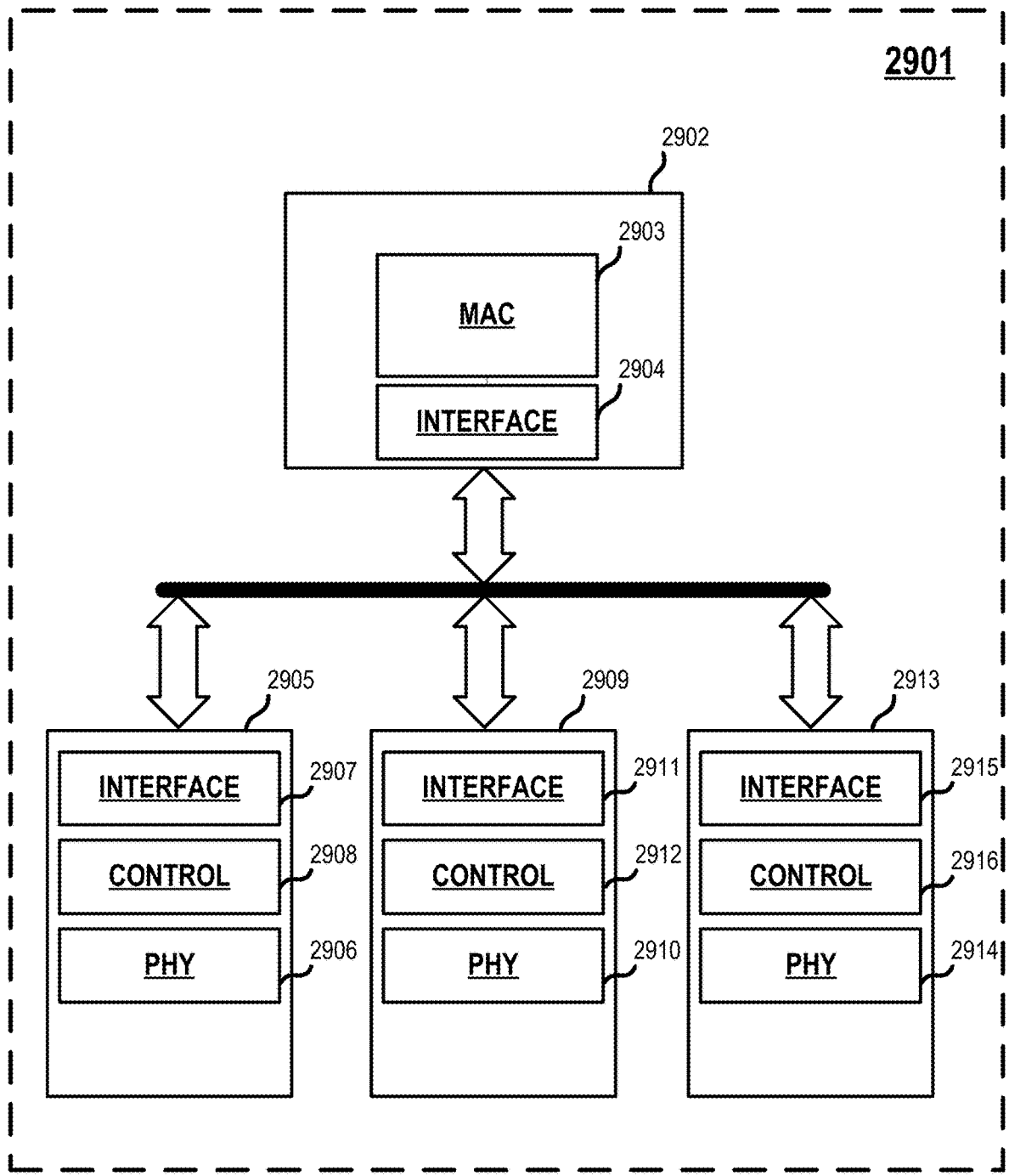
Figure 30:
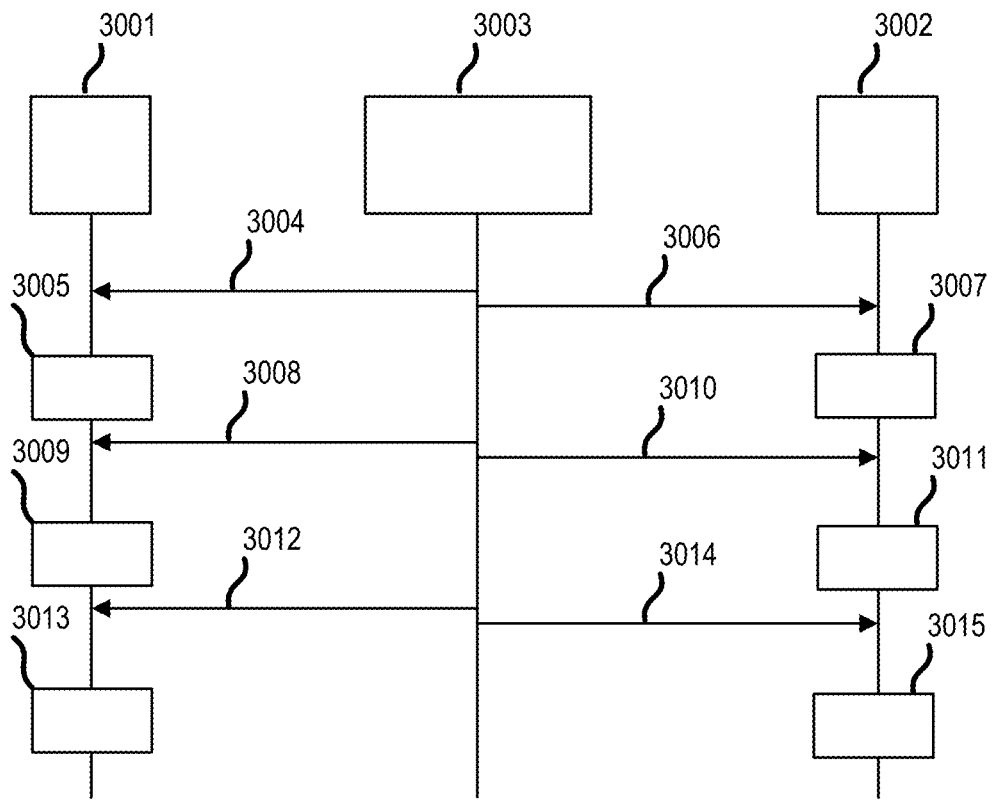
Figure 31:
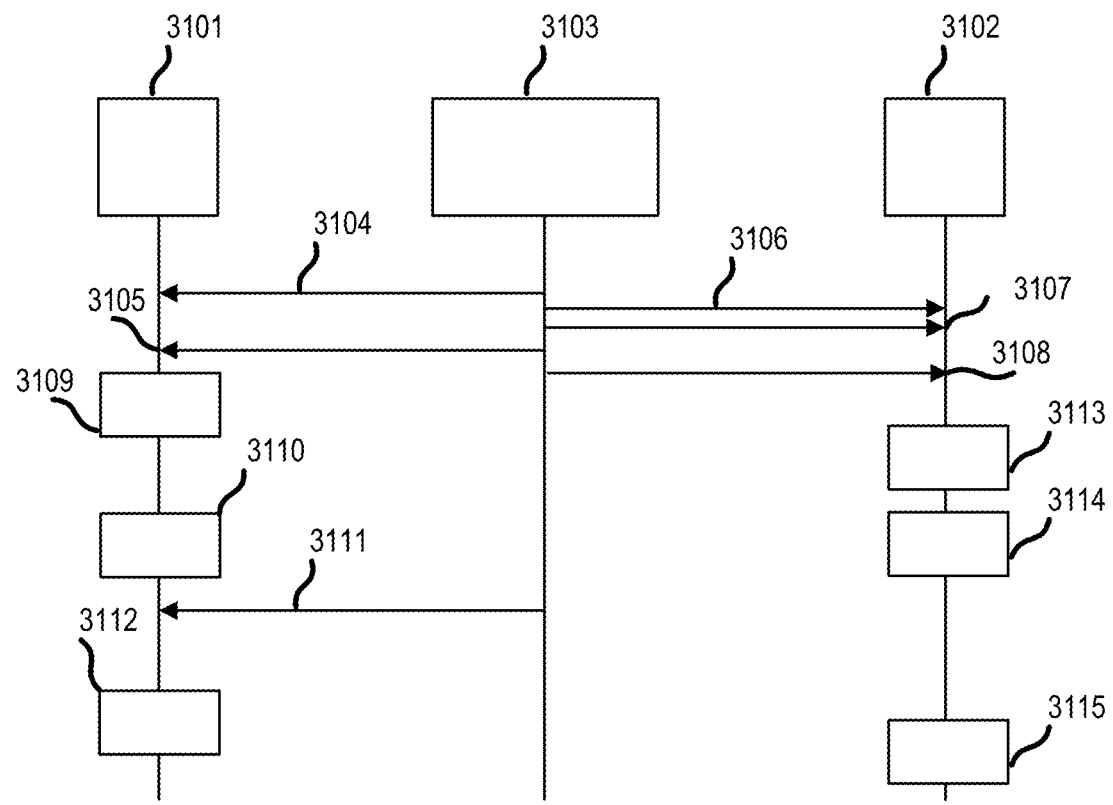
Figure 32:
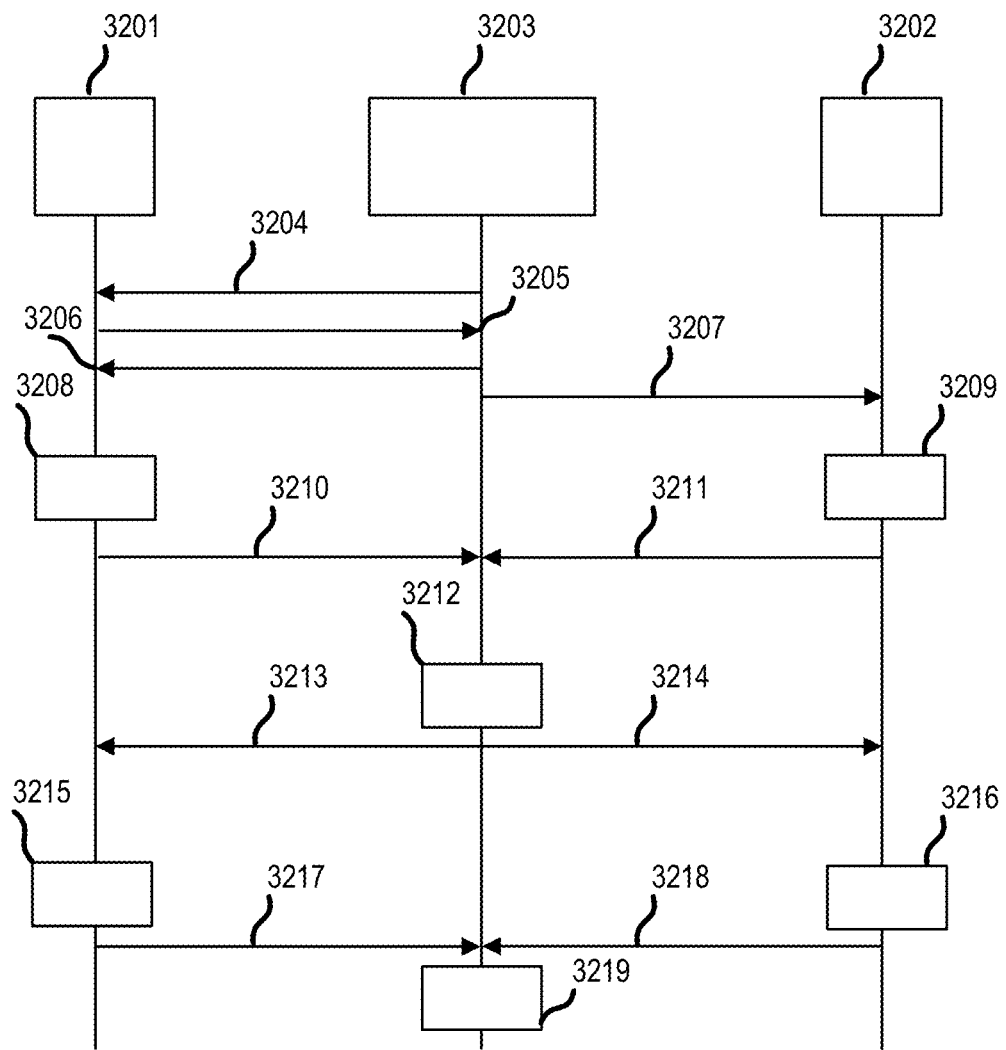
Figure 33:
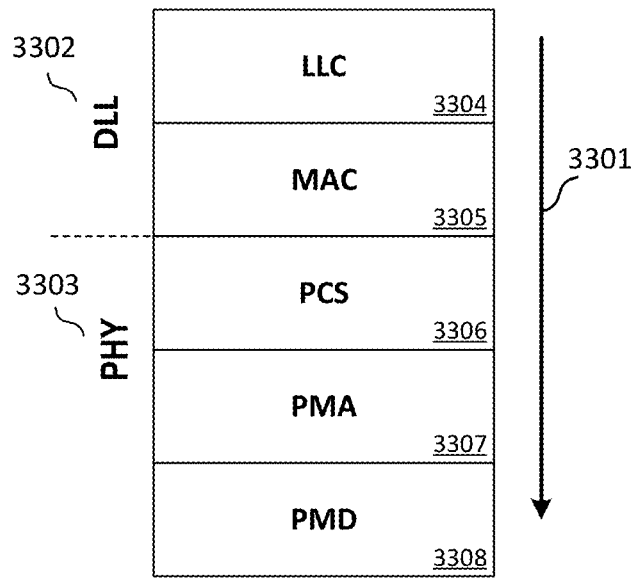
Figure 34:
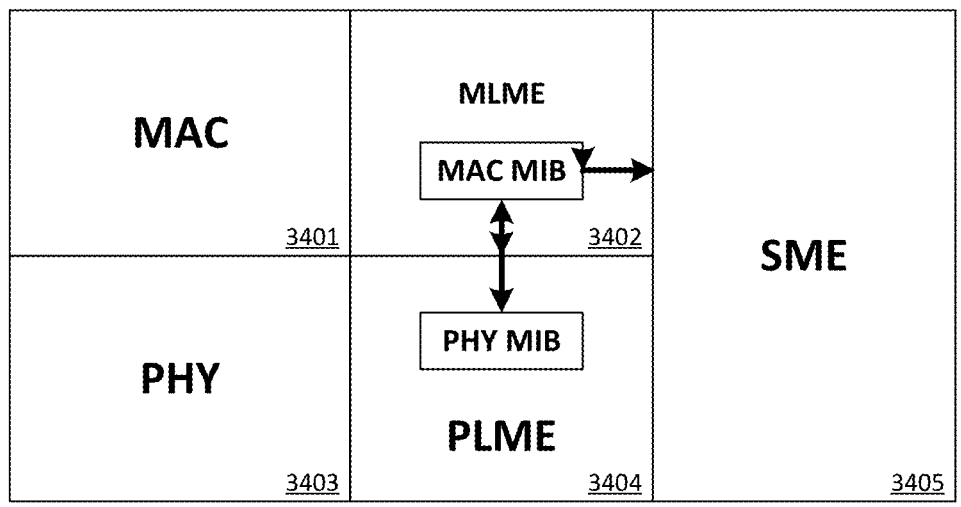
Figure 35:
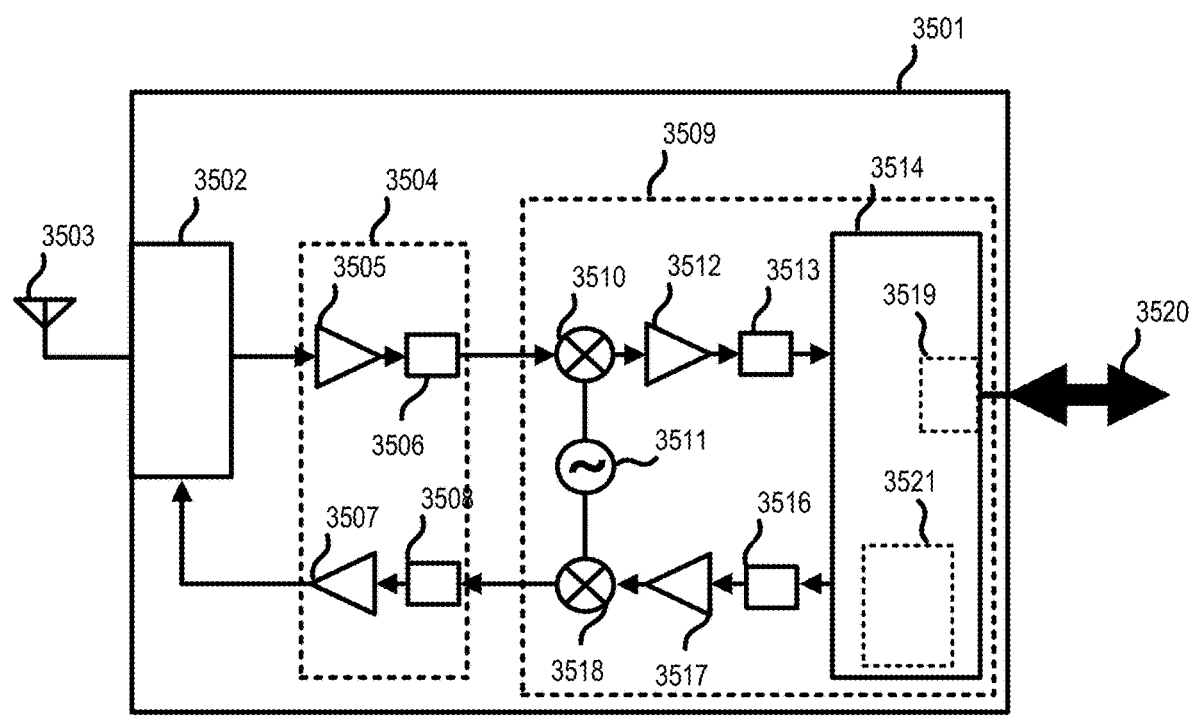
Figure 36:
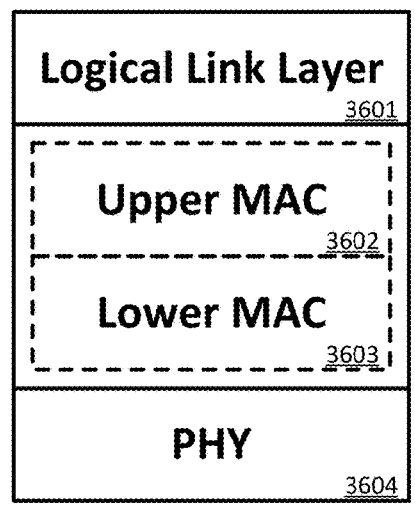
Figure 37:
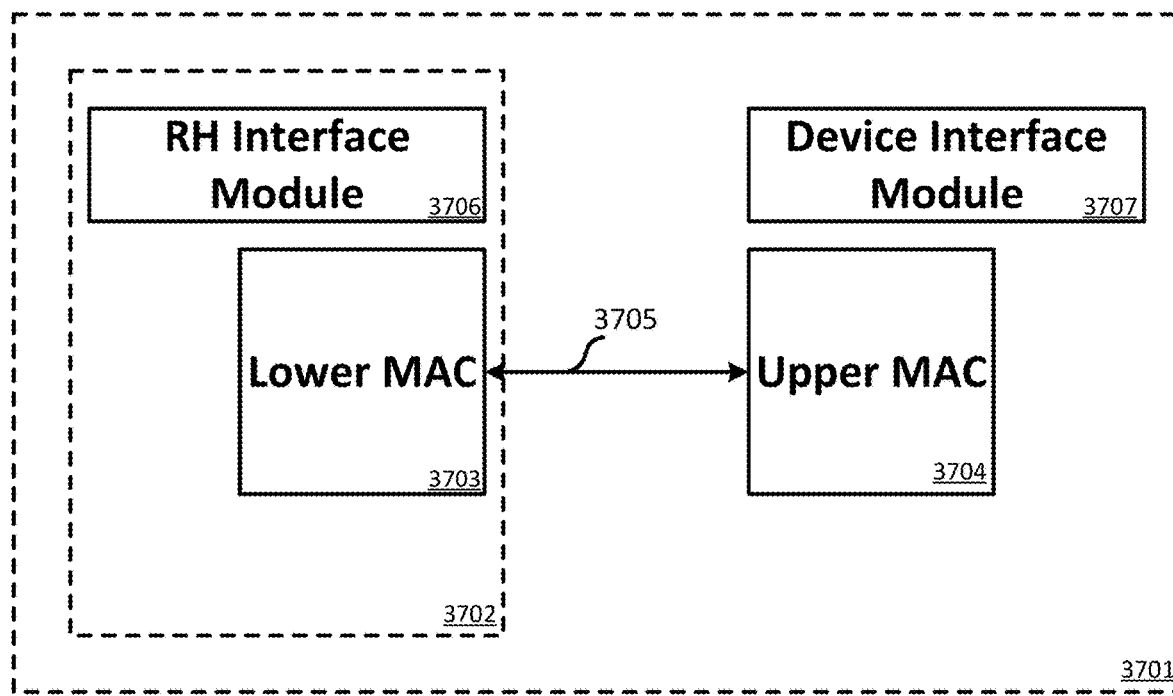
Figure 38:
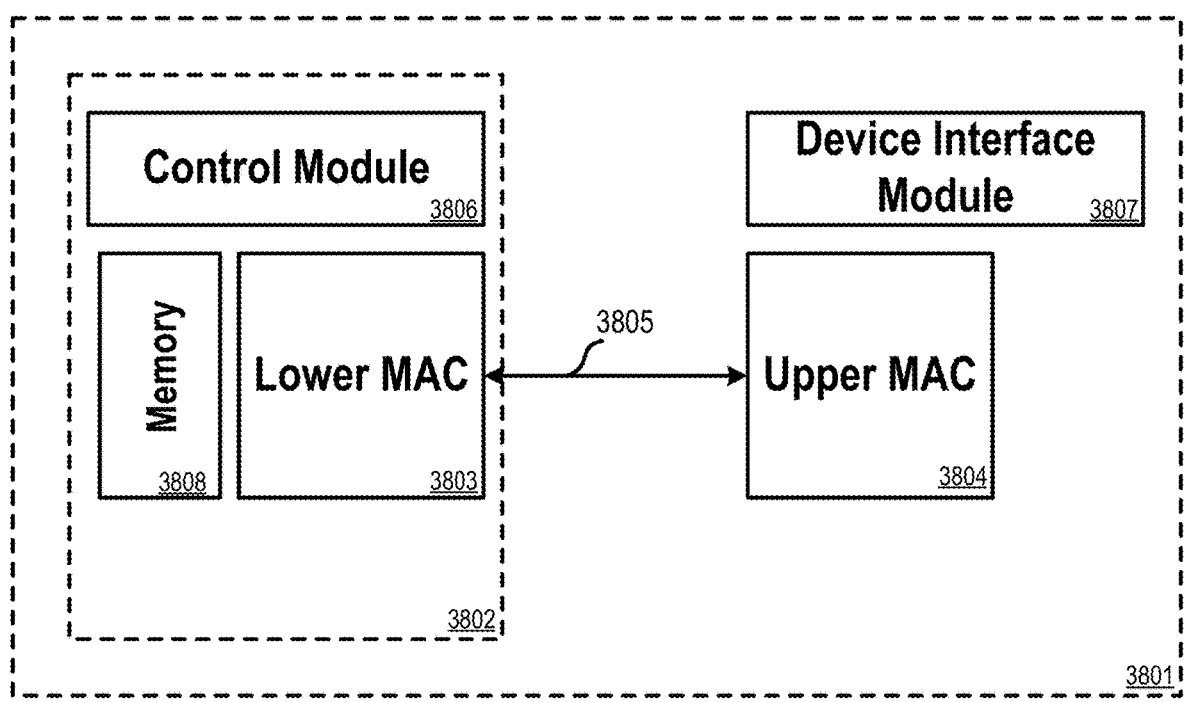
Figure 39:
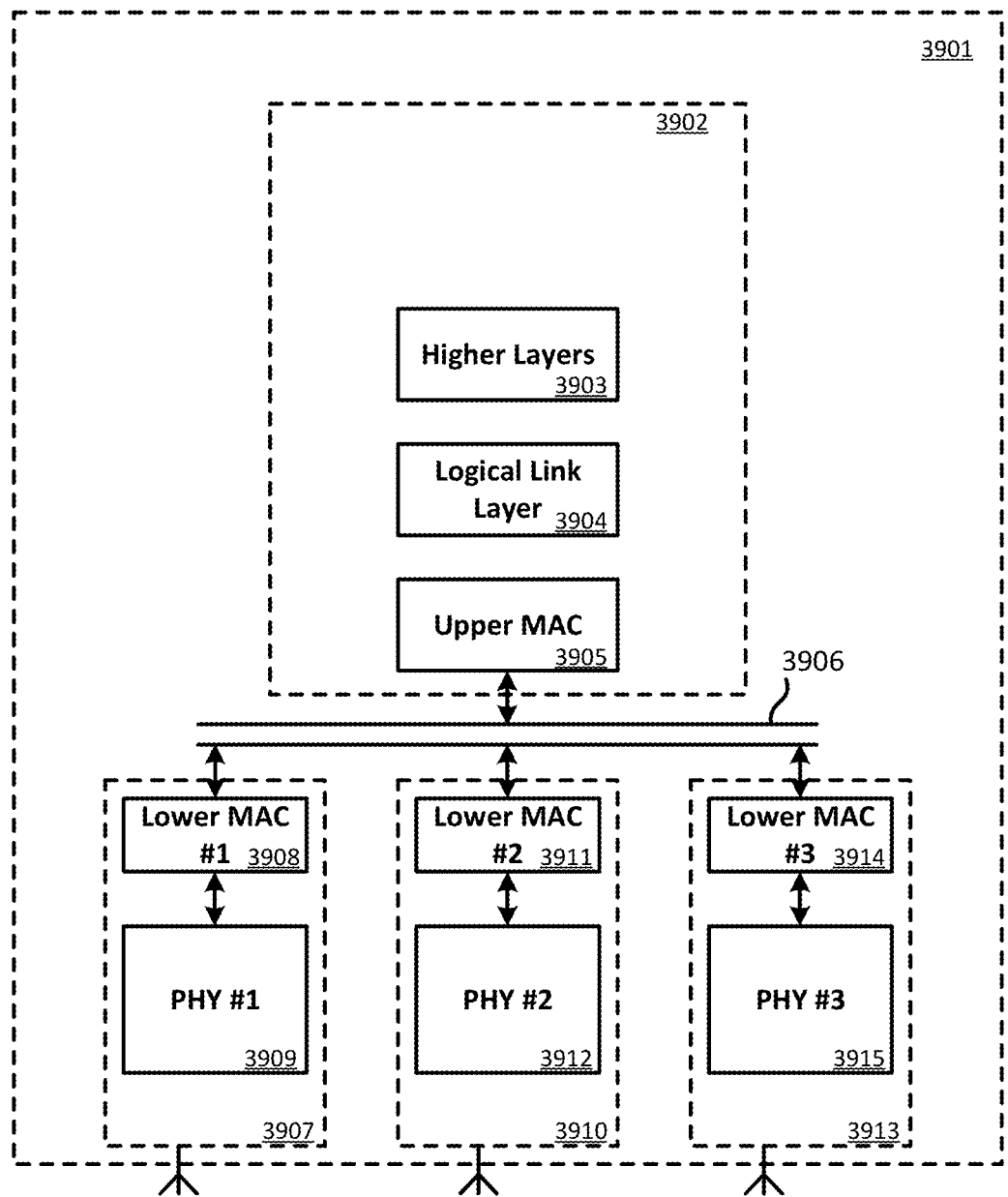
Figure 40:
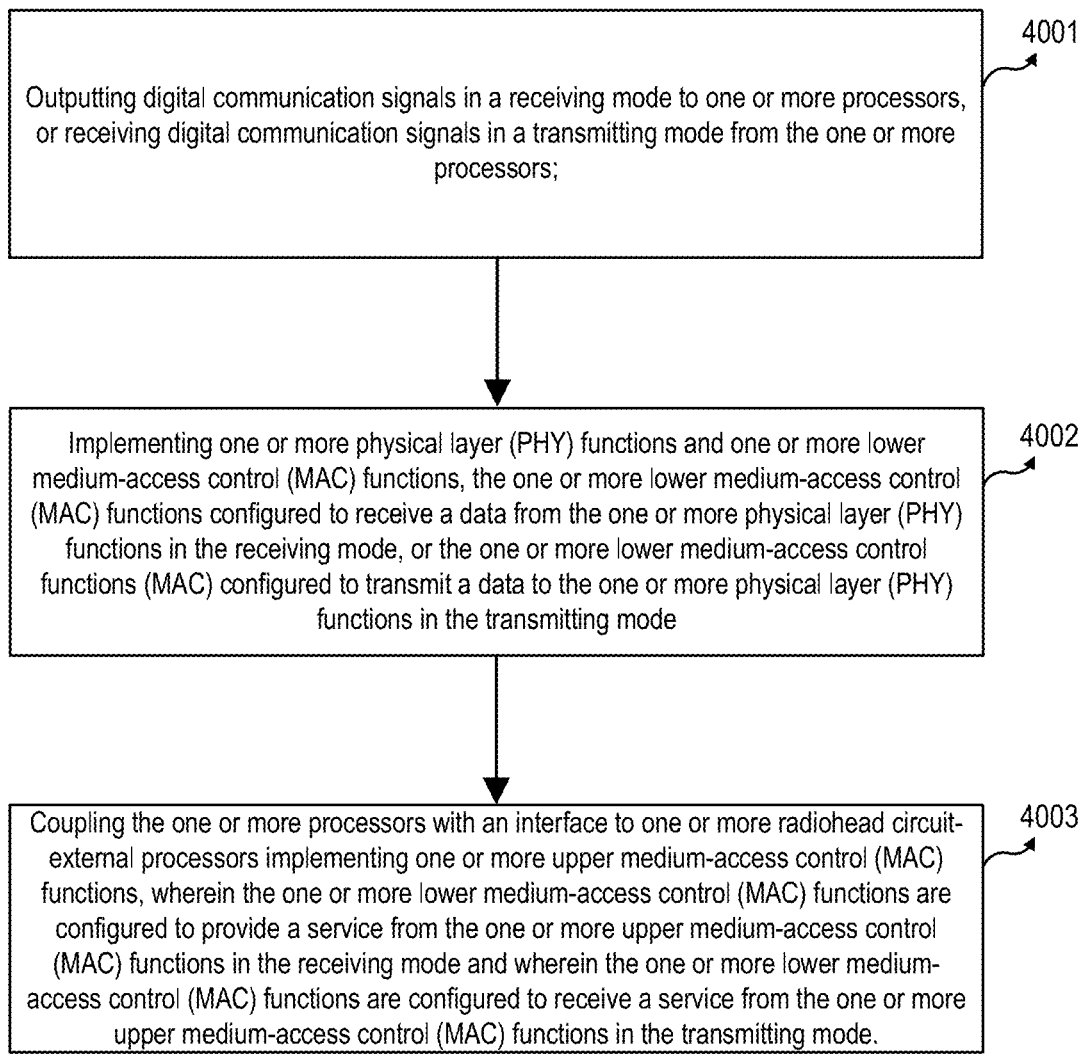

FIG. 19. shows schematically an example of an automatic gain control in accordance with various aspects of this disclosure;

FIG. 20A and FIG. 20B each show a structure of a wireless communication signal in accordance with various aspects;

FIG. 21 shows schematically a closer view of the portion of the structure of wireless communication signals;

FIG. 22A shows schematically an example of a first binary phase-shift keying modulation constellation;

FIG. 22B shows schematically an example of a second binary phase-shift keying modulation constellation rotated 90 degrees relative to the first binary phase-shift keying modulation constellation;

FIG. 23 shows schematically an example of the modulation constellations;

FIG. 24 shows schematically an example of the modulation constellations;

FIG. 25 shows schematically an example of a rotation detection module in accordance with various aspects of this disclosure;

FIG. 26 shows schematically an example of method steps in accordance with various aspects of this disclosure;

FIG. 27 shows schematically an example of a radiohead in accordance with various aspects of this disclosure;

FIG. 28 shows schematically an example of a communication device in accordance with various aspects of this disclosure;

FIG. 29 shows schematically an example of a representation of a communication device;

FIG. 30 shows schematically an example of a communication flow related to the scheduling instructions;

FIG. 31 shows schematically an example of a communication flow related to the scheduling instructions;

FIG. 32 shows schematically an example of a communication flow in accordance with various aspects of this disclosure;

FIG. 33 shows schematically a representation of the physical layer and data link layer according to certain communication protocols;

FIG. 34 shows schematically a representation of management entities in accordance with various aspects of this disclosure;

FIG. 35 shows schematically an example of a radiohead in accordance with various aspects of this disclosure;

FIG. 36 schematically shows a representation of a portioning of medium access control (MAC) layer in accordance with various aspects of this disclosure;

FIG. 37 shows schematically an example of service communication between the lower medium access control (MAC) layer and upper medium access control (MAC) layer in accordance with various aspects;

FIG. 38 shows schematically an example of service communication between the lower medium access control (MAC) layer and upper medium access control (MAC) layer in accordance with various aspects FIG. 39 shows schematically an example of a communication device in accordance with various aspects of this disclosure;

FIG. 40 shows schematically an example of method steps in accordance with various aspects of this disclosure.

DESCRIPTION

The following detailed description refers to the accompanying drawings that show, by way of illustration, exemplary details and aspects in which aspects of the present disclosure may be practiced.

As demand for wireless data traffic increases, wireless communication devices may require more wireless transceivers (e.g., multiple input multiple output (MIMO) technology, distributed input/distributed output (DIDO) networks, and/or multi-radio systems) to support wider bandwidths (BW), e.g., a BW of 320 MHz or more, and/or higher-order modulations schemes, e.g., 4k Quadrature Amplitude Modulation (QAM), or higher order modulation schemes. As demand for more efficient wireless communication devices (e.g., smaller size, less power consumption, higher performance, less material, lower costs), wireless communication devices may require greater integration while avoiding interference caused by the greater integration.

However, conventional implementations of the transceiver circuit and antenna and conventional cable connectivity schemes offer limited integration abilities due to cable losses, interference, thermal issues, and power consumption limitations. For example, in current wireless communication devices, such as those devices compliant with WiFi, Bluetooth (BT), GSM, CDMA, UMTS, LTE, or 5G or subsequent communication standards, the transceiver circuit is separate and remote from the antenna. In some cases, the integrated transceiver and front-end module is called a "radiohead" or "radio head".

In general, a radiohead can be considered as the radio equipment or RF circuitry for wirelessly communicating with other devices or networks. A radiohead includes a wireless transceiver for receiving and transmitting RF signals. Further the radiohead, as a transmitter can convert a digital signal to RF analog signal and amplify the converted signal to a desire power level so that an antenna connected to the transmitter radiates the RF signal. As a receiver, the radiohead can receive an RF signal from the antenna and then amplify the RF signal and further convert it back to a digital signal.

Said differently, a radiohead can be considered as the (integrated) RF transceiver combined with a front-end module (FEM) part that is specifically related to a specific antenna, and may include the least amount of signal processing in accordance with various aspects of this disclosure. The FEM, in general, can include circuitry between a receiver's antenna input up to and including the mixer stage. Ideally, a radiohead will be located or placed with the antenna/module or in close proximity to one so that one will be able to see multiple radiohead instances in a design with multiple antennas. This is contrast from the classic partitioning by function where there is a multi-channel transceiver connected to multiple front-end modules (or networks) and multiple antennas.

Although the radiohead may include the least amount of signal processing in accordance with various aspects of this disclosure, that may depend on the communication technology which the radiohead may include. In many examples, the radiohead may include the least amount of signal processing for certain communication technologies, while the radiohead may include more advanced processing blocks for another type of communication technologies. For example, the radiohead may include the least amount of signal processing for a wireless local area network (WLAN) communication, at which the radiohead may depend on the one or more processors of the communication devices to process the communication signals including communication signals according to the wireless local area network (WLAN) communication, while the radiohead may include one or more processors for processing a Bluetooth signal by itself without as much as dependence to the one or more processors of the communication device.

In accordance with various aspects of this disclosure the radiohead may be coupled to one or more processors of a communication device via a communication interface. In many examples, the communication interface may include a digital communication interface. In many examples, the communication interface may include a Serial Time Encoded Protocol (STEP) interface. In examples, the Serial Time Encoded Protocol (STEP) interface may be digitally coupled to a digital interface at one or more processors of the communication device and configured to transmit digital communications over the digital link in between. In examples, this digital link may provide bi-directional digital communications in accordance with an asynchronous time-based protocol, and may therefore provide for communications employing time division multiplexing. Accordingly, the digital link between the digital interfaces may support multiple bits per symbol and a narrow pass-band frequency spectral occupancy, resulting in higher data rates and lower energy per bit signaling. Furthermore, because the digital communication interfaces may have a low exit latency, the system may be turned off during idle times with fast re-acquisition.

Figure 1:
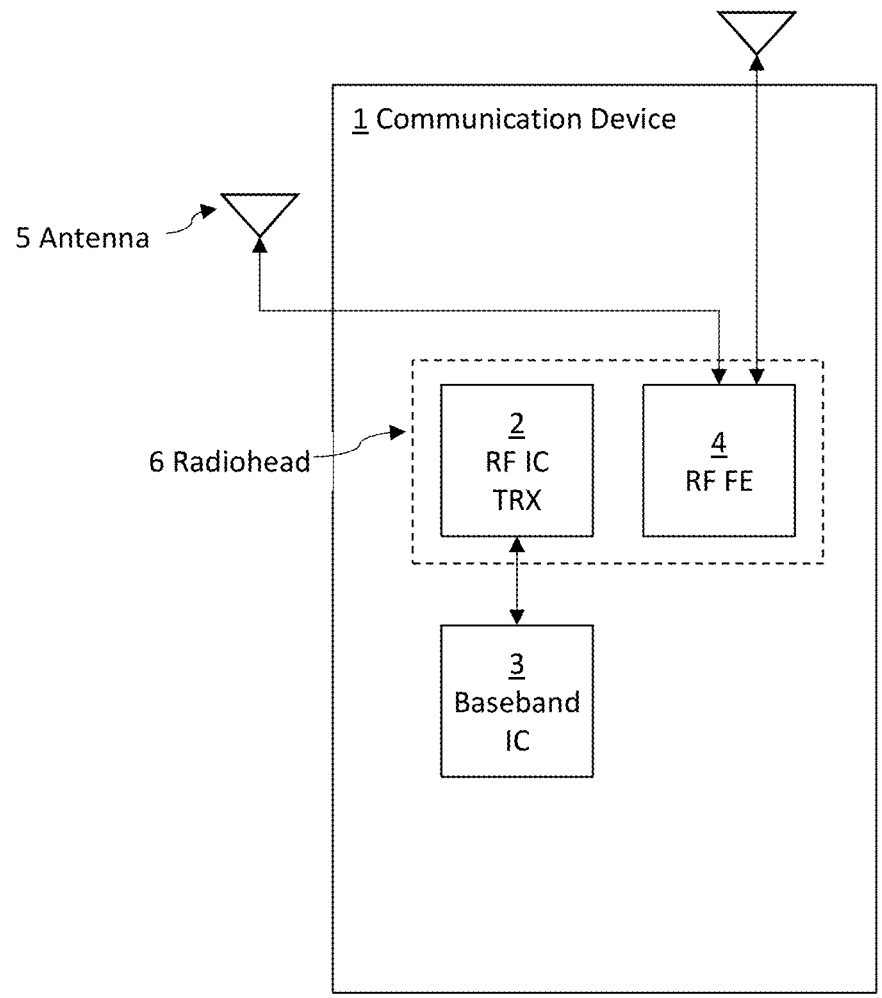

FIG. 1 shows a block diagram of a wireless communication device including a conventional radiohead system. Referring to FIG. 1, the wireless communication device 1 includes a baseband integrated circuit 3 for baseband signal processing, a centralized radiohead circuit 6 for radio frequency signal processing, and one or more discrete antennas 5. The radiohead circuit 6 and antennas 5 may be separate modules that are connected using a specialized radio frequency (RF) cable, e.g., coax cable, as a feed line to communicate RF electrical signals between the radiohead circuit and the antennas. Typically, as high-performance mini coax cables are costly components, only a single mini coax cable to each antenna may be used due to cost and space constraints. Moreover, the RF electrical signals still suffer impedance mismatches and accumulated insertion losses even on a high performance specialized RF cable depending on the cable length.

The radiohead circuit 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of antenna elements in a communication device increases, a radiohead circuit may include more co-located RF transceivers. However, the use of co-located RF transceivers and RF transceiver chains based on a conventional centralized radiohead circuit and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead circuit performance and increases cost.

For another example, using a conventional RF coax cable to connect antennas to a radiohead circuit may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently realize the integration of co-located RF transceiver chains.

Further, as the radiohead circuit and antennas are provided in different packages, packaging parasitics may have deleterious effects on the electrical designs of integrated circuits for radio frequencies. As a result, additional processing is needed to mitigate the signal degradations, thereby further increasing costs.

Further, certain combinations of radiohead circuits and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be needed to facilitate increasing numbers of RF transceiver chains.

Further, there may be a need to control each radiohead in accordance with various applications. In an example, controlling a plurality of radioheads may require from the processor to always be online without getting into a low power mode, because each of the plurality of radioheads may rely on the processing provided by the processor of the communication device.

The need to rely on the processing provided by the processor of the communication device would also make the radioheads susceptible functioning problems, especially when the communication interface between the radiohead and the processor of the communication device is not operable for a reason.

Further, the communication interface between the radioheads and the processor of the communication device may have a limited bandwidth, and it may not provide the required bandwidth for the communication between the radioheads and the processor of the communication device.

Further, various types of partitioning of the processing functions between the radioheads and the processor of the communication device may have certain difficulties.

Further, it may be needed for radioheads to provide compatibility with various common applications related to communication systems.

Further, the radiohead should be able to support certain processes which rely on the processing functions of the processor of the communication device but which are also related to the functioning of the radioheads with an acceptable latency.

Further, it may also be desired to exploit the adaptability of a plurality of radioheads by providing an acceptable controlling for controlling the plurality of radioheads.

Today, there is a need for RF circuity that can realize high performance wireless communication, have a compact and flexible form-factor design, be cost-effective, and able to meet modular certification requirements. These demands can be met by the wireless communication devices described herein.

The present disclosure describes various aspects relating to a low-cost, low-power, compact RF transceiver arrangement with increased silicon integration while avoiding or overcoming the various technical limitations associated with integrating co-located transceiver chains and integrating co-locating RF circuit and antenna circuit. For example, in some examples, a System-in-Packages (SIP) approach is used where two or more different dies are placed into a common package either side-by-side or stacked on top of each other. By combining dies of different technology and functionalities (e.g., RF, analog, digital) into one package, SIP provides substantial performance benefits, including, eliminating or reducing packaging parasitics. For another example, the present disclosure describes various aspects facilitating the placement of RF components co-located with or near an antenna while still providing optimized system performance.

The present disclosure relates to a radiohead circuit for a distributed radiohead system, where at least a portion of the radiohead circuit is co-located with an antenna. For example, the radiohead RF circuit and antenna circuit may be coupled to each other within a common enclosure. For another example, the antenna may be integrated with the silicon into a compact radiohead circuit package. That is, the radiohead RF circuit and antenna circuit may be formed on separate silicon dies/boards that are positioned near each other. The radiohead RF circuit and antenna circuit may be coupled to each other within a common module or system package. The present disclosure describes various ways of integrating the antenna and at least a portion of the radiohead circuit. Various aspects of the present disclosure describe interconnection structures and partitioning arrangements to simplify manufacturing, reduce manufacturing costs, improve transmission and reception quality, and/or improve energy efficiency. For example, each of these improvements derived from co-locating the RF circuit and the antenna circuit can incrementally reduce manufacturing cost by $0.5-$1.5/improvement (depending on SISO vs MIMO etc.) (eliminating lengthy specialized RF cables), improve key performance indicators (KPIs), and enable new use cases and experiences in wireless communication that are impossible to realize without a distributed radiohead system. The improvements to KPIs include eliminating insertion loss of 2-4 dB to provide higher power/range, better reception sensitivity, and/or reduced current for improved battery life.

In a distributed radiohead circuit arrangement according to various aspects of the present disclosure, the transceiver chain may be divided into a time-domain processing physical (TD PHY) portion and a frequency-domain processing physical (FD PHY) portion. The TD PHY portion can be co-located with one or more antennas. The TD PHY portion and the one or more antennas may be integrated. The TD PHY portion and the FD PHY portion may be separate and remotely located. The TD PHY portion and the FD PHY portion can be connected to each other through a digital interface to communicate digitized baseband RF signals. In one example, a Serially Time-Encoded Protocol (STEP) interface (developed by Intel Corporation) may be an optical or electrical signal interface.

The TD PHY portion may contain the radiohead RF circuit, the analog-to-digital/digital-to-analog (AD/DA) converters, the up/down converters, and line conditioning or impedance matching circuit. The TD PHY portion includes an optical/electrical interface circuit. The TD PHY portion may also have circuit for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert it into a digital baseband RF signal.

In some devices, there may be multiple TD PHY portions. Each TD PHY portion may be connected to a respective FD PHY portion. Alternatively, one or more TD PHY portions may be connected to an FD PHY portion.

Further in some aspects of the disclosure, there may not be a clear TD/FD split. For example, a single DSP part may be implemented or included for processing a sampled RF/analog signal on a per-transceiver basis and another DSP part is implemented or included to operatively implement equalization, demodulation, and other suitable multi-chain functions.

The digital front ends (DFEs) described herein may be considered, the TD portion and the DSP part responsible for the modulation/demodulation (modem) may be considered as the FD portion.

Figure 2A:
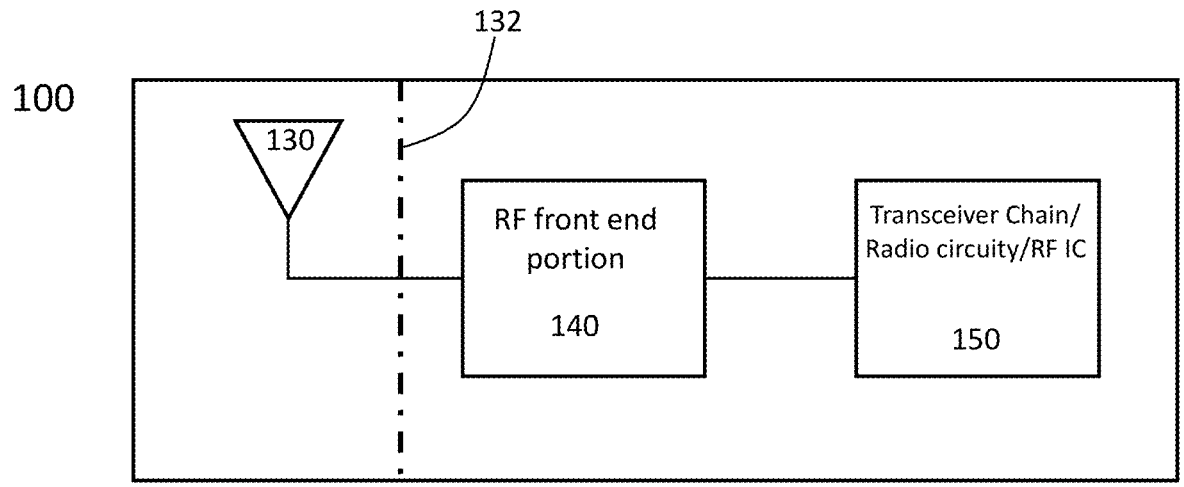

FIG. 2A illustrates a radiohead (RH) circuit 100 in accordance with various aspects of the present disclosure. The RHs 100 of FIG. 2A, can avoid the above-noted problems. As shown, the radiohead circuit 100 includes a separate or individual transceiver chain, among other things incorporated into a compact design.

Figure 2B:
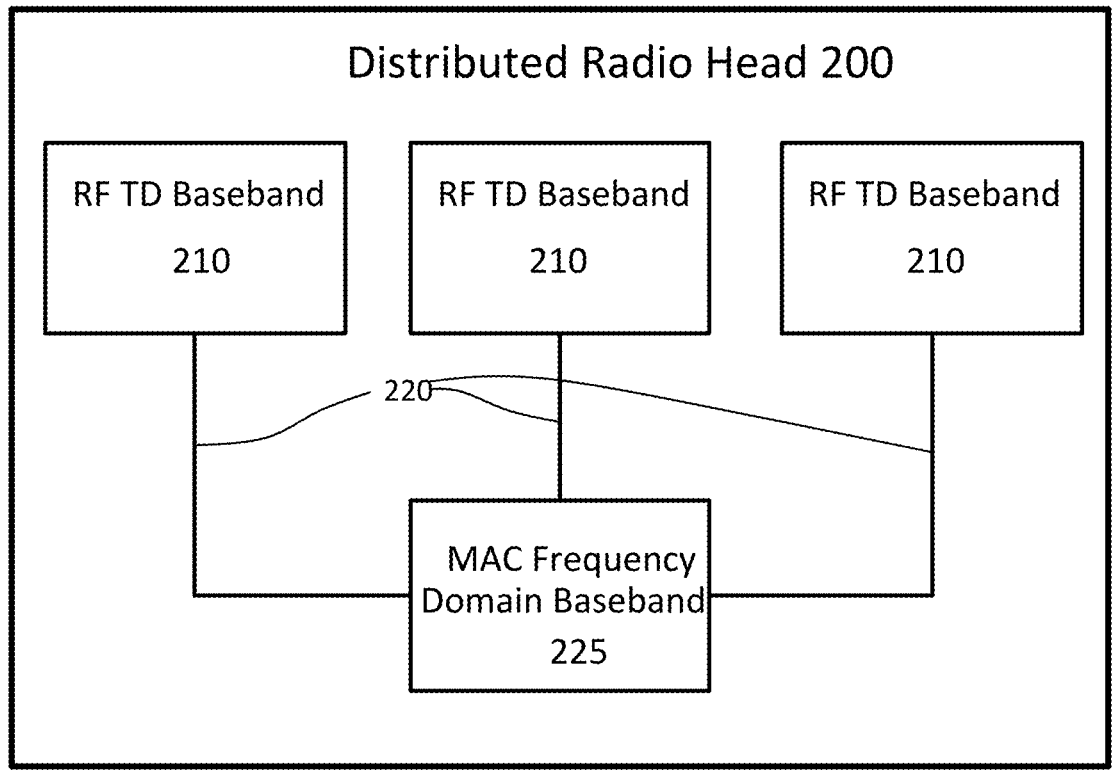

FIG. 2B shows an exemplary representation of distributed radiohead system 200. For wireless communication, the distributed radiohead system or distributed radio system may include two main aspects or functionalities, represented as RF TD Baseband 210 and MAC Frequency Domain Baseband 225.

The RF TD Baseband 210 functionalities include transmitting, receiving, filtering, and amplifying RF signals. Each RF TD Baseband 210 may be integrated, co-located, or in the proximity of a respective antenna or antenna structure. The RF TD Baseband 210 functionalities are performed in the time domain. The RF TD Baseband 210 may further include frequency locking means to accurately or precisely generate analog signals at a desired frequency.

In addition, the RF TD Baseband 210 can perform analog-to-digital and digital-to-analog conversions and up/down conversions. Up/down conversion includes shifting the frequency of a signal between from baseband (low frequencies) to RF (high frequencies) or vice versa. The RF TD Baseband 210 can transform a digital signal into an analog signal or produce a digital signal from an analog signal. As such, the RF TD Baseband 210 can include a digital interface.

Each of the RF TD Baseband 210 may be integrated with an antenna and independently distributed. The individual nature of each RF TD Baseband 210 can allow for easy modular certification approval.

The second main functional aspect of the distributed radiohead system 200 is provided by the MAC Frequency Domain Baseband 225. The MAC Frequency Domain Baseband 225 is responsible for controlling the flow of signals the transmission medium and provide radio controls. The provided radio controls can include modulation/demodulation and encoding/decoding of signals. The signal processing performed by the MAC Frequency Domain Baseband 225 can be done in the frequency domain. For example, the MAC Frequency Domain Baseband 225 can perform FD processing based on a combination of two or more receive signals from the RF TD Basebands 210 as well generate two or more transmit signals for the two or more RF TD Basebands 210.

In the distributed radiohead system 200, the MAC Frequency Domain Baseband 225 is physically separated from the RF TD Baseband 210 or is located on a platform physically separate from the RF TD Basebands 210. The digital signals between the RF TD Baseband 210 and the MAC Frequency Domain 225 can be transmitted by means of a digital interface or digital links 220. The signals between the RF TD Baseband 210 and the MAC Frequency Domain 225 may be in a phase alignment but not necessarily in frequency alignment with each other.

The radiohead 100 or radiohead circuit 100 may form part of radio or radio system, such a distributed radio system (DRS). A DRS generally can include a plurality or large number of antennas (or radioheads) distributed widely across a large coverage area and connected to an access point. A DRS implemented with the radiohead circuits 100 can have or implement several enhanced functionalities as well as performance capabilities with respect to wireless communications. This includes MIMO, digital beamforming, and multi-band operation. Further, a DRS implemented with the radiohead circuits 100 can realize higher robustness due to redundancy and flexibility of data reception and transmission, provide higher data transfer rates, have lower latencies, and provide an increased bandwidth. Further, the DRS can more easily be expanded or upscaled with additional radiohead circuits 100.

The increased bandwidth that may be provided by the distributed radio system is of key importance for applications that require the exchange of large quantities of data. The low latency ensured by the DRS and the radiohead circuit 100 can open the way for implementations in time-sensitive or time-critical scenarios, which require fast and reliable responses, such as the control of self-driving vehicles, the execution of medical procedures, or the realization of industrial processes.

Figure 3:
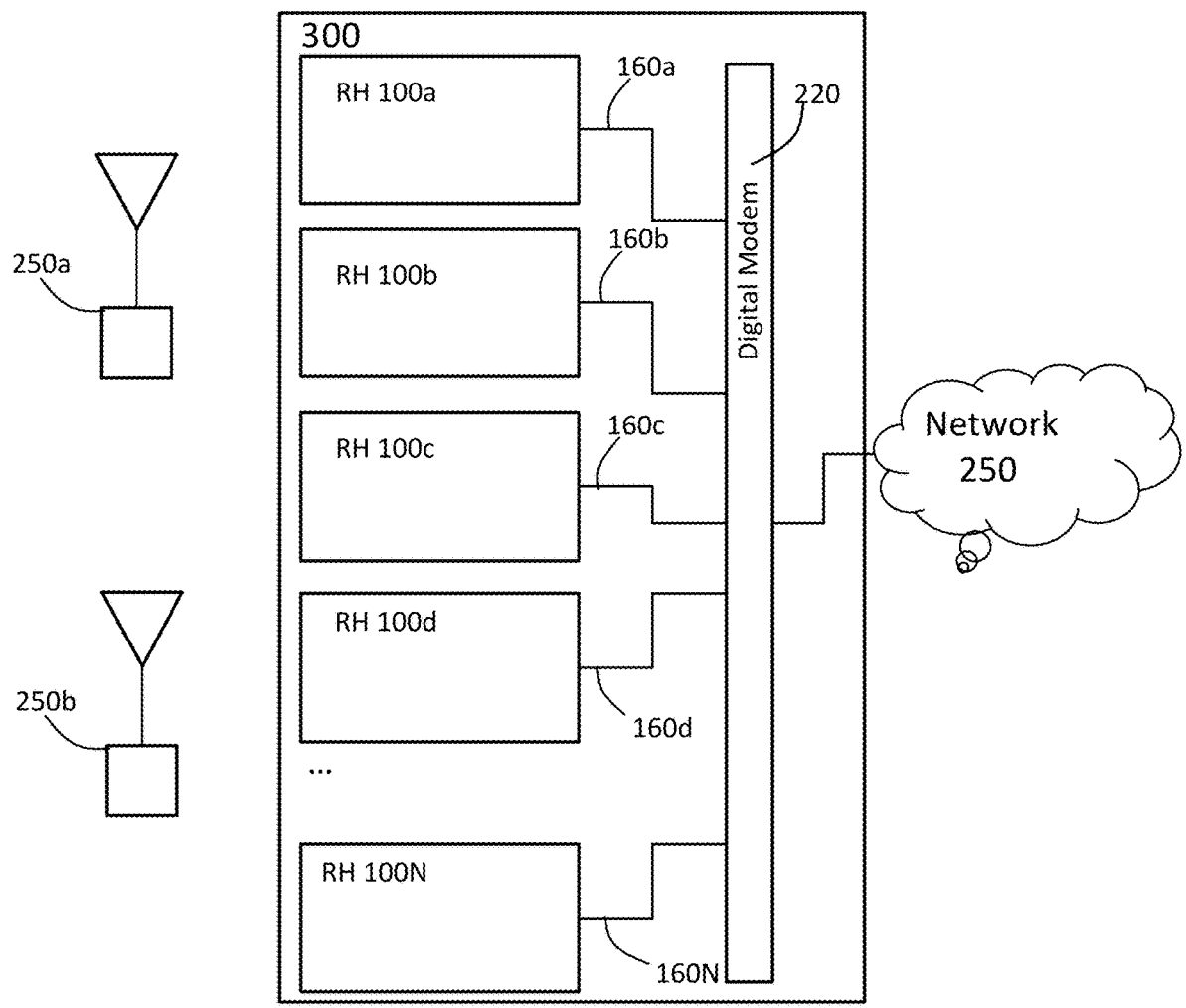

In the example of FIG. 3, wireless communication device 300 includes a plurality of radiohead circuits 100 (e.g., radiohead circuits 100a-100N, also collectively radiohead circuits 100) which are each coupled to a modem 220, which may also be a system-on-chip (SoC). The modem 220 may include a digital interface (e.g., a digital baseband interface) for communicating with the radiohead circuits 100. The communication device 300 can include a distribution of separate or independent radiohead circuits 100*a*-N, where N can be used to represent any suitable number of radiohead circuits. In other words, at least some of the RHs 100 may be non-collocated. The radiohead circuits 100 enable wireless communication using modulated electromagnetic radiation through a non-solid medium. The communication device 300 may be configured to implement or may be considered as a Distributed Radio System (DRS) or distributed radiohead system.

As shown in the example of FIG. 3, the DRS architecture of communication device 300 can support the connection of multiple RHs 100, e.g., more than two RHs, to a single modem or modem 220, and can include dynamic selection of active RHs. This capability may be valuable, for example, for "transformer" and/or "detachable" form-factors, where at a first system configuration it may be better to have antennas at a first location, and at a second system configuration, e.g., different from the first system configuration, it may be better to have the antennas at a different location.

The communication device 300 can support high order MIMO (Multiple Input Multiple Output) systems, for example, by adding more RHs 100 as needed and connecting such RHs 100 to the modem 220, which can create a distributed system rather than prevalent collocated radio system. The DRS scheme implemented by the communication device 300 may support improved thermal and RF interference, for example, as the RHs 230 may be separated and/or remote, which may allow more flexibility and/or ease in multi-antenna MIMO systems, e.g., 4×4 MIMO and 8×8 MIMO systems.

The wireless communication device 300 implemented as DRS, can be used in several contexts, including, without limitation, 5G, Next Generation Wifi. In addition, the DRS may also be used in automotive contexts, including for self-driving cars and vehicle networks (e.g., V2X).

Referring back to FIG. 2A, an individual integrated radiohead (RH) or radiohead circuit 100, may include at least one antenna or antenna structure 130. The dashed line 132 indicates that the antenna may be connected or part of the RH 100 by a connection means, such as a detachable connector. In other cases, the antenna may be integrated within the RH 100 by other means.

The radiohead circuit 100 includes a RF front end or RF front end portion 140 and a transceiver chain or radio circuit or radio circuit portion 150.

The RH 100 can have a compact design by integrating various of its components on a single platform, e.g., die or structure. More cost savings can be realized by the reduction or elimination of cable connections (e.g., coax cables). This advantageously can help realize a lower bill of materials cost, a reduction in production costs, and thus allowing for more lower cost devices.

In addition to physical costs, elimination or reduction of physical components (e.g., cables and cable connections) in the RHs 100 can provide power savings. These power savings or lower energy consumption further leads to an increase in the life time of the components, a longer battery life, and overall lower operational and maintenance costs.

In the example of FIG. 2A, the radiohead circuit 100 may include collocation of the antenna 130, the RF front end portion 140, and the transceiver chain 150. In other words, the antenna 130, the RF front end 140, and the transceiver chain/radio circuit 150 may be placed or integrated together to create the RH 100. The RF front end 140 and the radio circuit 150 or transceiver (TRx) chain, (e.g. a 1×1 TRx chain) can be configured with components and/or logic to transmit an RF transmit signal via the antenna 130, and/or to receive an RF receive signal via the antenna 130. The integrated radiohead circuit 100 can be configured for concurrent operation over a plurality of wireless communication frequency bands. For example, the RH 100 may be configured to communicate over a first frequency band, e.g., the 2.4 GHZ band, and to communicate over a second frequency band, e.g., the 5 GHZ and/or 6-7 GHz bands.

As shown, for each RH 100, the antenna 130 is coupled to the RF front end 140, and the RF front end 140 is coupled to the radio circuit 150 or transceiver (TRx) chain. The RF front 140 may be configured to amplify signals received from or provided to the antenna 130 and can support the RH 100 operating in a transmit and in a receive mode. In some aspects, the RF front end 140 may include a transmit/receive switch to switch between transmit mode and receive mode operations. The RH 100 can include in some cases a separate receive signal path and transmit signal path. The RF front end 140 may include RF components such as, but not limited to, a power amplifier (PA), a low-noise amplifier (LNA), switches, etc.

Figure 4:
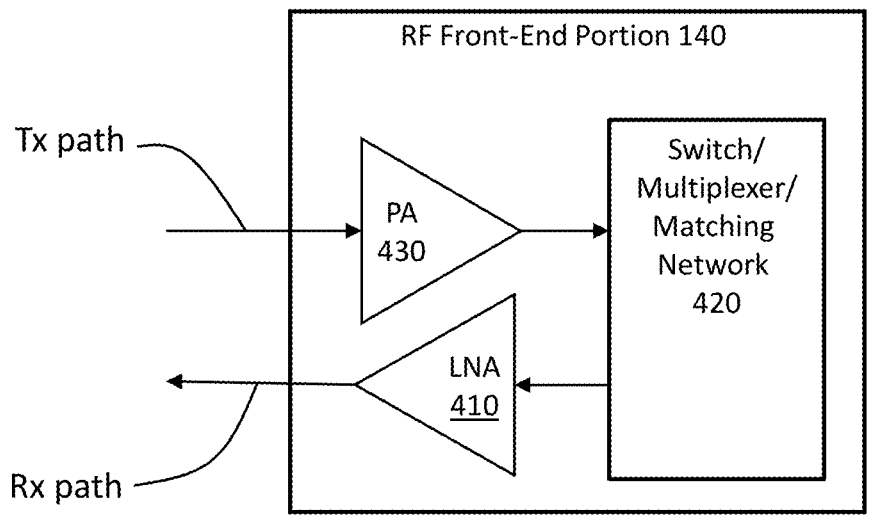

FIG. 4 shows an RF front end portion 140 that may be implemented in the radiohead circuit 100. A receive signal path (Rx path) of the RF front end 140 of FIG. 4 includes an LNA (low noise amplifier) 410 for amplifying received RF signals and provides the amplified received RF signals as an output. A transmit signal path (Tx path) of the RF front end 140 of FIG. 4 includes a PA (power amplifier) 430 for amplifying input RF signals. One or more filters may be included for generating suitable RF signals for transmission and reception. In addition, the RF front ends 140 of FIG. 4 may include other components 420 or circuit, such as, for example, a tuner or matching network, switches, multiplexers, and/or other circuit for coupling the RF front end 140 to the antenna 130. In addition, other components may be included to support both transmit and receive modes.

The RF front end 140 may include a millimeter wave and/or one or more sub-millimeter wave radio frequency integrated circuits (RFICs). In some implementations, the one or more sub-millimeter wave RFICs may be physically separated from the millimeter wave RFICs.

The RF front end 140 of at least FIG. 2A can provide signals obtained from the antenna 100 to the transceiver chain/radio circuit 150. The transceiver chain or radio circuit 150 can interface between the RF front end 140 and one or more other components. In the communication device 300 of FIG. 3, each radiohead circuit 100 may interface with the modem 220 to enable or facilitate the wireless communication.

Figure 5:
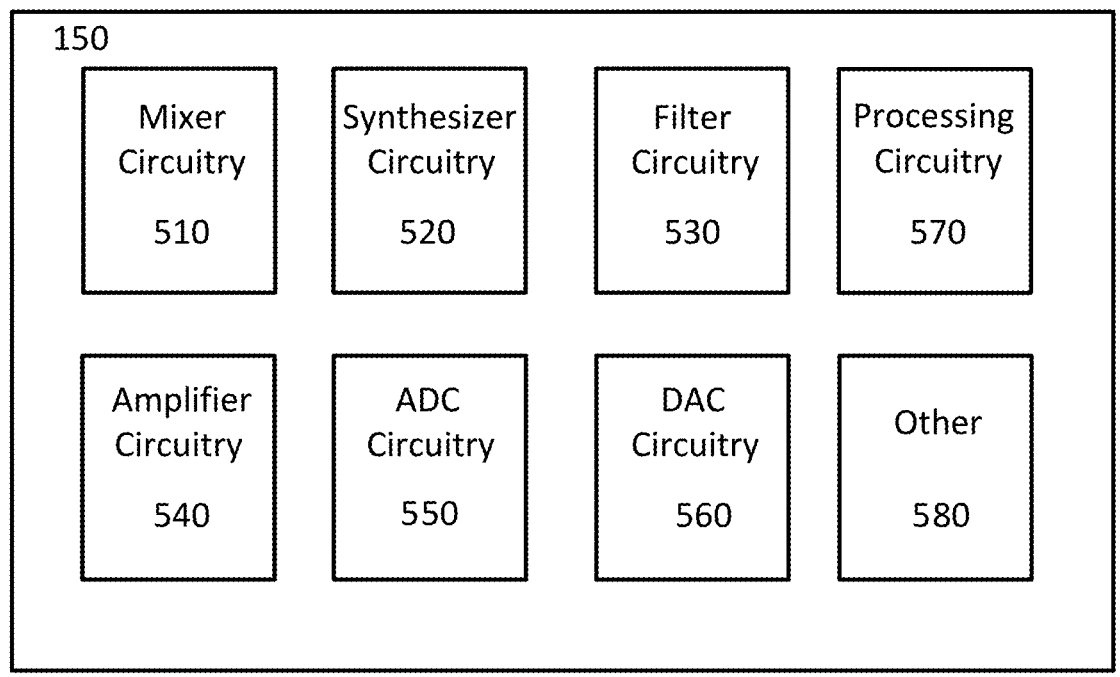

FIG. 5 shows one example of the radio circuit or transceiver circuit 150. As shown, the transceiver chain/radio circuit can include components such as a mixer circuit 510, synthesizer circuit 520 (e.g., local oscillator), filter circuit 530 (e.g., baseband filter), amplifier circuit 540, analog-to-digital converter (ADC) circuit 550, digital-to-analog (DAC) circuit 560, processing circuit 570, and other suitable digital front end (DFE) components 580, to name a few. The processing circuit may include a processor, such as a time-domain and/or frequency domain processor(s)/components in at least one example.

The other components 580 may include logic components, modulation/demodulation elements, and an interface circuit for interfacing with another component, e.g., a SoC, or the modem 220 in the example of FIG. 3. In at least one example, such an interface may be a digital interface, such as, e.g., a Common Public Radio Interface (CPRI).

DFE (digital front end) components may include any suitable number and/or type of components configured to perform functions known to be associated with digital front ends. This may include digital processing circuit, portions of processing circuity, one or more portions of an on-board chip having dedicated digital front end functionality (e.g., a digital signal processor), etc. The DFE components may selectively perform specific functions based upon the operating mode of the radiohead circuit 100 and, for example, may facilitate beamforming. Digital front end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver chain 150 can include a receive signal path which may include mixer circuit 510, amplifier circuit 540 and filter circuit 530. In some aspects, the transmit signal path of the transceiver chain 150 may include filter circuit 530 and mixer circuit 510. The transceiver chain 150 may also include synthesizer circuit 520 for synthesizing a frequency signal for use by the mixer circuit 510 of the receive signal path and the transmit signal path. In some aspects, the mixer circuit 510 of the receive signal path may be configured to down-convert RF signals received from the RF front end 140 based on the synthesized frequency provided by synthesizer circuit 520.

In some aspects, the output baseband signals and the input baseband signals may be digital baseband signals. In such aspects, the radio circuit 150 may include analog-to-digital converter (ADC) 550 and digital-to-analog converter (DAC) circuit 560.

In at least one example, the transceiver chain 150 may also include a transmit signal path (Tx path) which may include circuit to up-convert baseband signals provided by the modem 220 and provide RF output signals to the RF front end 140 for transmission. In some aspects, the receive signal path of the radio circuit 150 may include mixer circuit 510, amplifier circuit 540 and filter circuit 530. In some aspects, the transmit signal path of the radio circuit 150 may include filter circuit 530 and mixer circuit 510. The radio circuit 150 may include synthesizer circuit 520 for synthesizing a frequency signal for use by the mixer circuit 510 of the receive signal path and the transmit signal path. The mixer circuit 510 of the receive signal path may be configured to down-convert RF signals received from the RF front end 140 based on the synthesized frequency provided by synthesizer circuit 520.

In various aspects, amplifier circuit 540 may be configured to amplify the down-converted signals and filter circuit may be a low-pass filter (LPF) or band-pass filter (BPF) configured to remove unwanted signals from the down-converted signals to generate output baseband signals. Output baseband signals may be provided to another component, e.g., a modem 220, for further processing. In some aspects, the output baseband signals may be zero-frequency baseband signals, although this is not a requirement.

The mixer circuit 510 for a receive signal path may include passive mixers, although the scope of this disclosure is not limited in this respect. In some aspects, the mixer circuit 510 for a transmit signal path may be configured to up-convert input baseband signals based on the synthesized frequency provided by the synthesizer circuit 520 to generate RF output signals for the RF front end 140. The modem 120 may provide the baseband signals and the filter circuit 540 may filter the baseband signals.

In some aspects, the mixer circuit 510 of the receive signal path and the mixer circuit 510 of the transmit signal path may include two or more mixers and may be arranged for quadrature downconversion and upconversion, respectively. In some aspects, the mixer circuit 510 of the receive signal path and the mixer circuit 510 of the transmit signal path may include two or more mixers and may be arranged for image rejection (e.g., Hartley image rejection). In some aspects, the mixer circuit 510 of the receive signal path and the mixer circuit 510 may be arranged for direct downconversion and direct upconversion, respectively. In some aspects, the mixer circuit 510 of the receive signal path and the mixer circuit 510 of the transmit signal path may be configured for super-heterodyne operation.

In some dual-mode aspects, a separate radio IC circuit may be provided for processing signals for each spectrum, although the scope of this disclosure is not limited in this respect.

In some aspects, the synthesizer circuit 520 may be a fractional-N synthesizer or a fractional N/N+1 synthesizer, although the scope of the aspects is not limited in this respect as other types of frequency synthesizers may be suitable. For example, synthesizer circuit 520 may be a delta-sigma synthesizer, a frequency multiplier, or a synthesizer including a phase-locked loop with a frequency divider.

The synthesizer circuit 520 may be configured to synthesize an output frequency for use by the mixer circuit 510 of the radio circuit 150 based on a frequency input and a divider control input. In some aspects, the synthesizer circuit 520 may be a fractional N/N+1 synthesizer.

In some aspects, frequency input may be provided by a voltage controlled oscillator (VCO), although that is not a requirement. In various aspects, divider control input may be provided by a processing component of the radio circuit 150, or may be provided by any suitable component, such as an external component like the modem 220 in the case of FIG. 3. For example, the modem 220 may provide a divider control input depending on the desired output frequency. In some aspects, a divider control input (e.g., N) may be determined from a look-up table based on a channel indicated by external component.

In some aspects, synthesizer circuit 520 of the radio circuit 150 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump and a D-type flip-flop. The delay elements may be configured to break a VCO period up into No equal packets of phase, where Nd is the number of delay elements in the delay line.

In this way, the DLL provides negative feedback to help ensure that the total delay through the delay line is one VCO cycle.

In some aspects, synthesizer circuit 520 may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuit to generate multiple signals at the carrier frequency with multiple different phases with respect to each other. In some aspects, the output frequency may be a LO frequency (fLO). In some aspects, the RF circuit 506 may include an IQ/polar converter.

While the transceivers described herein include traditional super-heterodyning schemes or architectures, other type of transceiver or transmitter architectures and schemes may be used. In some aspects, the transceiver chain 150 may include components so as to implement a near zero IF scheme, a Direct Conversion scheme, or a digital transmission schemes, such as, for example, a Digital IQ transmission, a Digital Polar transmission, and the like.

In one example, the transceiver chain 150 may include a transmit path that includes or implements a direct digital transmitter (DDT). That is, in one simple example, a DDT may include a digital signal processor, a RF digital-to-analog converter (RFDAC), a RF filter/antenna coupler. Further, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency.

The use of a DDT can reduce the number of analog components needed in the transmitter or transmit path. For example, an analog LOs, analog filters, analog mixers, and etc., may be eliminated from the RFIC when a direct digital transmitter such as DDT is employed. Further, the use of a digital transmitter or digital transmission schemes such may bring energy savings and efficiencies.

Figure 6:
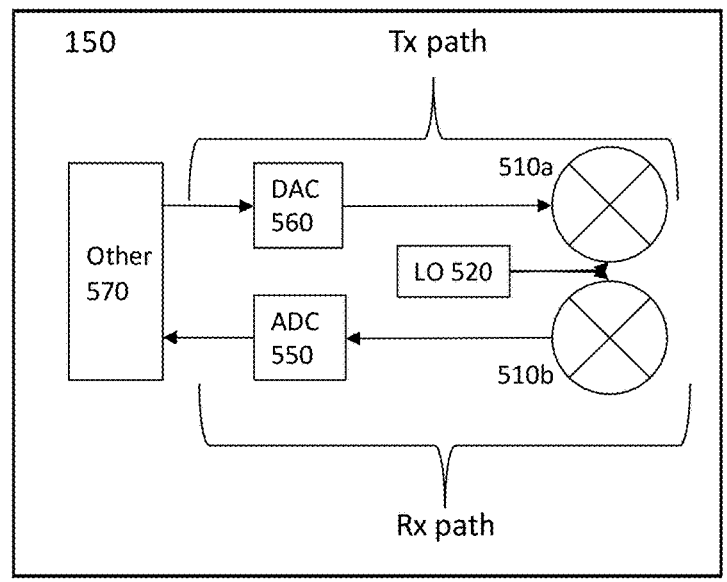

FIG. 6 shows one example of a transceiver chain/radio circuit 150 that may be implemented in the radiohead circuit 100. The receive signal path (Rx path) circuit down-converts RF signals received from the RF front end 140 and provides baseband signals. Specifically, the receive signal path may include a mixer 510*b* and an ADC 550. The transmit signal path (Tx path) circuity up-converts baseband signals provided by, e.g., a modem 220 and provides RF output signals to the RF front end 140 for transmission. Specifically, the transmit signal path may include a DAC 560 and a mixer 510*a*. The transceiver chain shown in FIG. 6 includes a synthesizer circuit, specifically, at least one local oscillator (LO) 520 to generate reference signals for the mixers 510*a* and 510*b*.

The antenna 130 for each radiohead circuit 100 may include a single antenna for transmission and reception. In other cases the antenna or antenna structure 130 may include multiple transmit antennas in the form of a transmit antenna array and multiple receive antennas in the form of a receive antenna array.

Figure 7:
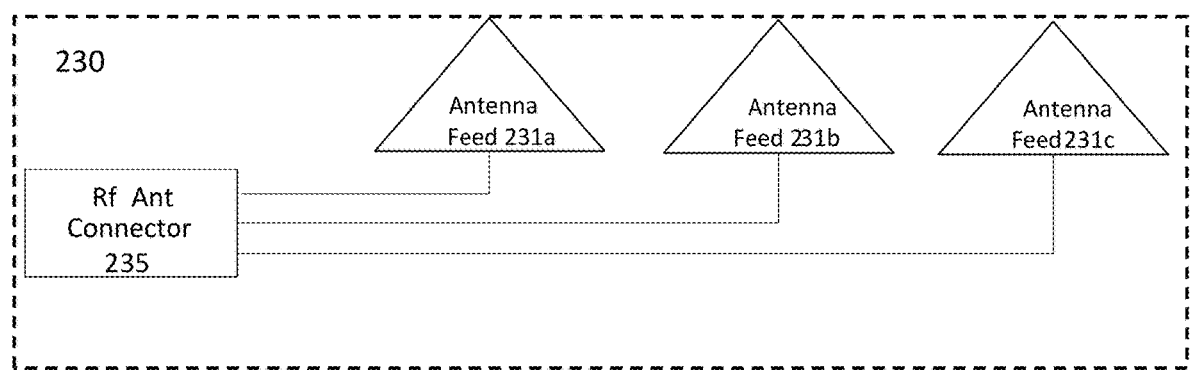

In other cases, the antenna 130 may be one or more antennas to be used as transmit and receive antennas. In such cases, the RF front end 140 may include, for example, a duplexer, to separate transmitted signals from received signals. For example, as shown in FIG. 7, the antenna or antenna structure 230 may include an RF antenna connector 135 that interfaces between the radiator of the antenna 230 and the RF front end. Further, FIG. 7 shows a multiple antenna feed (e.g., 231*a*, 231*b*, . . . , 231N) from the RF antenna connector 135 to the antenna radiator.

Referring back to FIG. 3, the modem 220 (or SoC) may include components, for receiving signals (e.g., digital baseband signals) from each of the radiohead circuits. In at least one example, the modem 220 may include, or may be implemented, partially or entirely, by circuit and/or logic, e.g., one or more processors including circuit and/or logic, memory circuit and/or logic, Media-Access Control (MAC) circuit and/or logic, Physical Layer (PHY) circuit and/or logic, baseband (BB) circuit and/or logic, a BB processor, a BB memory, Application Processor (AP) circuit and/or logic, an AP processor, an AP memory, and/or any other circuit and/or logic. For example, the modem 220 can perform baseband processing on the digital baseband to recover data included in wireless data transmissions. The modem 220, for example may include processor circuit for controlling and/or arbitrating transmit and/or receive functions of the radiohead circuit 100, performing one or more baseband processing functions (e.g., media access control (MAC), encoding/decoding, modulation/demodulation, data symbol mapping, error correction, etc.). In one or more aspects, the modem may include one or more processors to perform PHY frequency domain (FD) and/or PHY time domain (TD) processing, e.g., of signals.

In aspects, functions of the modem 220 can be implemented in software and/or firmware executing on one or more suitable programmable processors, and may be implemented, for example, in a field programmable gate array (FPGA), application specific integrated circuit (ASIC), etc.

In one example, the modem 220 may include a processor configured to generate a message, for example, in the form of a frame, field, information element and/or protocol data unit, for example, a MAC Protocol Data Unit (MPDU); and/or configured to convert the message into a PHY Protocol Data Unit (PPDU), e.g., a PHY Layer Convergence Procedure (PLCP) PDU, for example, by processing the message generated, e.g., by encoding the message, modulating the message and/or performing any other additional or alternative processing of the message. In other aspects, a processor of the modem 220 may be configured to perform any other additional or alternative functionality and/or may include any other additional or alternative components to generate and/or process a message to be transmitted.

As described before, the modem 220 as shown in FIG. 3 may be coupled to each respective radiohead circuit 100*a*-N via any suitable type of communication link or links (160*a*-160N). In at least one aspect, the communications links 160*a*-160N are digital links. The use of digital links can reduce expenses by eliminating the need for cable and connectors while performance can also be improved. Cables and connectors can add cost to designs and can impose physical design constraints in devices. The use of digital links or a digital link interface between the modem 220 and one or more radiohead circuits 100 can facilitate high data transfer rates. That is, the digital links 160*a*-160N may include a high speed digital I/O, e.g., a STEP interface or any other interface. The cable or link for the digital links 160*a*-160N may be much less sensitive to length, e.g., cost and performance wise, and, accordingly, the RHs 100 may be placed at practically any distance from the modem 220, for example, at lower cost. Further of importance is that the use or inclusion of a digital signal and control interface to the radiohead allows fulfillment of a key requirement for modular regulatory certification.

In some cases, the modem 220 and the RHs 100 of the communication device 300 may be placed closed together or integrated compactly. This may be necessary to optimize performance for certain classes of devices, such as IoT 4.0 type devices.

In some cases, as shown in FIG. 3, the modem 220 may communicate with a network 250, such as, a core network. Further, as shown, the communication device 300 can wireless communicate with the nodes 250 (e.g., nodes 250*a* and 250*b*) which may be an access point, base station, or the like.

Figure 8:
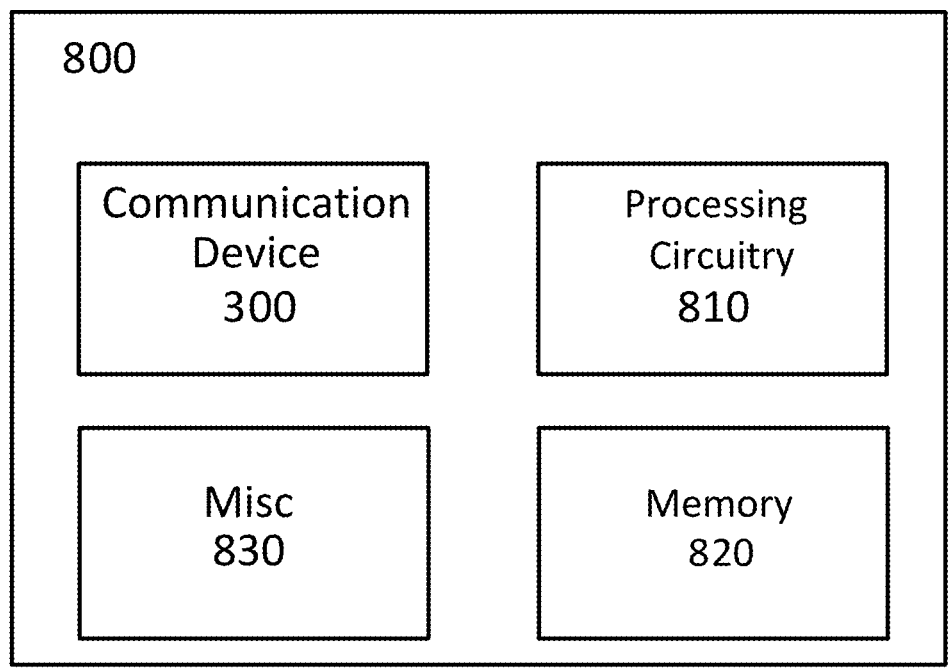

FIG. 8 illustrates a block diagram of an exemplary device or system in accordance with an aspect of the disclosure. The components of the device 800 are provided for ease of explanation, and in other cases, the device 800 can include additional, less, or alternative components as those shown in FIG. 8.

As shown in the example of FIG. 8, the device 800 can include processing circuit 810, a memory 820, and can include a communication device, such as the communication device 300, including a plurality of radiohead circuits 100, e.g., radiohead circuits such as radiohead circuit 100 having integrated transceiver chain/radio circuit 150, RF front end 140, antenna(s) 130. As explained, the communication device 300 can implement or support a DRS. The device 800 can also include a modem or SoC connected to the radiohead circuits. For example, device 800 may include one or more power sources, display interfaces, peripheral devices, ports (e.g., input, output), etc.

The device 800 may be used for products involving 5G, Wifi, BT, UWB, or any suitable wireless network products. The device 800 may also be used for any device supporting data-intensive applications, including streaming video (e.g., 4K, 8K video) or augmented/virtual reality (ARNR) devices. The device 800 may also be used for vehicles, e.g., to help support a self-driving car and/or to be used as vehicle network. For example, the device 800 may be used for Vehicle-to-everything (V2X) which includes vehicle-to-vehicle (V2V) and vehicle-to-infrastructure (V2I). The global automotive V2X market size is expected to reach USD 10,318.3 Million by 2027.

The processing circuit 810 may include any suitable number and/or type of computer processors, such as, for facilitating control of the device/system 800. In some cases, the processing circuit 810 may include a baseband processor (or suitable portions thereof) implemented by the device 800. In other cases, the processing circuit 800 may be one or more processors that are separate from the baseband processor (e.g., one or more digital signal processors. Additionally or alternatively, other examples may include various functions discussed herein by the processing circuit 800.

The processing circuit 810 may be configured to carry out instructions to perform arithmetical, logical, and/or input/output (I/O) operations, and/or to control the operation of one or more components of the device. For example, the processing circuit 810 can include one or more microprocessors, memory registers, buffers, clocks, etc. Moreover, aspects include processing circuit 810 communicating with and/or controlling functions associated with the memory 820 and/or functions of the radio.

The memory 820 may store data and/or instructions such that, when the instructions are executed by the processing circuit 810, the processing circuit 810 performs the various functions described herein. The memory 820 may be implemented as a non-transitory computer-readable medium storing one or more executable instructions such as, for example, logic, algorithms, code, etc. Instructions, logic, code, etc., stored in the memory 820 may enable the aspects disclosed herein to be functionally realized.

In various aspects, the device 800 may be implemented as any suitable type of device configured to transmit and/or receive wireless signals in accordance with any suitable number and/or type of communication protocols. Further, the device 800 may be implemented as a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet-of-Things (IoT) device, a wearable device, a handheld device an off-board device, a hybrid device, a vehicular device, a non-vehicular device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. In other examples, the device 800 may be implemented as an access point or base station. The device 800 may implement one or more aspects as described herein to facilitate transmitting wireless signals in accordance with a particular frequency or band of frequencies, such as mm-wave frequencies, for example, as further described herein. The prolonged lifetime (e.g., the extended battery life) that is associated with the reduced power consumption, in combination with the high data rate, make the radiohead circuits 100 particularly attractive for portable devices (e.g., smartphones, tablets, laptops) and also for installation in electrical vehicles (e.g., self-driving cars or remotely controllable drones).

The RHs 100 provide flexibility in terms of antennas to be implemented with vendor specific antennas. For example, this flexibility can be advantageous for cases where the wireless devices 800 are being made for with a large number different types of laptops, which each can include different constraints on antenna design and antenna placement.

In other cases, other devices may have form-factor constraints that are suitable for RHs 100 or the communication device 300 including such RHs. For example, the antenna area of some PCs can more design, physical, and other constraints than even smartphones, such as PCs having 5 mm think display side. By contrast current smartphones are rarely thinner than 7 mm. As such, the use of the communication device 300 with the flexibility of RHs 100 in terms of scalability and placement location is advantageous to work with such PC constraints.

Due to the remote nature of a radiohead with respect to a modem, or one or more processors of a communication device, the received wireless communication signals may eventually be provided to the modem, or one or more processors of the communication device that may include the modem, for the processing of the received wireless communication signals at their extent.

In certain aspects, the radiohead may not include the processing functions required to identify the data frames of wireless communication signals to determine if a received wireless communication signal is addressed to the communication device. In many examples, the radiohead may not include the complex filtering mechanism for the received data frames from the wireless communication signal as the one or more processors of the communication device include.

In many examples, the radiohead may not identify if the received wireless communication signal includes a wireless communication signal which is addressed to the communication device. In certain examples, the radiohead may need to at least receive a service from the one or more communication device, in order to identify if the received wireless communication signal includes a wireless communication signal which is addressed to the communication device.

Further, the communication device may perform diversity combining techniques to receive wireless communication signals with a plurality of radioheads and combine the wireless communication signals received from the plurality of radioheads to one combined wireless communication signal. Due to the remote nature of the radioheads relative to the one or more processors of the communication device, the one or more processors of the communication device may need to process the received signals from each of the plurality of radioheads to detect whether the received signal is a wireless communication signal of an interest.

In many examples, the communication device may include a plurality of radioheads, and the plurality of radioheads may be connected to the one or more communication device processors, via a digital interface. Each of the plurality of radioheads may provide the received wireless communication signals without applying any filtering to the modem. The amount of the data traffic may require continuous functioning of the digital interface. A signal detection mechanism in accordance with various aspects of this disclosure may be needed for a radiohead with a remote nature, which may allow to function the digital interface between the radiohead and the one or more processors in a low power mode at certain occasions.

Further, the communication device may perform diversity combining techniques to receive wireless communication signals with a plurality of radioheads and combine the wireless communication signals received from the plurality of radioheads to one combined wireless communication signal.

Figure 9:
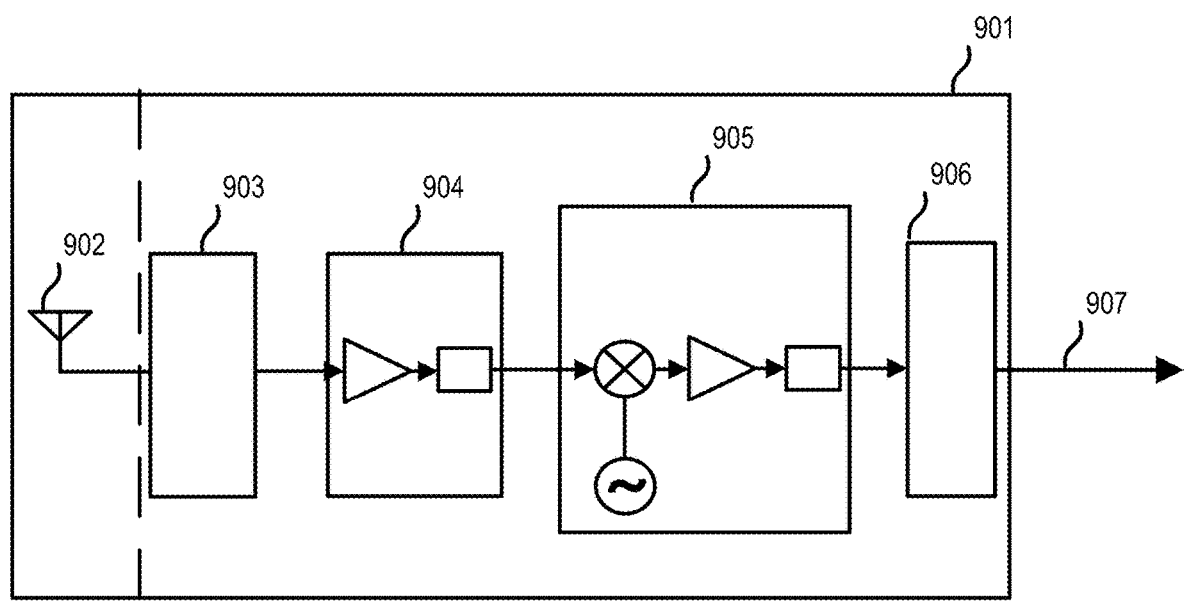
FIG. 9 shows schematically an example of a radiohead in accordance with various aspects of this disclosure.

FIG. 9 shows schematically an example of a radiohead in accordance with various aspects of this disclosure. The radiohead 901 may include an antenna 902 for receiving and/or transmitting wireless communication signals. The radiohead 901 may include an antenna interface 903 which is coupled to the antenna 902. In an example, the radiohead 901 may include the antenna interface 903, and the antenna 902 may be an external part to the radiohead 901.

The radiohead 901 further includes a radio frequency front end 904. The radio frequency front end 904 is coupled to the antenna interface 903 to receive the wireless communication signal from the antenna 902 which the antenna 902 receives. The radio frequency front end 904 may include a filter and a low noise amplifier to amplify the wireless communication signals. Further, the radio frequency front end 904 may include a power amplifier to amplify the communication signals to be transmitted. The radio frequency front end 904 is coupled to the transceiver chain 905.

In an example, the radio frequency front end 904 may further include a local oscillator and a mixer to convert the wireless communication signal to an intermediate frequency. In this example, the radio frequency front end 904 may convert the wireless communication signal including a carrier signal from the carrier frequency to the intermediate frequency. Then, the radio frequency front end 904 provides the communication signal at the intermediate frequency to the transceiver chain 905, and the transceiver chain 905 may convert the communication signal to the baseband.

The transceiver chain 905 may include a local oscillator and a mixer to provide down-conversion to the baseband for the communication signal which the transceiver chain 905 receives from the radio frequency front end 904. Further, the transceiver chain 905 may include an analog-to-digital converter to convert the communication signal which the transceiver chain 905 receives, to a digital communication signal.

The radiohead may further include a communication interface module 906 to connect the radiohead to one or more radiohead external processors that are external to the radiohead via a communication interface 907. In an example, the communication interface 907 may include a digital interface. In an example, the communication interface 907 includes a serial digital interface. In an example, the communication interface 907 may include a serial time encoded protocol (STEP) interface. In an example, the radiohead may include one or more processors to control the communication interface. In an example, the one or more processors include the communication interface module 906.

Figure 10:
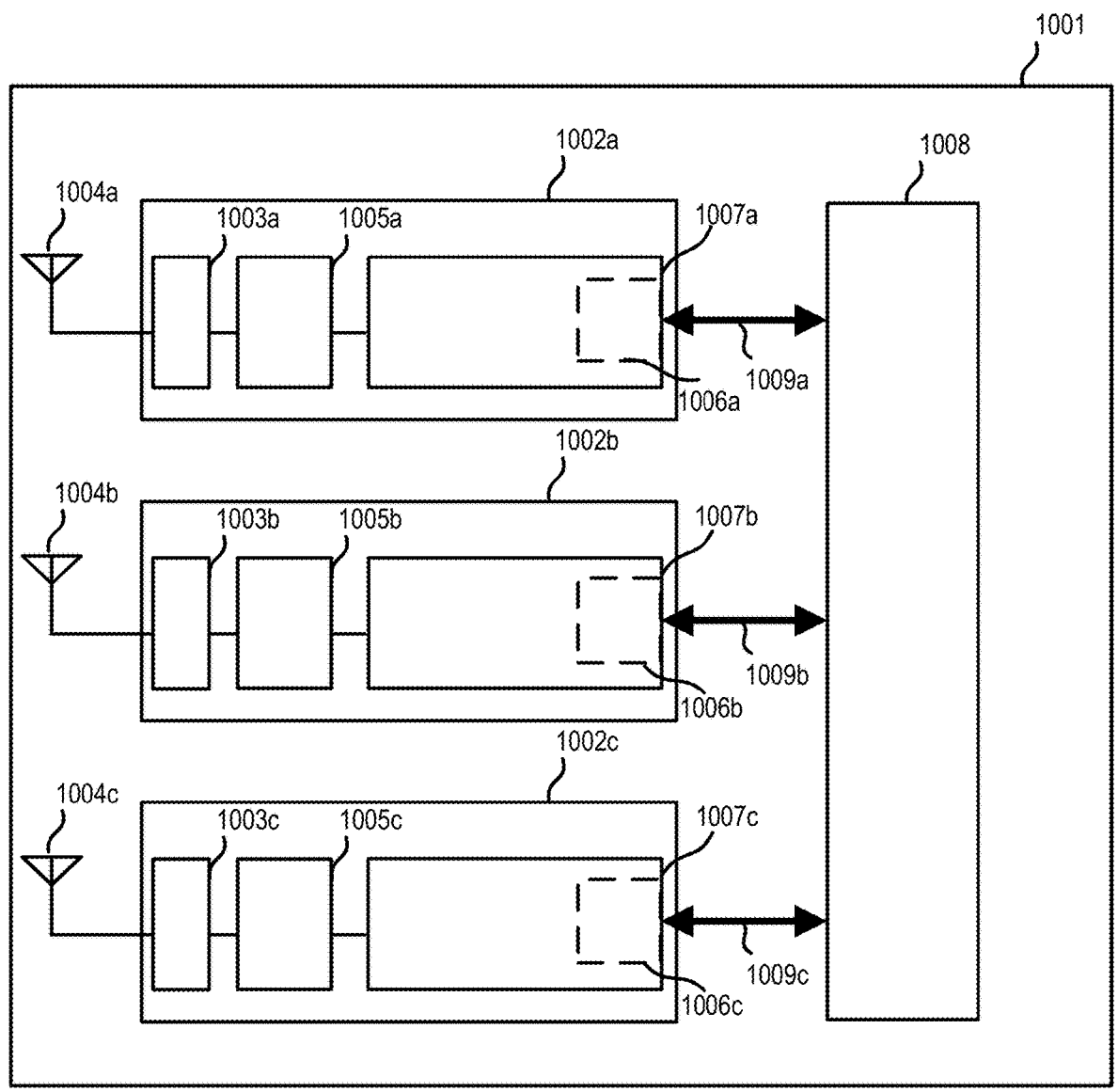
FIG. 10 shows schematically an example of a communication device in accordance with various aspects of this disclosure.

FIG. 10 shows schematically an example of a communication device in accordance with various aspects of this disclosure. The communication device 1001 may include a plurality of radioheads. 1002a, 1002b, 1002c. In an example, the plurality of radioheads includes a plurality of radioheads which are referred in accordance with FIG. 9. In an example, the communication device 1001 includes a first radiohead 1002a, a second radiohead 1002b, and a third radiohead 1002c.

The first radiohead 1002a may include an antenna interface 1003a. The antenna interface 1003a may be connected to an antenna 1004a. The antenna interface 1003a may provide an interface between the antenna 1004a and a radio frequency front end 1005a. In an example, the antenna interface 1003a may include a port or a socket to receive a communication signal. The radio frequency front end 1005a may receive a wireless communication signal via the antenna interface.

The first radiohead circuit 1002a may further include a communication interface module 1006a, and one or more processors 1007a coupled to the communication interface module 1006a. The communication interface module 1006a may be configured to couple the one or more processors 1007a of the first radiohead 1002a to one or more radiohead external processors external to the first radiohead 1002a. In an example, the one or more radiohead external processors may include one or more communication device processors.

The second radiohead 1002b may include an antenna interface 1003b. The antenna interface 1003b may be connected to an antenna 1004b. The antenna interface 1003b may provide an interface between the antenna 1004b and a radio frequency front end 1005b. In an example, the antenna interface 1003b may include a port or a socket to receive a communication signal. The radio frequency front end 1005b may receive a wireless communication signal via the antenna interface.

The second radiohead circuit 1002b may further include a communication interface module 1006b, and one or more processors 1007b coupled to the communication interface module 1006b. The communication interface module 1006b may be configured to couple the one or more processors 1007b of the second radiohead 1002b to one or more radiohead external processors external to the second radiohead 1002b. In an example, the one or more radiohead external processors may include one or more communication device processors.

The third radiohead 1002*c* may include an antenna interface 1003*c*. The antenna interface 1003*c* may be connected to an antenna 1004*c*. The antenna interface 1003*c* may provide an interface between the antenna 1004*c* and a radio frequency front end 1005*c*. In an example, the antenna interface 1003*c* may include a port or a socket to receive a communication signal. The radio frequency front end 1005*c* may receive a wireless communication signal via the antenna interface.

The third radiohead circuit 1002*c* may further include a communication interface module 1006*c*, and one or more processors 1007*c* coupled to the communication interface module 1006*c*. The communication interface module 1006*c* may be configured to couple the one or more processors 1007*c* of the third radiohead 1002*c* to one or more radiohead external processors external to the third radiohead 1002*c*. In an example, the one or more radiohead external processors may include one or more communication device processors.

Accordingly, the communication device 1001 may further include one or more communication device processors 1008. In this example, the one or more communication device processors 1008 are coupled to each of the one or more processors of radioheads via respective separate digital interface elements 1009*a*, 1009*b*, 1009*c*. In an example, the one or more communication device processors 1008 may be coupled to one digital interface, wherein the digital interface may include a bus-like communication interface, which couples the one or more communication device processors 1008 with a plurality of radioheads 1002*a*, 1002*b*, 1002*c*.

In this example, the one or more communication device processors 1008 are coupled to the first radiohead 1002*a* via the first communication interface module 1006*a*. The one or more communication device processors 1008 are coupled to the second radiohead 1002*b* via the second communication interface module 1006*b*. The one or more communication device processors 1008 are coupled to the third radiohead 1002*c* via the third communication interface module 1006*c*.

Figure 11:
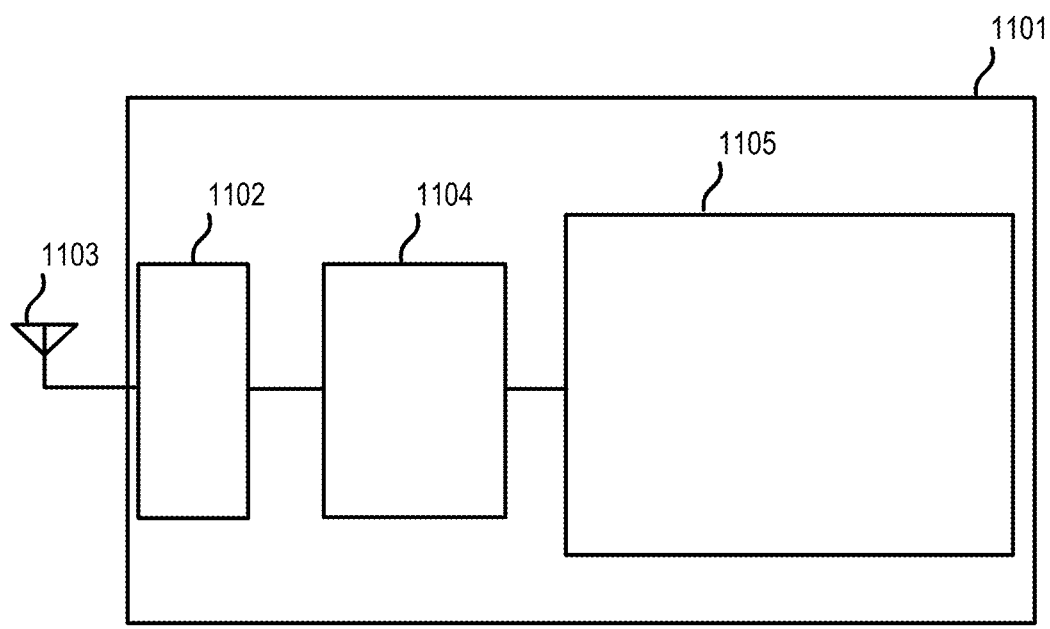
FIG. 11 shows schematically an example of a radiohead in accordance with various aspects of this disclosure.

FIG. 11 shows schematically an example of a radiohead in accordance with various aspects of this disclosure. The radiohead 1101 may include an antenna interface 1102. The antenna interface 1102 is coupled to an antenna 1103. The radiohead 1101 further includes a radio frequency front end 1104. In this example, the radio frequency front end 1104 is coupled to one or more processors 1105. In an example, the radio frequency front end 1104 may be coupled to one or more processors via a transceiver circuit in between.

The one or more processors 1105 may perform a signal detection to determine whether a received signal includes a communication signal which may be an interest to the radiohead 1101, or alternatively to a communication device. In an example, the signal detection includes a preamble detection to detect an existence of a predefined preamble of a signal.

Accordingly, the radiohead 1101 receives a signal via the antenna 1103. The antenna provides the signal to the antenna interface 1102. The antenna interface receives the signal from the antenna 1103 and provides the signal to the radio frequency front end 1104. In an example, the radio frequency front end 1104 may include a signal detecting circuit to perform a signal detection in accordance with various aspects of this disclosure.

In accordance with various aspects of this disclosure, the one or more processors 1105 may perform an initial signal detection to detect if a wireless communication signal has been received. In an example, the one or more processors 1105 may perform an initial signal detection to detect if a wireless communication signal has been received based on whether the signal which the radio frequency front end 1104 received fulfills one or more predefined criteria. Accordingly, in an example, the radiohead 1101 may determine that the signal which the radio frequency front end 1104 has been received is a wireless communication signal based on the initial signal detection.

In an example, the one or more processors 1105 may receive the signal from the radio frequency front end 1104, and perform the initial detection to detect if a wireless communication signal has been received based on whether the signal the one or more processors 1105 received from the radio frequency front end 1104 fulfills one or more predefined radiohead detection criteria.

In an example, the one or more processors 1105 may include a portion or a circuit to process the signal which may be an analog signal to perform the initial signal detection. In an example, the one or more processors 1105 may include a portion or a circuit to perform measurements on the signal to perform the initial detection. In an example, the one or more processors 1105 may include a portion or a circuit to perform calculations related to the signal to perform the initial signal detection.

In an example, the radiohead 1101 may include a transceiver chain, and the one or more processors 1105 may receive a digital signal related to the signal which the radio frequency front end 1104 receives from the transceiver chain. In this example, the transceiver chain may include an analog-to-digital converter to convert the analog signal to a digital signal.

Further, the one or more processors 1105 may generate an initial signal detection information based on the initial signal detection. In an example, the one or more processors 1105 may generate the initial signal detection information, and the initial signal detection information may include an information as to whether the wireless communication signal has been received based on the initial signal detection.

In an example, the initial signal detection information may include the result of performed initial detection. In an example, the initial detection information may include an information related to the measurements which the one or more processors 1105 performed on the signal. In an example, the initial detection information may include an information related to the calculations that the one or more processors 1105 have performed related to the signal.

In an example, the initial detection information may include at least one metric related to the signal which the radio frequency front end 1104 receives. In an example, the at least one metric includes an information related to the correlation of the signal with a reference signal. In an example, the at least one metric includes an information related to the autocorrelation of the signal. In an example, the at least one metric includes an information related to the signal quality or the signal strength of the signal.

Furthermore, the one or more processors 1105 may be coupled to a communication interface. The one or more processors 1105 may provide the generated initial detection information to the communication interface. In an example, the one or more processors 1105 may include a communication interface module coupled to the communication interface. In an example, the communication interface may provide communication between the one or more processors 1105 and the one or more radiohead external processors which are external to the radiohead 1101. In an example, the one or more processors 1105 may provide the initial signal detection information for a final signal detection. In an example, the one or more radiohead external processors include one or more communication device processors.

In an example, the one or more processors 1105 may generate the initial detection information when the one or more processors 1105 detect that a signal which the radio frequency front end 1104 receives fulfills one or more predefined radiohead detection criteria. In an example, the one or more processors 1105 do not generate an initial signal detection information, if the signal which the radio frequency front end 1104 receives does not fulfill the one or more defined radiohead detection criteria.

In an example, the radiohead 1101 may receive an initial signal detection information request signal. The radiohead 1101 may receive the initial signal detection information request signal from the communication interface. In an example, one or more communication device processors may provide the initial signal detection information request signal to the one or more processors 1105 of the radiohead 1101 via the communication interface.

In an example, the communication interface may operate in a low power mode. In an example, the low power mode may include a sleep mode. In this example, the one or more processors 1105 may send an indication to the communication interface to wake up the communication interface from the low power mode. In an example, the one or more processors 1105 may send the indication when the one or more processors 1105 detect that signal which the radio frequency front end 1104 receives fulfills one or more predefined radiohead detection criteria.

In an example, the one or more radiohead external processors may operate in a low power mode. In an example, the low power mode may include a sleep mode. In this example, the one or more processors 1105 may send an indication to the communication interface to wake up the one or more radiohead external processors from the low power mode. In an example, the one or more processors 1105 may send the indication when the one or more processors 1105 detect that signal which the radio frequency front end 1104 receives fulfills one or more predefined radiohead detection criteria. In an example, the one or more radiohead external processors include one or more communication device processors which the one or more radiohead processors are coupled to via the communication interface.

In an example, the one or more processors 1105 may calculate an autocorrelation of the signal which the radio frequency front end 1104 receives. In an example, the radiohead 1101 may include a module to calculate the autocorrelation of the signal. In an example, the one or more processors 1105 may control the module to calculate the autocorrelation of the signal and may receive the result of the calculation of the autocorrelation of the signal. In an example, the module to calculate the autocorrelation of the signal may include a delay circuit, a conjugate computation element and a multiplier that, in combination, serve as an autocorrelation module.

In an example, the one or more processors 1105 may calculate a signal strength of the signal which the radio frequency front end 1104 receives. In an example, the radiohead 1101 may include a module to calculate the signal strength of the signal. In an example the one or more processors 1105 may control the module to calculate the signal strength of the signal and may receive the result of the calculation of the signal strength of the signal.

In an example, the module to calculate the signal strength in accordance with various aspects of this disclosure may include the calculation of at least one of the reference signal received power (RSRP, Reference Signal Received Power), signal to interference plus noise ratio (SINR, Signal to Interference plus Noise Ratio), and Receive Signal Strength Indicator (RSSI, Received Signal Strength Indicator), Reference Signal Received Quality (RSRQ, Reference Signal Received Quality).

Figure 12:
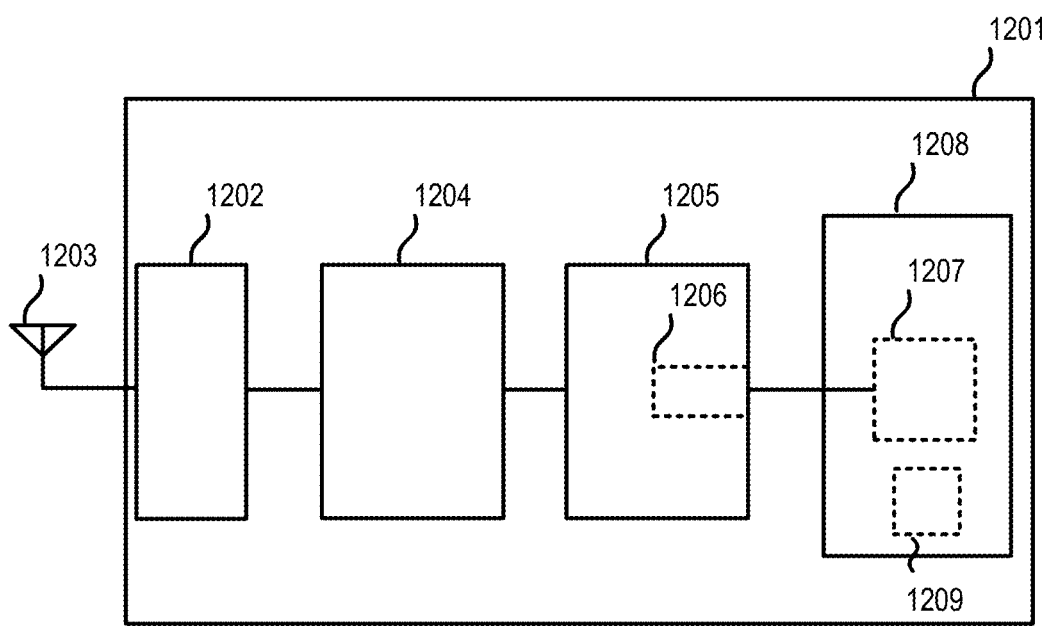
FIG. 12 shows schematically an example of a radiohead in accordance with various aspects of this disclosure.

FIG. 12 shows schematically an example of a radiohead in accordance with various aspects of this disclosure. The radiohead 1201 may include an antenna interface 1202 coupled to an antenna 1203. The radiohead 1201 further includes a radio frequency front end 1204. The radio frequency front end 1204 is coupled to the RF transceiver chain 1205. The RF transceiver chain 1205 includes a local oscillator and a mixer to convert the signal which the radio frequency front end 1204 provides to a baseband signal.

The RF transceiver chain 1205 further includes an analog-to-digital converter 1206 to convert the down-converted analog signal to a digital signal. The analog-to-digital converter 1206 may provide the signal to an initial signal detector module 1207. In an example, the radiohead 1201 includes one or more processors 1208. In an example, the one or more processors may include the initial signal detector module 1207.

Figure 13:
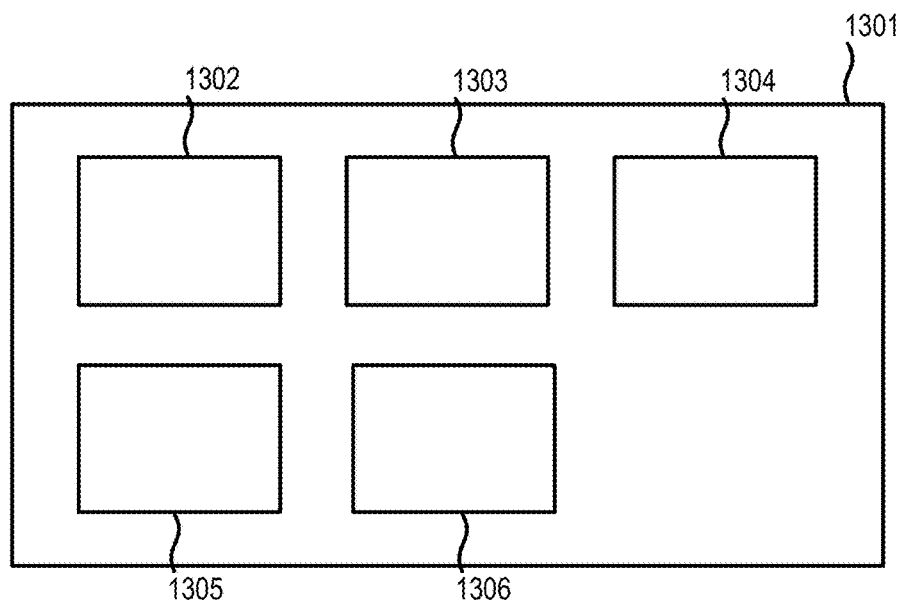
FIG. 13 shows schematically an example of an initial signal detector module in accordance with various aspects of this disclosure.

FIG. 13 shows schematically an example of an initial signal detector module in accordance with various aspects of this disclosure. The initial signal detector module 1301 may perform an initial signal detection to detect if a wireless communication signal has been received based on whether a signal fulfills one or more predefined radiohead detection criteria. In an example, the one or more predefined radiohead detection criteria may be stored in a memory which the initial signal detector 1301 module may access.

In an example, the initial signal detector module 1301 may receive the one or more predefined radiohead detection criteria from one or more radiohead external processors. In an example, the initial signal detector module 1301 may include a communication module 1302 to receive the one or more predefined radiohead detection criteria from one or more radiohead external processors. In an example, the one or more radiohead external processors may include one or more communication device processors which the one or more processors of the radiohead are coupled to.

The initial signal detector module 1301 may detect whether the received signal fulfills the one or more predefined radiohead detection criteria. A skilled person would appreciate that the initial signal detector module 1301 may employ any initial signal detection mechanism based on the type and the features of the signal which may be an interest to the radiohead or the communication device which includes the radiohead. In an example, the initial signal detector module 1301 may detect an existence of a predefined preamble of the signal.

In an example, the initial signal detector module 1301 may include a signal measurement module 1303 to measure at least one feature of the signal. In an example, the signal measurement module 1303 may measure the signal and provide a measurement information related to a performed signal measurement to other modules of the initial signal detector module 1301. In an example, the signal measurement module 1303 may provide the measurement information to one or more processors of the radiohead. In an example, the signal measurement module 1303 may provide the measurement information to one or more radiohead external processors.

In this example, the initial signal detector module 1301 may include an autocorrelation module 1304 to calculate an autocorrelation of a signal. In an example, the autocorrelation module 1304 may receive a signal and the autocorrelation module 1304 may calculate the autocorrelation of the received signal. Commonly, a preamble of a communication signal may have a high degree of autocorrelation due to the repeating patterns in the preamble. Accordingly, a high degree of autocorrelation may refer to a metric to be used as a predefined radiohead detection criteria.

The initial signal detector module 1301 may further include a signal strength module 1305 to calculate a signal strength of the signal. In an example, the signal strength module 1305 may receive a signal and the signal strength module 1305 may calculate the signal strength of the received signal. In an example, the predefined radiohead detection criteria may further include a metric related to the signal strength.

The initial signal detector module 1301 may also include more modules which may be related to a feature related to the received signal. In an example, the initial signal detector 1301 module may include a correlator module to calculate a cross-correlation of the signal with respect to a reference signal. In an example, the initial signal detector module 1301 may receive the reference signal information from one or more radiohead external processors. In an example, the one or more radiohead external processors may include one or more communication device processors.

The initial signal detector module 1301 further includes a determiner to determine for the initial signal detector module 1301 if a wireless communication signal has been received based on at least one feature of the signal. The initial signal detector module 1301 may detect if a wireless communication signal has been received based on whether the signal fulfills one or more predefined radiohead detection criteria.

The determiner 1306 may receive information from other modules of the initial signal detector module 1301, which the information may relate to a feature of the signal. In this example, the determiner 1306 may receive a calculated autocorrelation information of the signal from the autocorrelation module 1304. Further, the determiner 1306 may receive a calculated signal strength information of the signal from the signal strength module 1305. The determiner 1306 may determine if the wireless communication signal has been received based on the calculated autocorrelation of the signal and the calculated signal strength of the signal.

In an example, the determiner 1306 may calculate a mathematical function based on the calculated autocorrelation of the signal and the calculated signal strength of the signal. In an example, the determiner 1306 may determine if the wireless communication signal has been received based on the mathematical function based on the calculated autocorrelation of the signal and the calculated signal strength of the signal.

In an example, the determiner 1306 may calculate a detection ratio based on the calculated autocorrelation of the signal and the calculated signal strength of the signal. In an example the determiner 1306 may calculate the detection ratio as the ratio of the calculated autocorrelation of the signal to the calculated signal strength of the signal. Accordingly, the determiner 1306 may determine that the wireless communication signal has been received if the detection ratio is above a predefined threshold. Alternatively, the determiner 1306 may determine that the wireless communication signal has not been received if the detection ratio is above a predefined threshold.

The determiner 1306 may further include a generating function to generate an initial signal detection information based on the initial signal detection in the initial signal detector module 1301. In an example, the initial signal detection information may include an information as to whether the wireless communication signal has been received based on the initial signal detection. In an example, the determiner 1306 may generate the initial signal detection information based on its determination.

In an example, the determiner 1306 may generate the initial signal detection information based on the calculated signal strength of the signal, and/or the calculated autocorrelation of the signal. In an example, the initial signal detection information may include the information which the determiner 1306 receives from other modules of the initial signal detector module 1301. In an example, the information which the determiner 1306 receives from other modules of the initial signal detector module 1301 includes at least one information which may relates to a feature of the signal.

In an example, the initial signal detection information includes the calculated autocorrelation information. In an example, the initial signal detection information includes the calculated signal strength information. In an example, the initial signal detection information includes the calculated mathematical function information based on the calculated autocorrelation and the calculated signal strength. In an example, the initial signal detection information includes the ratio information of the calculated autocorrelation and the calculated signal strength.

In an example, the initial signal detection information may include at least one of the calculated autocorrelation information of the received wireless communication signal, and/or the calculated signal strength information of the received wireless communication signal, and/or the calculated mathematical function information based on the calculated autocorrelation of the received wireless communication signal and the calculated signal strength of the received wireless communication signal, and/or the ratio information of the calculated autocorrelation of the wireless communication signal and the calculated signal strength of the wireless communication signal.

In an example, the determiner 1306 may generate the initial signal detection information if the determiner 1306 determines that the wireless communication signal has been received. In an example, the determiner 1306 does not generate the initial signal detection information if the determiner 1306 does not determine that the wireless communication has been received.

Referring back to FIG. 12, in an example, the one or more processors may include a communication module 1209 to control the communication between the radiohead 1201 and radiohead external units. In an example, the radiohead external units may include one or more radiohead external processors external to the radiohead 1201. In an example, the radiohead external units may include one or more communication device processors.

The communication module 1209 may be coupled to the communication interface. The communication module 1209 may include a communication interface module in accordance with various aspects of this disclosure. In an example, the communication interface may include a digital interface. In an example, the communication interface includes a serial digital interface. In an example, the communication interface may include a serial time encoded protocol (STEP) interface.

In an example, the communication module 1209 may control the communication through the communication interface. In an example, the communication module 1209 may control the communication between the one or more processors and the one or more radiohead external processors external to the radiohead 1201. In an example, the communication module 1209 may control the communication between the one or more processors 1208 and the one or more communication device processors.

The communication interface which the radiohead 1201 is coupled to may operate in a low power mode. In an example, the one or more communication device processors control the communication interface to operate the communication interface in the low power mode. In an example, the communication interface has a limited capability to provide communication. In an example, the communication module 1209 may send an indication to the communication interface to wake up the communication interface from the low power mode. In an example, the communication interface does not provide communication to the radiohead 1201 in the low power mode.

The communication module 1209 may provide the initial signal detection information which the initial signal detector module generates to the communication interface. In an example, the communication module 1209 may provide the initial signal detection information to the communication interface to send the initial signal detection information to one or more radiohead external processors. In an example, the one or more radiohead external processors include one or more communication device processors. In an example, the communication module 1209 may further include the signal generating function which has been referred to for the determiner of the initial signal detector referred in FIG. 13, instead of the determiner.

The communication module 1209 may provide the initial signal detection information to the communication interface for a final signal detection. In an example, one or more radiohead external processors may perform the final signal detection. In an example, the communication module 1209 may receive an initial signal detection information request signal. The communication module 1209 may provide the initial signal detection information to the communication interface in response to the receiving the initial signal detection information request signal.

In an example, the communication module 1209 may receive the initial signal detection information request signal and receive the initial signal detection information from a memory. In an example, the communication module 1209 may send a request to the initial signal detector module to receive the initial signal detection information from the initial signal detector module. In an example, the initial signal detector module may provide the initial signal detection information in response to receiving the request from the communication module 1209.

Figure 14:
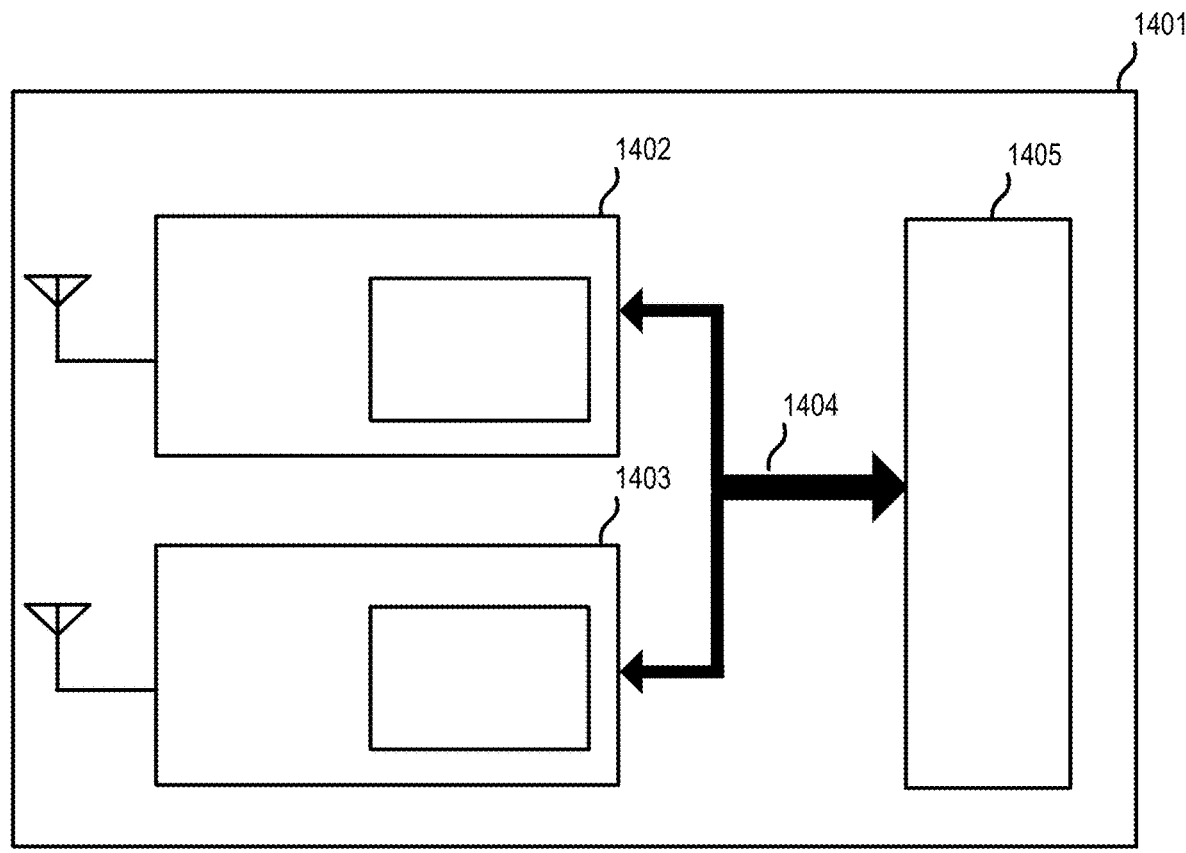
FIG. 14 shows schematically an example of a communication device including a plurality of radioheads.

FIG. 14 shows schematically an example of a communication device including a plurality of radioheads. The communication device 1401 includes a plurality of radioheads 1402, 1403 in accordance with various aspects of this disclosure. The communication device 1401 further includes a communication interface 1404 and one or more communication device processors 1405. The communication interface 1404 may provide communication between the one or more communication device processors 1405 and each of the plurality of radioheads 1402, 1403.

The one or more communication device processors 1405 are coupled to the communication interface 1404. In an example, the communication interface 1404 may include a digital interface. In an example, the communication interface 1404 includes a serial digital interface. In an example, the communication interface 1404 may include a serial time encoded protocol (STEP) interface.

The plurality of radioheads 1402, 1403 in accordance with various aspects of this disclosure includes a first radiohead 1402 and a second radiohead 1403. The first radiohead 1402 and the second radiohead 1403 may especially include the radiohead as referred in FIG. 11 and/or FIG. 12.

The first radiohead 1402 and the second radiohead 1403 are coupled to the communication interface 1404. In this example, the communication interface 1404 includes a bus-like structure in which all of the radioheads 1402, 1403 and the one or more communication device processors 1405 are coupled to the same structure. In an example, each of the plurality of radioheads 1402, 1403 may be coupled to a communication interface element which couples each of the plurality of radioheads 1402, 1403 to the one or more communication device processors 1405. In that structure, the communication interface 1404 includes each of the communication interface elements.

In an example, the communication device 1401 may support diversity combining. In other words, the communication device 1401 may receive a first communication signal, and a second communication signal, and combine the first communication signal, and the second communication signal with a diversity combining method to obtain a combined communication signal.

In an example, the communication device 1401 may use maximal ratio combining to combine the first communication signal and the second communication signal. In another example, the communication device 1401 may use equal-gain combining to combine the first communication signal and the second communication signal. In another example, the communication device 1401 may use switched combining to combine the first communication signal and the second communication signal. In another example, the communication device 1401 may use selection combining to combine the first communication signal and the second communication signal.

Accordingly, the one or more communication device processors 1405 may receive the wireless communication signal which has been received by the first radiohead 1402. The one or more communication device processors 1405 may receive the wireless communication signal which has been received by the second radiohead 1403. The one or more communication device processors 1405 may combine the wireless communication signals which have been received by the first radiohead 1402 and the second radiohead 1403 to obtain a combined wireless communication signal.

In an example, the one or more communication device processors 1405 may perform a final signal detection based on a plurality of initial signal detection information. The one or more communication device processors 1405 receive the plurality of initial signal detection information from the plurality of radioheads 1402, 1403 which the one or more communication device processors 1405 are coupled to. In an example, the one or more communication device processors 1405 receive the initial signal detection information from each of the plurality of radioheads 1402, 1403, and the one or more communication device processors 1405 perform the final signal detection based on the initial signal detection information from the plurality of radioheads 1402, 1403.

In an example, the one or more communication device processors 1405 may include modules similar to the one or more processors of a radiohead in accordance with various aspects of this disclosure. In an example, the one or more communication device processors 1405 may include a final signal detector module, similar to an initial signal detector module of a radiohead in accordance with various aspects of this disclosure. In an example, the one or more communication device processors 1405 may perform the final detection based on the initial signal detection information which the one or more communication device processors 1405 receive from the first radiohead 1402 and the second radiohead 1403.

The first radiohead 1402 performs an initial detection to detect if a wireless communication signal has been received based on whether a signal the one or more processors received from the radio frequency front end fulfill one or more predefined radiohead detection criteria for the first radiohead 1402, generates an initial signal detection information including an information as to whether the wireless communication signal has been received based on the initial signal detection; and provides the initial signal detection information to the communication interface 1404 for a final signal detection in accordance with various aspects of this disclosure.

Similarly, the second radiohead 1403 performs an initial detection to detect if a wireless communication signal has been received based on whether a signal the one or more processors received from the radio frequency front end fulfill one or more predefined radiohead detection criteria, generates an initial signal detection information including an information as to whether the wireless communication signal has been received based on the initial signal detection, and provides the initial signal detection information to the communication interface 1404 for a final signal detection in accordance with various aspects of this disclosure.

The one or more communication device processors 1405 receive the initial signal detection information of the first radiohead 1402 from the first radiohead 1402 via the communication interface 1404. The one or more communication device processors 1405 receive the initial signal detection information of the second radiohead 1403 from the second radiohead 1403 via the communication interface 1404.

In an example, the one or more communication device processors 1405 receive the initial signal detection information of the first radiohead 1402, when the first radiohead 1402 detects that the wireless communication signal has been received. In an example, the one or more communication device processors 1405 receive the initial signal detection information of the second radiohead 1403, when the second radiohead 1403 detects that the wireless communication signal has been received.

Accordingly, when there is an initial detection of the wireless communication signal at the first radiohead 1402 and the second radiohead 1403, the one or more communication device processors 1405 receive the initial signal detection information of the first radiohead 1402 and the initial signal detection information of the second radiohead 1403. The one or more communication device processors 1405 perform the final signal detection to whether the communication device 1401 receives the wireless communication signal using the initial signal detection information of the first radiohead 1402, and the initial signal detection information of the second radiohead 1403.

Figure 15:
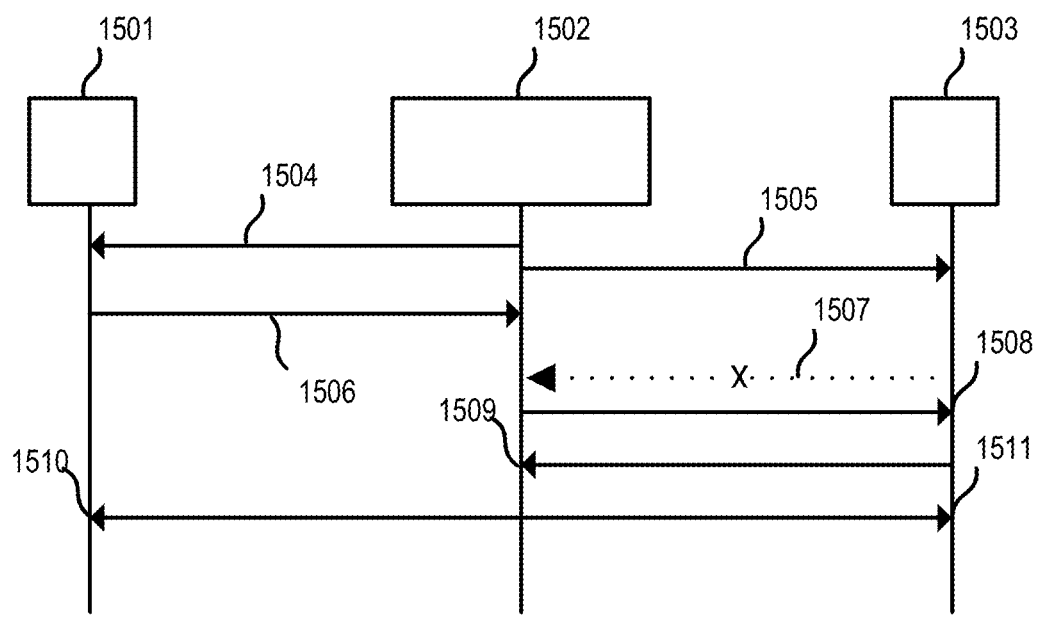
FIG. 15 shows schematically an example of a communication flow in accordance with various aspects of this disclosure.

FIG. 15 shows schematically an example of a communication flow in accordance with various aspects of this disclosure. The communication flow shows the communication flow between a first radiohead 1501, a second radiohead 1502, and one or more communication device processors of a communication device 1503, which the communication device includes the first radiohead 1501 and the second radiohead 1502. In this example, the one or more communication device processors 1503 do not receive the initial signal detection information from the second radiohead 1502. In an example, the one or more communication device processors 1503 may not receive the initial signal detection information, because the second radiohead 1502 may not determine that the wireless communication signal has been received.

Initially, the one or more communication device processors 1503 may send a first configuration information 1504 to the first radiohead 1501 which may include a first predefined radiohead detection criteria. Further, the one or more communication device processors 1503 may send a second configuration information 1505 to the second radiohead 1502 which may include a second predefined radiohead detection criteria.

The first radiohead 1501 sends a first initial signal detection information 1506 to the one or more communication device processors 1503, however, the one or more communication device processors 1503 do not receive 1507 any initial signal detection information from the second radiohead 1502. Accordingly, the one or more communication device processors 1503 send an initial detection information request signal 1508 to the second radiohead 1502 to request the initial detection information from the second radiohead 1502.

When the second radiohead 1502 receives the initial detection information request signal 1508, the second radiohead 1502 sends a second initial signal detection information 1509 to the one or more communication device processors 1503. Upon receiving the first initial signal detection information and the second initial signal detection information, the one or more communication device processors 1503 perform the final signal detection and provide final signal detection information 1510, 1511 to the first radiohead 1501 and the second radiohead 1502.

Referring back to FIG. 14 in an example, the one or more communication device processors 1405 receive the initial signal detection information from the first radiohead 1402, however, the one or more communication device processors 1405 do not receive the initial signal detection information from the second radiohead 1403. In an example, the one or more communication device processors 1405 determine that an initial signal detection information has not been received based on a countdown timer relative to the other received initial signal detection information.

Accordingly, the one or more communication device processors 1405 send an initial signal detection information request signal to request the initial signal detection information from the second radiohead 1403. In an example, the communication interface 1404 which couples the one or more communication device processors 1405 to the second radiohead 1403 may operate in a low power mode. The one or more communication device processors 1405 may send a wake up indication to the communication interface 1404 of the first radiohead 1402.

In an example, the one or more communication device processors 1405 receive the initial signal detection information from the second radiohead 1403, however, the one or more communication device processors 1405 do not receive the initial signal detection information from the first radiohead 1402. In an example, the one or more communication device processors 1405 determine that an initial signal detection information has not been received based on a countdown timer relative to the other received initial signal detection information.

Accordingly, the one or more communication device processors 1405 send an initial signal detection information request signal to request the initial signal detection information from the first radiohead 1402. In an example, the communication interface 1404 which couples the one or more communication device processors 1405 to the first radiohead 1402 may operate in a low power mode. The one or more communication device processors 1405 may send a wake up indication to the communication interface 1404 of the second radiohead 1403.

In an example, the one or more communication device processors 1405 perform the final signal detection when the one or more communication device processors 1405 receive at least the initial detection information of the first radiohead 1402, and the initial signal detection information of the second radiohead 1403. In an example, the one or more communication device processors 1405 perform the final signal detection when the one or more communication device processors 1405 receive the initial detection information from all of the plurality of radioheads 1402, 1403.

In an example, the initial signal detection information of the first radiohead 1402 includes the calculated autocorrelation information of the first radiohead 1402, and the calculated signal strength of the first radiohead 1402. The initial signal detection information of the second radiohead 1403 includes the calculated autocorrelation information of the second radiohead 1403, and the calculated signal strength of the second radiohead 1403.

The one or more communication device processors 1405 calculate a mathematical function based on the calculated autocorrelation information of the first radiohead 1402, the calculated signal strength of the first radiohead 1402, the calculated autocorrelation information of the second radiohead 1403, and the calculated signal strength of the second radiohead 1403 to determine whether the wireless communication signal has been received.

In an example, the one or more communication device processors 1405 sum the calculated autocorrelation information of the first radiohead 1402 and the calculated autocorrelation information of the second radiohead 1403 based on the initial signal detection information of the first radiohead 1402 and the second radiohead 1403. In an example, the one or more communication device processors 1405 sum the calculated signal strength of the first radiohead 1402 and the calculated signal strength of the second radiohead 1403 based on the initial signal detection information of the first radiohead 1402 and the second radiohead 1403 to determine whether the wireless communication signal has been received.

In an example, the one or more communication device processors 1405 calculate a final detection ratio by dividing the sum of the calculated autocorrelation information of the first radiohead 1402 and the calculated autocorrelation information of the second radiohead 1403 to the sum of the calculated signal strength of the first radiohead 1402 and the calculated signal strength of the second radiohead 1403. In an example, the one or more communication device processors 1405 determine for the final signal detection if the final detection ratio is above a predefined final detection threshold.

In an example, the one or more communication device processors 1405 receive a first wireless signal which the first radiohead 1402 determined that the wireless communication signal has been received based on the one or more predefined radiohead detection criteria, and a second wireless signal which the second radiohead 1403 determined that the wireless communication signal has been received based on the one or more predefined radiohead detection criteria. Accordingly, the one or more communication device processors 1405 may combine the first wireless signal and the second wireless into a combined wireless communication signal.

In an example, the one or more communication device processors 1405 may perform a diversity combining function to combine the wireless communication signal which the first radiohead 1402 receives, and the wireless communication signal which the second radiohead 1403 receives based on the determination that the wireless communication signals have been received by the first radiohead 1402 and the second radiohead 1403.

In an example, the one or more communication device processors 1405 may perform the final signal detection related to a feature related to the combined wireless communication signal in accordance with various aspects of this disclosure similar to the initial signal detection performed by one of the radioheads, and determine that the combined wireless communication signal has been received based on at least one feature of the signal. The one or more communication device processors 1405 may detect if the combined wireless communication signal has been received based on whether the combined wireless communication signal fulfills one or more predefined communication device detection criteria. The one or more communication device processors 1405 may receive information which may relate to a feature of the combined wireless communication signal.

In an example, a radiohead may include a computer-readable medium including instructions stored thereon, that if executed by one or more processors, implement a method including: performing an initial signal detection to detect if a wireless communication signal has been received based on whether a signal the one or more processors received from a radio frequency front end fulfill one or more predefined radiohead circuit detection criteria; generating an initial signal detection information including an information as to whether the wireless communication signal has been received based on the initial signal detection; and providing the initial signal detection information to a communication interface for a final signal detection; the communication interface configured to couple the one or more processors to one or more radiohead circuit-external processors external to the radiohead circuit.

In accordance with various aspects of this disclosure, a device, in particular a communication device may include a memory, and one or more processors, such as processing circuitry 810 and memory 820 referring back to FIG. 8. The memory 820 may be implemented as one or more computer-readable medium including one or more instructions that when executed on at least one processor implement a method including performing an initial signal detection to detect if a wireless communication signal has been received based on whether a signal the one or more processors received from a radio frequency front end fulfill one or more predefined radiohead circuit detection criteria; generating an initial signal detection information including an information as to whether the wireless communication signal has been received based on the initial signal detection; and providing the initial signal detection information to a communication interface for a final signal detection; the communication interface configured to couple the one or more processors to one or more radiohead circuit-external processors external to the radiohead circuit.

Figure 16:
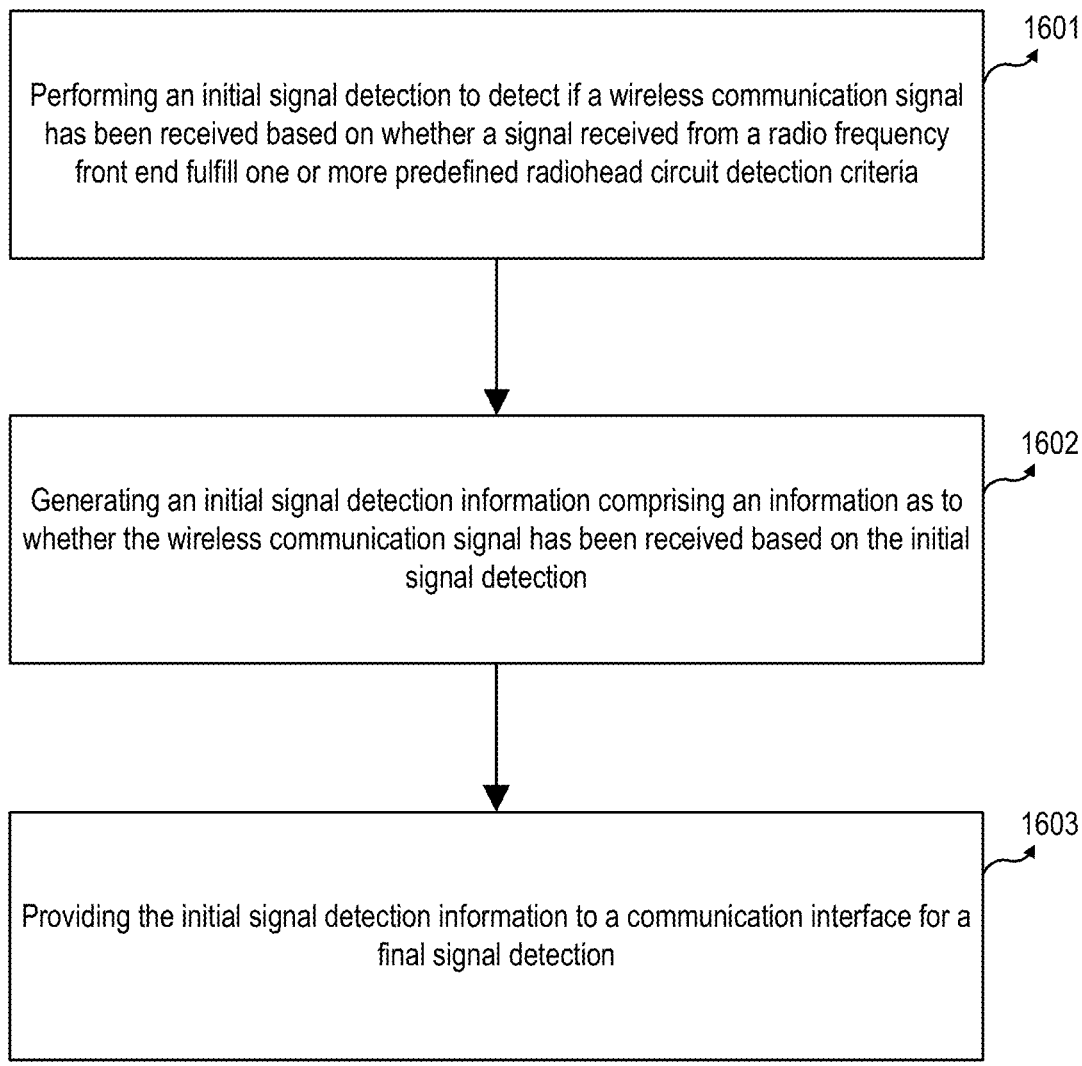
FIG. 16 shows schematically an example of method steps in accordance with various aspects of this disclosure.

FIG. 16 shows schematically an example of method steps in accordance with various aspects of this disclosure. The method may include performing an initial signal detection to detect if a wireless communication signal has been received based on whether a signal received from a radio frequency front end fulfill one or more predefined radiohead circuit detection criteria, generating an initial signal detection information including an information as to whether the wireless communication signal has been received based on the initial signal detection, and providing the initial signal detection information to a communication interface for a final signal detection.

The remote nature of a radiohead with respect to one or more processors of the communication device may also result to latency problems especially for the communication signal for which the radiohead includes only a portion of the required processing to provide the data in the communication signal for upper layers of the communication model in accordance with various aspects of this disclosure.

One of the examples with respect to the above-mentioned issue may include a radiohead which includes a portion of the transceiver chain. In an example, the transceiver chain may include a time-domain processing physical (TD PHY) portion and a frequency-domain processing physical (FD PHY) portion. The portion of the transceiver chain of the radiohead may include the TD PHY portion. The FD PHY portion may be external to the radiohead and remotely located. In an example, the communication device which includes the radiohead may include one or more communication device processors. The one or more communication device processors may include the FD PHY portion. FD PHY portion and the TD PHY portion may be connected via a communication interface.

Accordingly, due to the remote nature of the radiohead, the radiohead may rely on the one or more communication device processors to decode the wireless communication signal, and in certain processes which may need very demanding response times, especially when the decoded data is related to a configuration related to the TD PHY portion, or the radiohead itself, and the radiohead should perform an operation promptly based on the decoded wireless communication signal.

One of the examples which may refer to an operation that the radiohead should promptly perform based on the decoded wireless communication signal may include the detection of the wireless communication signal and performing a power estimation using a portion of the wireless communication signal. Especially, when the process of detecting the wireless communication signal uses the FD PHY portion and the process of detecting the wireless communication signal is temporally close to the receiving of the portion of the wireless communication signal, the radiohead may even miss the portion of the wireless communication signal, if the FD PHY portion does not provide an indication on time with respect to the portion of the wireless communication signal, which the TD PHY portion may need to perform the power estimation.

Figure 17:
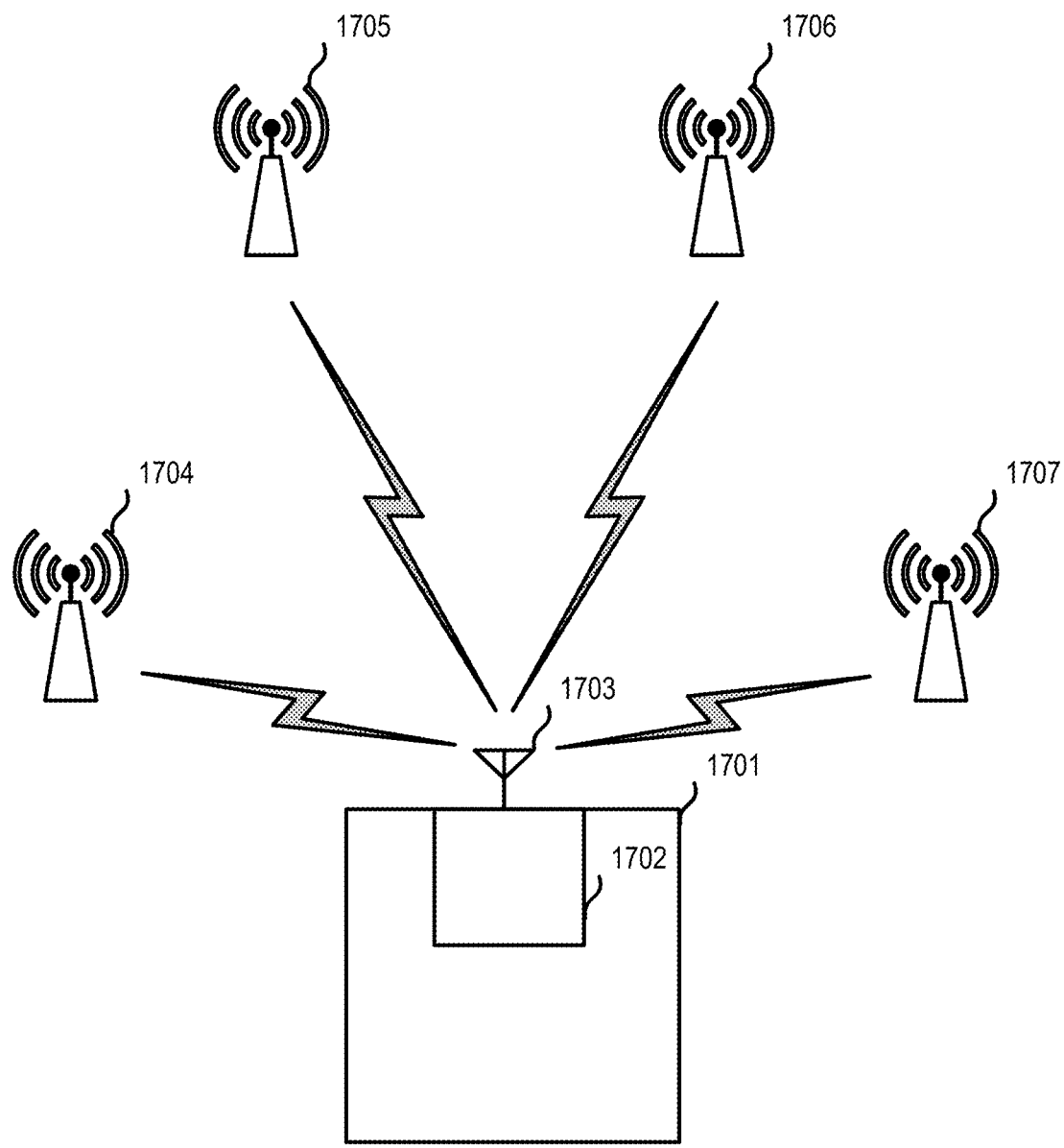
FIG. 17 shows schematically an example of a communication environment in accordance with various aspects of this disclosure.

FIG. 17 shows schematically an example of a communication environment in accordance with various aspects of this disclosure. A communication device 1701 includes a radiohead 1702 in accordance with various aspects of this disclosure. The radiohead includes an antenna 1703 and is configured to receive various wireless communication signals. In an example, the radiohead may receive a wireless local area network (WLAN) signal according to IEEE802.11 specifications. In an example, the radiohead may receive wireless communication signals according to various protocols of IEEE802.11 specifications.

Various wireless communication signals may be transmitted from the wireless communication signal sources 1704, 1705, 1706, 1707 in the communication environment. In an example, the wireless communication signals which the wireless communication signal sources 1704, 1705, 1706, 1707 transmit may include wireless communication signals using various protocols of wireless communication. In an example, the various protocols of wireless communication may include IEEE 802.11a, IEEE 802.11b, IEEE 802.11g, IEEE 802.11n, IEEE 802.11ac, IEEE 802.11ax and such. It should be understood that the protocols and the foregoing references to these protocols have been provided merely as examples.

Figure 18:
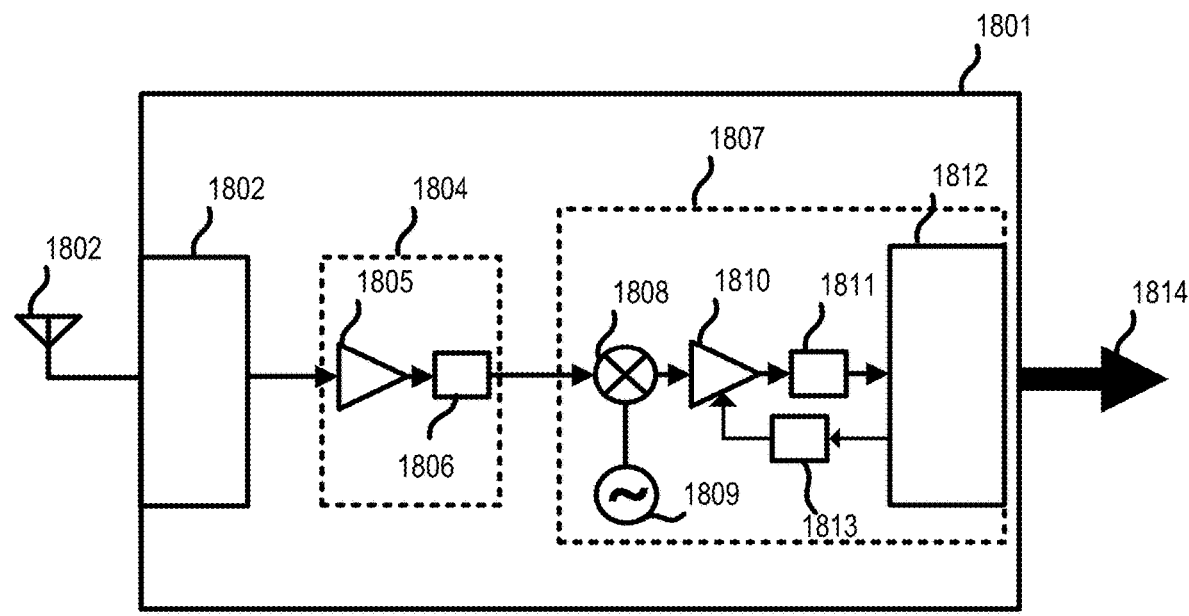
FIG. 18 shows schematically an example of a radiohead in accordance with various aspects of this disclosure.

FIG. 18 shows schematically an example of a radiohead in accordance with various aspects of this disclosure. The radiohead 1801 includes an antenna interface 1802 which may be coupled to an antenna 1803. The radiohead 1801 further includes a radio frequency front end portion 1804. The radio frequency front end portion may include an amplifier 1805 and a band-pass filter 1806. The radiohead 1801 further includes a portion of the transceiver chain 1807 which may be coupled to the other portion of the transceiver chain external to the radiohead 1801.

In an example, the transceiver chain 1807 may include the TD PHY portion and the other portion of the transceiver chain external to the radiohead 1801 may include the FD PHY portion. In this example, the transceiver chain 1807 includes a down-converter including a mixer 1808 and a local oscillator 1809, an amplifier 1810, and an analog-to-digital converter 1811 to output digital communication signals to one or more processors 1812. In an example, the one or more processors 1812 may include TD PHY portion.

In an example, the one or more processors 1812 may be configured to perform TD PHY portion with respect to orthogonal frequency division multiplexing (OFDM) wireless communication signals. In an example, the one or more processors 1812 may include a space/time decoder and/or a fast Fourier transform (FFT) module, and/or a plurality of symbol demapping modules, and/or a multiplexer, and/or a deinterleaver, and/or a channel decoder, and/or a cyclic prefix removal module The transceiver chain 1807 may further include an automatic gain controller 1813. The automatic gain controller 1813 may be coupled to any one of the amplifiers 1805, 1810. The automatic gain controller 1813 may further be coupled to the one or more processor 1812, or to the output of the analog-to-digital converter 1811. In an example, the automatic gain controller 1813 may be coupled to another circuit, which may provide control signals to the automatic gain controller 1813. In an example, the one or more processors 1812 may include the automatic gain controller 1813.

In this example, the automatic gain controller 1813 is coupled to the one or more processors 1812 to receive input, and to the amplifier 1810 of the radiohead 1801 to control the amplifier 1810 as its output. In an example, the one or more processors 1812 may provide the output of the analog-to-digital converter to the automatic gain controller 1813, and the automatic gain controller 1813 may perform the automatic gain control. In an example, the one or more processors 1812 may provide a further signal to the automatic gain controller 1813, and the automatic gain controller 1813 may use the signal, which the one or more processors 1812 provide for the automatic gain control.

The wireless communication signals are transmitted by transmitters with a predefined power. However, the transmitted wireless communication signals do not reach each of the receivers in the communication environment with the same power. There are many elements which may change the power of the received wireless communication signal at the receiver side, including the distance to the transmitter, obstacles between the transmitter and the receiver which affects the power of the wireless communication signals, interferences with other wireless signals, humidity, antenna direction and such.

Accordingly, a receiver may receive the wireless communication signal relatively at high powers, or low powers. An ideal receiver may adapt for both situations in order to provide connection without any interruption, should the circumstances change from high to low, or low to high, whichever the receiver is adapted at the beginning.

If a receiver receives the wireless communication signal having high power, the wireless communication signal may be amplified to the levels that the circuits between the antenna and a processor which processes the received wireless communication signals may reach saturation and distort the received wireless communication signal dramatically, provided that the receiver does not adapted for the high power.

Alternatively, if a receiver receives the wireless communication signal at low power, the amplification provided between the antenna and the processor may not simply be enough for the analog-to-digital converter to convert the wireless communication signal to a digital signal correctly, or alternatively for the processor or the demodulator to demodulate or decode the wireless communication signal. In order to tackle the above-mentioned issues, the automatic gain control may be used.

FIG. 19. shows schematically an example of an automatic gain control in accordance with various aspects of this disclosure. In an example, FIG. 19 includes a portion of a radiohead configured to receive a wireless communication signal. The radiohead may receive the wireless communication signal and down-convert the wireless communication signal and provide the baseband signal to an amplifier 1901.

The amplifier 1901 includes a variable gain amplifier. The variable gain amplifier amplifies the input signal based on its configuration with a variable gain. The amplifier 1901 provides its output to an analog-to-digital converter 1902 to convert the analog wireless communication signal to a digital communication signal.

In accordance with various aspects of this disclosure, the term analog-to-digital converter should not be taken that it refers to a specific architecture with respect to the term analog-to-digital converter. Any system that converts an analog signal to a digital signal should fall under the definition of the analog-to-digital converter term of this disclosure. It may include direct-conversion circuits, sample and hold circuits, Wilkinson converters, counter-ramps, sub ranging equalizers, delta-sigma converters, and such. Any analog-digital converting structure should be considered as an analog-to-digital converter in accordance with this disclosure.

The analog-to-digital converter 1902 provides its output to a processor 1903 which may include processing blocks for baseband processing. The output of the analog-to-digital converter 1902 is further coupled to an automatic gain controller 1904. The automatic gain controller 1904 receives the output of the analog-to-digital converter 1902, and provides feedback in order to control the gain of the amplifier 1901 based on the output of the analog-to-digital converter 1902.

Generally, the automatic gain controller 1904 may include an estimation module to receive the output of the analog-to-digital converter 1902 and to calculate a new gain for the amplifier 1901, and provide a feedback signal indicating the new gain to the amplifier 1901. Accordingly, the automatic gain controller 1904 controls the amplifier 1901 and adjusts the configuration of the amplifier 1901 based on the indication provided to the amplifier 1901.

In an example, the estimation module may calculate an energy or power, or amplitude of a plurality of samples from the signal which the analog-to-digital converter 1902 provides from its output. Such signals may be referred as digital communication signals in accordance with various aspects of this disclosure. The calculated feature, which may be energy, power, amplitude, or any other feature of the digital communication signal which refers to a magnitude related to the digital communication signal and which may be related to the power of the digital communication signal, of the first sample may be compared with a reference feature.

Based on the comparison of the calculated feature of the first sample of the signal with the reference feature, the automatic gain controller 1904 determines the gain of the amplifier 1901 and provides the feedback to the amplifier 1901. In an example, the first sample may include a plurality of samples over the digital communication signal.

Accordingly, the automatic gain controller 1904 continuously performs the above-mentioned functions with the estimation module based on the reference feature and provides the feedback to the amplifier 1901 which would drive the power of the communication signal to an ideal level which the analog-to-digital converter 1902 receives.

In many wireless communication protocols, a portion of the transmitted wireless communication signal may be used especially for training the receiver. In many examples, the training of the receiver may include performing automatic gain control and adjusting the configuration of the amplifiers based on the portion of the received wireless communication signal.

For example, in IEEE 802.11n protocol, automatic gain control is performed on the received wireless communication signal by using a legacy short training field (L-STF) and a high throughput short training field (HT-STF) in the preamble of the wireless communication signal. In another example, in IEEE 802.11ac protocol, automatic gain control is performed on the received wireless communication signal by using a legacy short training field (L-STF) and a very high throughput short training field (VHT-STF) in the preamble of the wireless communication signal.

FIG. 20A and FIG. 20B each show a structure of a wireless communication signal 2000, 2000a, 2000b, 2000c according to various aspects. The wireless communication signal 2000, 2000a, 2000b, 2000c shown in FIG. 20A and FIG. 20B may be a signal received at an antenna of a radiohead circuit in accordance with various aspects of this disclosure. In some aspects, the wireless communication signal 2000, 2000a, 2000b, 2000c shown in FIG. 20A and FIG. 20B may be a signal transmitted by a radiohead circuit, as described above and as will be described in further detail below.

In some aspects, a wireless communication signal 2000, 2000a, 2000b, 2000c may be configured as a frame signal, e.g. may include a frame structure, for example configured in accordance with communication standards, such as IEEE 802.11 protocols.

In some aspects, the frame signal may include a legacy portion 2002, 2002a, 2002b, 2002c, and a non-legacy portion 2004, 2004a, 2004b, 2004c. A radiohead circuit (e.g., it's one or more processors) may carry out the determination of the preferred tuning configuration for the radiohead circuit based on the legacy portion 2002, 2002a, 2002b, 2002c (illustratively, during reception of the legacy portion), prior to reception of the non-legacy portion 2004, 2004a, 2004b, 2004c. The first implementation may be described, in some aspects, as in-frame antenna tuning, obtaining an optimal combination of directivity, noise figure, and/or low noise amplifier's gain or in particular automatic gain control.

In some aspects, the legacy portion 2002, 2002a, 2002b, 2002c may include a legacy preamble portion (also referred to herein as a legacy preamble). The legacy preamble may include a legacy short training field (L-STF) 2006, a legacy long training field (L-LTF) 2008, and a legacy signal (L-SIG) field 2010. In some aspects, the antenna tuning circuit may be configured to tune the antenna by applying the preferred tuning configuration during (or after) reception of the legacy signal (L-SIG) field 2010.

Tuning the antenna may change the channel, so that, in some aspects, the antenna tuning circuit may be configured to carry out the tuning during the legacy preamble, prior to the antenna receiving data, e.g. prior to the antenna receiving high-throughput (HT)/very high-throughput (VHT)/high efficiency (HE) long training field (LTF), where channel estimation may be performed.

In some aspects, the frame signal related to the wireless communication signal may be configured according to different PHY Protocol Data Unit (PPDU) formats, such as different physical layer convergence procedure protocol data unit (PLCP PDU) formats, for example, according to at least one of a high-throughput PHY Protocol Data Unit (HT PPDU) format, a very high-throughput PHY Protocol Data Unit (VHT PPDU) format, and a high efficiency PHY Protocol Data Unit (HE PPDU) format (or high efficiency single user PHY Protocol Data Unit (HE SU PPDU) format), as shown in FIG. 20B.

In some aspects, the frame signal 2000a may be configured according to the HT PPDU format and may include a legacy preamble portion (as described above), a HT preamble portion 2012a, and a HT data portion 2014a. The HT preamble portion 2012a may include various fields, such as one or more HT signal fields (HT SIG) 2016, one or more HT short training fields (HT STF) 2018, and one or more HT long training fields (HT LTF) 2020.

In some aspects, the frame signal 2000b may be configured according to the VHT PPDU format and may include a legacy preamble portion (as described above), a VHT preamble portion 2012b, and a VHT data portion 2014b. The VHT preamble portion 2012b may include various fields, such as one or more VHT signal fields (VHT SIG A, VHT SIG B) 2022 2024, one or more VHT short training fields (VHT STF) 2026, and one or more VHT long training fields (VHT LTF) 2028.

In some aspects, the frame signal 2000c may be configured according to the HE PPDU format or HE SU PPDU format and may include a legacy preamble portion (as described above), a HE preamble portion 2012c, and a HE data portion 2014c. The HE preamble portion 2012c may include various fields, such as one or more HE signal fields (HE SIG A) 2030, one or more HE short training fields (HE STF) 2032, and one or more HE long training fields (HE LTF) 2034. In some aspects, the frame signal 2000c may include a repeated L-SIG portion (RL SIG) 2036.

FIG. 21 shows schematically a closer view of the portion of the structure of wireless communication signals. The wireless communication signals may include a legacy PHY Protocol Data Unit (Non-HT PPDU) 2101, high-throughput PHY Protocol Data Unit (HT PPDU) format 2102, a very high-throughput PHY Protocol Data Unit (VHT PPDU) format 2103, and FIG. 21 shows a portion of the respective PHY Protocol Data Units (PPDU) in accordance with various aspects of this disclosure.

Legacy signal (L-SIG) 2104a, 2104b, 2104c is the last signal of the legacy preamble and it may include information related to the rate, length, and parity information of the signal. The legacy signal (L-SIG) 2104a, 2104b, 2104c includes one OFDM symbol and the duration of the OFDM symbol may change based on the channel bandwidth. The legacy signal (L-SIG) 2104a, 2104b, 2104c is a BPSK modulated signal.

High Throughput signal field (HT-SIG) 2105a, 2105b is located between the legacy signal (L-SIG) and the high throughput short training field (HT-STF). The high throughput signal field (HT-SIG) may include information to decode the HT packet, and high throughput signal field (HT-SIG) includes a first symbol HT-SIG #1 2105a and a second symbol HT-SIG #2 2105b. Each of the symbols has a duration of 4 μs. The first symbol HT-SIG #1 2105a and the second symbol HT-SIG #2 2105b are BPSK modulated signals but the modulation constellation of the first symbol HT-SIG #1 2105a and the second symbol HT-SIG #2 2105b is rotated 90 degrees relative to the legacy signal (L-SIG).

Very high throughput signal field (VHT-SIG) 2106a, 2106b is located between the legacy signal (L-SIG) and the very high throughput short training field (HT-STF). The very high throughput signal field (VHT-SIG) may include information to decode the VHT packet, and the very high throughput signal field (VHT-SIG) includes a first symbol VHT-SIG #1 2106a and a second symbol VHT-SIG #2 2106b. Each of the symbols has a duration of 4 μs. The first symbol VHT-SIG #1 2106a is a BPSK modulated signal and the second symbol VHT-SIG #2 2106b is BPSK modulated signal rotated 90 degrees relative to the first symbol VHT-SIG #1 2106a.

High throughput short training field (HT-STF) 2105c is used to improve automatic gain control estimation for a MIMO system. The high throughput short training field (HT-STF) 2105c has a duration of 4 μs. Similarly, the very high throughput short training field (VHT-STF) 2106c is used to improve automatic gain control estimation for a MIMO system. The very high throughput short training field (VHT-STF) 2106c has a duration of 4 μs.

Referring back to FIG. 18, the radiohead 1801 may be coupled to a communication interface 1814, which couples the one or more processors 1812 of the radiohead 1801 to one or more communication device processors which are external to the radiohead, and which the radiohead 1801 may rely on to complete the TD PHY portion of the radiohead 1801. In an example, the one or more communication device processors may include FD PHY portion complimenting the TD PHY portion of the radiohead 1801.

FIG. 22A shows schematically an example of a first binary phase-shift keying modulation constellation, and FIG. 22B shows schematically an example of a second binary phase-shift keying modulation constellation rotated 90 degrees relative to the first binary phase-shift keying modulation constellation.

FIG. 23 shows schematically an example of the modulation constellations of a portion of the high-throughput PHY Protocol Data Unit (HT PPDU). The portion relates to the legacy signal (L-SIG) 2301, the first symbol HT-SIG #1 2302, and the second symbol HT-SIG #2 2303.

FIG. 24 shows schematically an example of the modulation constellations of a portion of the very high-throughput PHY Protocol Data Unit (VHT PPDU). The portion relates to the legacy signal (L-SIG) 2401, the first symbol VHT-SIG #1 2402, and the second symbol HT-SIG #2 2403.

Referring back to FIG. 18, in accordance with various aspects of this disclosure, the one or more processors 1812 may receive digital communication signals from the analog-to-digital converter 1811 and detect a rotation of the modulation constellation between a first symbol of the received wireless communication signal and a consecutive second symbol of the received wireless communication signal to identify a third symbol to be used for the automatic gain control function.

In an example, the one or more processors 1812 may identify the third symbol to be used for automatic gain control function, and the one or more processors 1812 may perform an automatic gain control function with the third symbol, based on the detection for the rotation of the modulation constellation between the first symbol and the second consecutive symbol.

Accordingly, in an example, the wireless communication signal includes a high-throughput PHY Protocol Data Unit (HT PPDU) including a high throughput signal field (HT-SIG), and high throughput short training field (HT-STF). The radio frequency front end 1802 receives the wireless communication signal. At least one amplifier 1805, 1810 amplifies the received wireless communication signal based on a configuration of the one or more amplifiers. After operations of possible components in between, the analog-to-digital converter 1811 receives the amplified signal and provides a digital communication signal to the one or more processors 1812.

The one or more processors 1812 may detect if there is any rotation of modulation constellation between a first symbol and a second symbol in the digital communication signals for each symbol of the received wireless communication signal. In this example, if the one or more processors 1812 detect that there is a constellation between the first symbol and the second symbol, the one or more processors 1812 identify the first symbol as the legacy signal (L-SIG) and the second symbol as the first symbol of the high throughput signal field (HT-SIG).

Accordingly, the one or more processors 1812 do not perform an automatic gain control function with the next symbol, which would be the second symbol of the high throughput signal field (HT-SIG). The one or more processors 1812 mark the next symbol which arrives after the second symbol of the high throughput signal field (HT-SIG) as the third symbol, which is the high throughput short training field (HT-STF), and the one or more processors 1812 perform an automatic gain control function using the third symbol.

In an example, the wireless communication signal includes a very high-throughput PHY Protocol Data Unit (VHT PPDU) including a very high throughput signal field (VHT-SIG), and very high throughput short training field (VHT-STF). The radio frequency front end 1802 receives the wireless communication signal. At least one amplifier 1805, 1810 amplifies the received wireless communication signal based on a configuration of the one or more amplifiers. After possible components in between, the analog-to-digital converter 1811 receives the amplified signal and provides a digital communication signal to the one or more processors 1812.

The one or more processors 1812 may detect if there is any rotation of modulation constellation between a first symbol and a second symbol in the digital communication signals for each symbol of the received wireless communication signal. In this example, if the one or more processors 1812 detect that there is a constellation between the first symbol and the second symbol, the one or more processors 1812 identify the first symbol as the first symbol of the very high throughput signal field (VHT-SIG), and the second symbol as the second symbol of the very high throughput signal field (VHT-SIG).

Accordingly, the one or more processors 1812 perform an automatic gain control function with the next symbol, which would be the very high throughput short training field (VHT-STF). The one or more processors 1812 perform an automatic gain control function using the third symbol. In an example, the one or more processors 1812 of the radiohead 1801 do not wait for a further instruction, or confirmation from the one or more communication device processor to perform the automatic gain control function using the third symbol.

In an example, the radiohead 1801 may include a rotation detection circuit or a rotation detection module which may detect the rotation of the modulation constellation between the first symbol and the consecutive second symbol, and the one or more processors 1812 may send an instruction to the rotation detection circuit or to the rotation detection module, to detect the rotation of the modulation constellation between the first symbol and the consecutive second symbol.

In an example, the one or more processors 1812 may identify the first symbol, or a symbol prior to the first symbol to identify the third symbol. In this example, the one or more processors 1812 may identify that the symbol which is received one symbol before the first symbol is a symbol of the legacy signal (L-SIG). Accordingly, the one or more processors 1812 may identify the third symbol which is consecutive to the second symbol includes the very high throughput short training field (VHT-STF) based on the rotation of the modulation constellation between the first symbol and the second symbol, and the symbol prior to the first symbol.

In an example, the one or more processors 1812 may receive the information to identify the first symbol, or a symbol prior to the first symbol from one or more communication device processors from the communication interface 1814. In an example, the one or more processors 1812 may provide a request signal to the one or more communication device processors via the communication interface 1814 when the one or more processors 1812 detect the rotation of the modulation constellation between the first symbol and the second symbol to request information related to the first symbol or the symbol prior to the first symbol.

In an example, the one or more processors 1812 may identify the third symbol based on the receiving time of the first symbol. In this example, the one or more processors 1812 may identify the third symbol based on the receiving time of the first symbol relative to a legacy long training field (L-LTF) symbol which is received prior to the first symbol. In an example, the one or more processors 1812 may receive the information related to the legacy long training field (L-LTF) symbol from one or more communication device processors via the communication interface.

In an example, the one or more processors 1812 perform a power estimation using the third symbol to perform the automatic gain control function. In an example, the one or more processors 1812 may adjust the configuration of the at least one amplifiers 1805, 1810, based on the power estimation using the third symbol. In an example, the one or more processors may perform an amplitude estimation using the third symbol to perform the automatic gain control function. In an example, the one or more processors 1812 may adjust the configuration of the at least one amplifiers 1805, 1810, based on the amplitude estimation using the third symbol.

In an example, the one or more processors 1812 are further coupled to one or more processors of at least one radioheads of a communication device via the communication interface. In an example, the one or more processors 1812 may provide the result of the estimation in automatic gain control function to one or more processors of the at least one radioheads of the communication device via the communication interface.

FIG. 25 shows schematically an example of a rotation detection module 2501 in accordance with various aspects of this disclosure. In an example, the one or more processors 1812 may include the rotation detection module 2501. In an example, the rotation detection module 2501 may be coupled to an analog-to-digital converter. The modules which the rotation detection module 2501 may include have been provided only for exemplary purposes. The rotation detection module 2501 may include only one, or only a few of them as well in accordance with various aspects of this disclosure. For example, the rotation detection module 2501 may include either a fast fourier transform (FFT) module or a discrete fourier transform (DFT) module.

In an example, the rotation detection module 2501 may include a fast fourier transform (FFT) module 2502 to calculate the frequency representation of a digital communication signal which the analog-to-digital converter provides or which the one or more processors provide after removing cyclic prefix. The fast fourier transform (FFT) module 2502 may receive the digital signal, and the fast fourier transform (FFT) module 2502 may provide an output representing the signal at the frequency domain.

In an example, the rotation detection module 2501 may include a calculator module 2503 to perform calculations related to the digital communication signal. In an example, the calculations may relate to the output of the fast fourier transform (FFT) module 2502. In an example, the calculations may relate to the measurements made to the wireless communication signal. In an example, the calculations may relate to the output of an autocorrelation module 2504.

In an example, the rotation detection module 2501 may include an autocorrelation module 2504. In an example, the autocorrelation module 2504 may receive the digital communication signal and calculates the autocorrelation related to the wireless communication signal. In an example, the autocorrelation module 2504 may receive an input signal and calculates the autocorrelation of the input signal.

In an example, the rotation detection module 2501 may include a discrete fourier transform (DFT) module 2505. The discrete fourier transform (DFT) module may receive the digital signal, and the discrete fourier transform (DFT) module may provide an output representing the signal at the frequency domain.

In an example, the rotation detection module 2501 may include a channel estimator 2506 to estimate a transfer function for the received wireless communication signal. In an example, the rotation detection module 2501 may further include an equalizer 2507 to equalize an input signal based on the estimated transfer function may include In an example, the rotation detection module 2501 may include a determiner 2508 to determine for the detection of the rotation of the modulation constellation between symbols. In an example, the determiner 2508 may determine if the modulation constellation between a first symbol and a second symbol in the input signal has been rotated.

In an example, the received wireless communication signal includes an orthogonal frequency division multiplexing (OFDM) signal. An orthogonal frequency division multiplexing (OFDM) symbol includes a plurality of data symbols provided at a plurality of carrier frequencies, or tones, at the same time. Accordingly, in this example the first symbol, the second symbol, and the third symbol include a plurality of signal amplitudes at different tones for each respective symbol.

The fast fourier transform (FFT) module 2502 may receive the digital input signal which corresponds to a first symbol to detect the rotation of the modulation constellation and the fast fourier transform (FFT) module 2502 may perform a fast fourier transform (FFT) for the first symbol. The fast fourier transform (FFT) module 2502 may receive a consecutive second symbol, which is consecutive to the first symbol, to detect the rotation of the modulation constellation, and the fast fourier transform (FFT) module 2502 may perform a fast fourier transform (FFT) for the second symbol.

Because of the constellation of the modulation with respect to a possible BPSK modulation and a 90 degrees rotated version of the BPSK modulation, the rotation module 2501 may detect the rotation with the output of the fast fourier transform (FFT) for the first symbol and the second symbol. In an example, the rotation module 2501 may detect whether the output of the fast fourier transform (FFT) of the first symbol provide components tend to line up on the real axis, and the output of the fast fourier transform (FFT) of the second symbol provide components tend to line up on the imaginary axis under certain conditions which are provided in accordance with various aspects of this disclosure. The amount of the symbols which line up on the real axis and the imaginary axis may indicate that there is a rotation of the modulation of constellation between the first symbol and the second symbol.

Alternatively, the rotation module 2501 may detect whether the output of the fast fourier transform (FFT) of the first symbol provide components that tend to line up on the real axis, and the output of the fast fourier transform (FFT) of the second symbol provide components that tend to line up on the imaginary axis. The amount of the symbols which line up on the real axis and the imaginary axis may indicate that there is a rotation of the modulation of constellation between the first symbol and the second symbol.

In an example, the fast fourier transform (FFT) module 2502 may perform the fast fourier transform (FFT) for each of the tones of the first symbol and each of the tones of the second symbol. In an example, the fast fourier transform (FFT) module 2502 may perform the fast fourier transform (FFT) for only a portion of the tones of the first symbol, and a portion of the tones of the second symbol. In an example, the fast fourier transform (FFT) module 2502 may perform the fast fourier transform (FFT) for only a portion of the tones of the first symbol for a set of selected frequencies, and the fast fourier transform (FFT) module 2502 may perform the fast fourier transform (FFT) for a portion of the tones of the second symbol which corresponds to the portion of the tones of the first symbol for the same set of selected frequencies.

In an example, discrete fourier transform (DFT) module 2505 may receive the digital input signal which corresponds to a first symbol to detect the rotation of the modulation constellation and the discrete fourier transform (DFT) module 2505 may perform a discrete fourier transform (DFT) for the first symbol. The discrete fourier transform (DFT) module 2505 may receive a consecutive second symbol, which is consecutive to the first symbol, to detect the rotation of the modulation constellation, and the discrete fourier transform (DFT) module 2505 may perform a fast fourier transform (FFT) for the second symbol.

In an example, the discrete fourier transform (DFT) module 2505 may perform the discrete fourier transform (DFT) for each of the tones of the first symbol and each of the tones of the second symbol. In an example, the discrete fourier transform (DFT) module 2505 may perform the discrete fourier transform (DFT) for only a portion of the tones of the first symbol, and a portion of the tones of the second symbol. In an example, the discrete fourier transform (DFT) module 2505 may perform the discrete fourier transform (DFT) for only a portion of the tones of the first symbol for a set of selected frequencies, and the discrete fourier transform (DFT) module 2505 may perform the discrete fourier transform (DFT) for a portion of the tones of the second symbol which corresponds to the portion of the tones of the first symbol for the same set of selected frequencies.

In an example, the calculator module 2503 may receive the output of the fast fourier transform (FFT) module 2502, or the discrete fourier transform (DFT) module 2505. In an example, the calculator module 2503 may perform mathematical calculations based on the output of the fast fourier transform (FFT) module 2502, or the discrete fourier transform (DFT) module 2505. In an example, the calculator module 2503 may calculate a first tone for the first symbol, to calculate a second tone for the second symbol, wherein each tone may correspond the output of the fast fourier transform (FFT) module 2502, or the discrete fourier transform (DFT) module 2505 for a selected frequency.

Accordingly, the first tone may include the fast fourier transform (FFT) and/or discrete fourier transform (DFT) of a selected frequency of the first symbol, and the second tone may include the fast fourier transform (FFT) or discrete fourier transform (DFT) of the selected frequency of the second symbol. In an example, the calculator module 2503 may multiply the first tone with the conjugate of the second tone to obtain a sum of the real part for the first tone and the second tone, and a sum of the imaginary part of the first tone and the second tone.

In an example, the calculator module 2503 may calculate for a plurality of first tones for the first symbol for a set of selected frequencies. The calculator module 2503 may calculate a plurality of second tones for the second symbol for the set of selected frequencies. The calculator module 2503 may multiply each of the plurality of first tones for each of the set of selected frequencies, with the conjugate of the respective second tone from the plurality of second tones for each of the selected frequency to obtain a sum of the real part for a plurality of tones, and a sum of the imaginary part for the plurality of tones.

In an example, the determiner 2508 may receive the output of the calculator module 2503. The determiner 2508 may determine for the rotation of the modulation constellation between the first symbol and the second symbol based on the output of the calculator module 2503. In an example, if the sum of the imaginary part of the multiplication performed by the calculator module 2503 is greater than the sum of the real part of the multiplication performed by the calculator module 2503, the determiner 2508 may determine that there has been a rotation of the constellation between the first symbol and the second symbol.

In an example, the determiner 2508 may also receive an information related to the first symbol, or a symbol prior to the first symbol to determine for the detection of the rotation of the constellation between the first symbol and the second symbol. In an example, the determiner 2508 may receive the output of the calculator module 2503 for its calculations in accordance with various aspects of this disclosure for the symbol prior to the first symbol, and the first symbol.

In an example, the determiner 2508 may determine for the detection of the rotation of the modulation constellation based on a comparison of the output of the calculator module 2503 for its calculations related to the first symbol and the second symbol, and its calculations related to the symbol prior to the first symbol and the first symbol.

In an example, the determiner 2508 may determine for the detection of the rotation of the modulation constellation, when the change of the output of the calculator module 2503 is above a threshold value between the calculations related to the first symbol and the second symbol, and the calculations related to the symbol prior to the first symbol and the first symbol.

In an example, the channel estimator 2506 and the equalizer 2507 may also provide input to the fast fourier transform (FFT) module 2502 or discrete fourier transform (DFT) module 2505. In an example, they perform a channel equalization to estimate a transfer function of the channel for the received wireless communication signal. In an example, the equalizer 2507 equalizes the second symbol based on the estimated transfer function of the channel, and the equalizer 2507 provides the equalized second symbol to the fast fourier transform (FFT) module 2502 or discrete fourier transform (DFT) module 2505. In this example, the fast fourier transform (FFT) module 2502 or discrete fourier transform (DFT) module 2505 may perform its function on the first symbol and the equalized second symbol.

In an example, the autocorrelation module 2504 may receive the digital input signal which corresponds to a first symbol to detect the rotation of the modulation constellation and autocorrelation module 2504 may perform an autocorrelation for each of the symbols including the first symbol or the second symbol. In an example, the autocorrelation module 2504 may perform the autocorrelation for a first portion of the first symbol and a second portion of the first symbol. In an example, the autocorrelation module 2504 may perform the autocorrelation for a first portion of the second symbol and a second portion of the second symbol. In an example, the first portion of a symbol may include a portion of the symbol for 800 ns.

In this example, the autocorrelation module 2504 provides the output of the autocorrelation to the determiner. In an example, the determiner 2508 may determine to perform the automatic gain function, in case the autocorrelation of the first symbol, or the autocorrelation of the second symbol is greater than a threshold value, as this may indicate that the symbol which has an autocorrelation greater than the threshold value may include the signal field to be used for the automatic gain control.

A skilled person would appreciate that the modules which the rotation detection module 2501 includes may not be implemented as one integrated module, but they may be implemented as standalone modules which the one or more processors of the radiohead may include. In an example, the one or more processors may include an autocorrelation module which includes the autocorrelation module 2504. In an example, the one or more processors may identify the third symbol to be used for the automatic gain control function based on the output of the autocorrelation module, and perform the automatic gain control function based on the output of the autocorrelation module.

In accordance with various aspects of this disclosure, the rotation detection module 2501 determines for the rotation of the modulation constellation between the first symbol and the second symbol and identifies a third symbol to perform an automatic gain control function with the third symbol. In an example, the third symbol may be identified as the symbol consecutive to the second symbol. Accordingly, the one or more processors of the radiohead may perform the automatic gain control function with the third symbol.

In an example, a radiohead may include a computer-readable medium including instructions stored thereon, that if executed by one or more processors, cause a radiohead including an antenna interface; a radio frequency (RF) front end, and one or more amplifiers configured to amplify a received wireless communication signal based on a configuration of the one or more amplifiers; and an analog-digital converting structure configured to output digital communication signals to one or more processors to; detect a rotation of the modulation constellation between a first symbol of the received wireless communication signal and a consecutive second symbol of the received wireless communication signal, and perform an automatic gain control function with a third symbol based on the detection of the rotation of the modulation constellation between the first symbol and the second consecutive symbol.

In accordance with various aspects of this disclosure, a device, in particular, a communication device may include a memory, and one or more processors, such as processing circuitry 810 and memory 820 referring back to FIG. 8. The memory 820 may be implemented as one or more computer-readable medium including one or more instructions that when executed on at least one processor cause a radiohead including an antenna interface; a radio frequency (RF) front end and one or more amplifiers configured to amplify a received wireless communication signal based on a configuration of the one or more amplifiers, and an analog-digital converting structure configured to output digital communication signals to one or more processors to; detect a rotation of the modulation constellation between a first symbol of the received wireless communication signal and a consecutive second symbol of the received wireless communication signal, and perform an automatic gain control function with a third symbol based on the detection of the rotation of the modulation constellation between the first symbol and the second consecutive symbol.

FIG. 26 shows schematically an example of method steps in accordance with various aspects of this disclosure. The method may include detecting a rotation of the modulation constellation between a first symbol of the received wireless communication signal and a consecutive second symbol of the received wireless communication signal, and performing an automatic gain control function power estimation with a third symbol based on the detection of the rotation of the modulation constellation between the first symbol and the second consecutive symbol.

In a distributed radiohead circuit arrangement according to various aspects of the present disclosure, the transceiver chain may be divided differently. For example, the transceiver chain may include a physical layer (PHY) portion and a medium access control (MAC) layer portion. The physical (PHY) layer portion can be co-located with one or more antennas. The physical (PHY) layer portion and the one or more antennas may be integrated. The physical (PHY) layer portion and the medium access control (MAC) layer portion may be separate and remotely located.

The physical (PHY) layer portion and the medium access control (MAC) layer portion can be connected to each other through a communication interface. Accordingly, in order to
In an example, the communication interface includes a digital interface to communicate data frames between the physical layer (PHY) and medium access control (MAC) layer. In one example, the digital interface may include a Serially Time-Encoded Protocol (STEP) interface (developed by Intel Corporation) may be an optical or electrical signal interface.

The physical (PHY) layer portion performs tasks related to physical (PHY) layer functions. In an example, the tasks may relate to transmitting a wireless communication signal in a transmitting mode or receiving a wireless communication signal in a receiving mode. The physical (PHY) layer portion may contain the radiohead RF circuit, the analog-to-digital/digital-to-analog (AD/DA) converters, the up/down converters, line conditioning or impedance matching circuit, and a physical (PHY) layer processing unit. In an example, the physical (PHY) layer portion may also have a circuit for operation and management processing capabilities.

In a structure where a physical (PHY) layer portion is remote to a medium access control (MAC) layer portion, a need may arise to perform different tasks with each of the physical (PHY) layer portion when there are multiple physical (PHY) layer portions which are capable of receiving wireless communication signals and providing the output of physical (PHY) layer processing unit to the medium access control (MAC) layer portion through the communication interface. In an example, the medium access control (MAC) layer portion is located remotely to the physical (PHY) layer portion, a multiple physical (PHY) layer portions may receive their services or provide services from the medium access control (MAC) layer portion which may be a common medium access control (MAC) layer portion for the multiple physical (PHY) layer portions.

FIG. 27 shows schematically an example of a radiohead in accordance with various aspects of this disclosure. The radiohead 2701 includes an antenna interface 2702 which may be coupled to an antenna 2703. In an example, the antenna interface 2702 may include a duplexer to provide switching between the transmitting portion of the radiohead 2701 for transmitting function, and the receiving portion of the radiohead 2701 for receiving function. The radiohead 2701 uses the transmitting portion in a transmitting mode and the receiving portion in a receiving mode.

The antenna interface 2702 further includes an antenna port. The antenna port couples the antenna 2703 to the antenna interface 2702. The radiohead 2701 further includes a radio frequency front end portion 2704. The radio frequency front end 2704 may include an amplifier 2705 and a band-pass filter 2706 for the receiving function. The radio frequency front end 2704 may further include a power amplifier 2707, and a band-pass filter 2708 for the transmitting function.

The radiohead 2701 further includes a portion of the transceiver chain 2709 which may be coupled to the other portion of the transceiver chain external to the radiohead 2701. In an example, the transceiver chain 2709 may include elements from the physical (PHY) layer portion and the other portion of the transceiver chain external to the radiohead 2701 may include the medium access control (MAC) layer portion.

In this example, for the receiving function, the transceiver chain 2709 includes a down-converter including a mixer 2710 and a local oscillator 2711, an amplifier 2712, and an analog-to-digital converter 2713 to output digital communication signals to one or more processors 2714. In an example, the one or more processors 2714 may include a physical (PHY) layer unit.

For the transmitting function, the transceiver chain 2709 may include a digital-to-analog converter 2716 to convert the digital signals which the digital-to-analog converter 2716 receives from the one or more processors 2714. The transceiver chain 2709 may also include an amplifier 2717 and an up-converter which may include another mixer 2718. In this example, the up-converter and the down-converter use the same local oscillator 2711 to provide the reference signal to the respective mixers. In an example, the transceiver chain 2709 may further include another local oscillator.

Further, the one or more processors 2714 may include a communication interface module 2719 which connects the one or more processors 2714 of the radiohead 2701 to one or more external radiohead processors external to the radiohead 2701 via a communication interface 2720. In an example, the one or more external radiohead processors may include one or more processors of a communication device which the radiohead 2701 is coupled to. In an example, the one or more external radiohead processors include a medium access control (MAC) layer portion which is coupled to the physical (PHY) layer portion of the radiohead 2701.

In an example, the one or more processors 2714 may also include a control module to control the physical (PHY) layer portion in the radiohead 2701. In an example, the one or more processors 2714 are coupled to the antenna interface 2702 to control the antenna. In an example, the one or more processors 2714 are coupled to the at least one of the amplifiers 2705, 2707, 2712, 2717 to change the configuration of the amplifier. In an example, the one or more processors 2714 are coupled to the band filters 2706 and 2708 to provide equalization.

In an example, the one or more processors 2714 are coupled to the local oscillator 2711 to change the frequency of the reference signal which the local oscillator 2711 provides to the mixers 2710, 2718. In an example, the one or more processors 2714 are coupled to the antenna interface 2702 to switch between the transmitting mode and the receiving mode of the radiohead 2701. In an example, the one or more processors 2714 controls the physical (PHY) layer processing unit 2715.

In an example, the one or more processors 2714 may further include a timing block to schedule the control signals to be sent to the elements of the physical (PHY) layer portion. In an example, the one or more processors 2714 receive a scheduling instruction from one or more radiohead external processors in order to schedule the control of the physical (PHY) layer portion. In an example, the one or more processors 2714 schedule control signals to be sent to the elements of the physical (PHY) layer portion based on the received scheduling instruction. In an example, the one or more processors 2714 receive the scheduling instruction and provide a control signal to the respective element based on the received scheduling instruction.

In an example, the scheduling instruction may include an instruction related to a task. In an example, a task may be considered as a function to be performed by the radiohead 2701. In an example, the task may include a control of one element of the physical (PHY) layer portion, such as providing a determined configuration to one of the amplifiers. In an example, the task may include a control of a plurality of elements, such as changing the communication channel.

In an example, the scheduling instruction may include a configuration information to configure the radiohead 2701. In an example, the configuration information may include an indication for the one or more processors 2714 to configure at least one element of the physical (PHY) layer portion. In an example, the configuration information includes a configuration related to the task which the one or more processors 2714 receive. In response to the configuration information, the one or more processors 2714 may configure the at least one element of the physical (PHY) layer portion which the task may relate to.

In an example, the one or more processors 2714 receive a scheduling instruction from the communication interface 2720. The scheduling instruction may include a task which may include to transmit wireless communication signals, and the configuration information may include a first set of communication settings which may include a carrier frequency and/or at least one filter equalization parameter and/or at least one amplifier configuration, and/or at least one symbol rate, and/or a timing information to perform the task.

Accordingly, the one or more processors 2714 control the related elements of the physical (PHY) layer portion for the task based on the received scheduling instruction. In an example, the one or more processors 2714 control the local oscillator 2711 to generate a reference signal at the provided carrier frequency. In an example, the one or more processors 2714 control the at least one filter 2708 based on the received equalization parameter.

In an example, the one or more processors 2714 control the at least one amplifier 2707, 2717 based on the received amplifier configuration. In an example, the one or more processors 2714 provide digital modulation with the received symbol rate. In an example, the one or more processors 2714 perform at least one of the controls based on the received timing information.

In an example, the one or more processors 2714 send a control signal to control at least one of the related elements of the physical (PHY) layer portion for the task to control the at least one of the related elements of the physical (PHY) layer portion for the task. In an example, the one or more processors 2714 send a plurality of control signals to control at least one of the related elements of the physical (PHY) layer portion to control the at least one of the related elements of the physical (PHY) layer portion for the task.

In an example, the scheduling instruction may include a task which may include receiving wireless communication signals, and the configuration information may include a first set of communication settings which may include a carrier frequency and/or at least one filter equalization parameter and/or at least one amplifier configuration, and/or at least one symbol rate, and/or a timing information to perform the task.

Accordingly, the one or more processors 2714 control the related elements of the physical (PHY) layer portion for the task based on the received scheduling instruction. In an example, the one or more processors 2714 control the local oscillator 2711 to generate a reference signal at the provided carrier frequency. In an example, the one or more processors 2714 control the at least one filter 2706 based on the received equalization parameter.

In an example, the one or more processors 2714 control the at least one amplifier 2705, 2712 based on the received amplifier configuration. In an example, the one or more processors 2714 provide digital demodulation with the received symbol rate. In an example, the one or more processors 2714 perform at least one of the controls based on the received timing information.

In an example, the one or more processors 2714 send a control signal to control at least one of the related elements of the physical (PHY) layer portion for the task to control the at least one of the related elements of the physical (PHY)

layer portion for the task. In an example, the one or more processors 2714 send a plurality of control signals to control at least one of the related elements of the physical (PHY) layer portion for the task to control the at least one of the related elements of the physical (PHY) layer portion for the task.

In an example, the one or more processors 2714 provide a response signal to the communication interface 2720 related to the task based on the received scheduling instruction. In an example, the response signal may include an information related to the task based on the received scheduling instruction. In an example, the response signal may include a confirmation indication to confirm that the task to be scheduled by the one or more processors 2714.

In an example, the response signal may include a failure indication to indicate that the task could not be scheduled by the one or more processors 2714. In an example, the response signal may also include an indication to indicate the reason for the failure of the task being scheduled. In an example, the response signal may include a success indication to indicate that the task based on the received scheduling instruction has been performed. In an example, the response signal may include an output data related to the performed task.

In an example, the output data may include a data related to the performed task. For example, the task of the received scheduling instruction may relate to a measurement of the communication channel and the data may include at least one metric related to the communication channel. Alternatively, the task of the received scheduling instruction may relate to a measurement of the quality of the received wireless communication signal, and the data may include information related to the signal quality.

In an example, the information related to the signal quality may include at least one of the following: reference signal received power (RSRP, Reference Signal Received Power), signal to interference plus noise ratio (SINR, Signal to Interference plus Noise Ratio), and Receive Signal Strength Indicator (RSSI, Received Signal Strength Indicator), Reference Signal Received Quality (RSRQ, Reference Signal Received Quality).

In an example, the one or more processors 2714 may receive a second scheduling instruction in response to the response signal provided to the one or more radiohead external processors via the communication interface 2720. In an example, the one or more radiohead external processors may include the one or more communication device processors. In an example, the one or more communication device processors may include a medium access control (MAC) layer processing unit. In an example, the one or more communication device processors may implement at least one or more medium access control (medium access control (MAC) layer) functions, and the one or more medium access control (MAC) functions determine the task which the one or more processors 2714 receive from the scheduling instruction.

FIG. 28 shows schematically an example of a communication device in accordance with various aspects of this disclosure. The communication device 2801 may include a plurality of radioheads. 2802*a*, 2802*b*, 2802*c*. In an example, the plurality of radioheads includes a plurality of radioheads which are referred in accordance with FIG. 27. In an example, the communication device 2801 includes a first radiohead 2802*a*, a second radiohead 2802*b*, and a third radiohead 2802*c*.

The first radiohead 2802*a* may include an antenna interface 2803*a*. The antenna interface 2803*a* may be connected to an antenna 2804*a*. The antenna interface 2803*a* may provide an interface between the antenna 1004*a* and a radio frequency front end 2805*a*. In an example, the antenna interface 2803*a* may include a port or a socket to receive a communication signal. The radio frequency front end 2805*a* may receive a wireless communication signal via the antenna interface.

The first radiohead circuit 2802*a* may further include a portion of a transceiver chain 2806*a* including one or more processors 2807*a* coupled to a communication interface module 2808*a*. The communication interface module 2808*a* may be configured to couple the one or more processors 2807*a* of the first radiohead 2802*a* to one or more radiohead external processors external to the first radiohead 2802*a*. In an example, the one or more radiohead external processors may include one or more communication device processors.

The second radiohead 2802*b* may include an antenna interface 2803*b*. The antenna interface 2803*b* may be connected to an antenna 2804*b*. The antenna interface 2803*b* may provide an interface between the antenna 1004*b* and a radio frequency front end 2805*b*. In an example, the antenna interface 2803*b* may include a port or a socket to receive a communication signal. The radio frequency front end 2805*b* may receive a wireless communication signal via the antenna interface.

The second radiohead circuit 2802*b* may further include a portion of a transceiver chain 2806*b* including one or more processors 2807*b* coupled to a communication interface module 2808*b*. The communication interface module 2808*b* may be configured to couple the one or more processors 2807*b* of the second radiohead 2802*b* to one or more radiohead external processors external to the second radiohead 2802*b*. In an example, the one or more radiohead external processors may include one or more communication device processors.

The third radiohead 2802*c* may include an antenna interface 2803*c*. The antenna interface 2803*c* may be connected to an antenna 2804*c*. The antenna interface 2803*c* may provide an interface between the antenna 2804*c* and a radio frequency front end 2805*c*. In an example, the antenna interface 2803*c* may include a port or a socket to receive a communication signal. The radio frequency front end 2805*c* may receive a wireless communication signal via the antenna interface.

The third radiohead circuit 2802*c* may further include a portion of a transceiver chain 2806*c* including one or more processors 2807*c* coupled to a communication interface module 2808*c*. The communication interface module 2808*c* may be configured to couple the one or more processors 2807*c* of the third radiohead 2802*c* to one or more radiohead external processors external to the third radiohead 2802*c*. In an example, the one or more radiohead external processors may include one or more communication device processors.

Furthermore, the communication device may include one or more communication device processors 2809. In this example, the one or more communication device processors 2809 are coupled to each of the one or more processors of radioheads via the communication interface. The one or more communication device processors include the other portion of the transceiver chain for the transceiver chain of the first radiohead 2802*a*, the second radiohead 2802*b*, and the third radiohead 2802*c*.

FIG. 29 shows schematically an example of a representation of a communication device. In an example, the communication device may include the communication device referred in FIG. 28. In an example, the communication device 2901 includes one or more communication device processors 2902. The one or more communication device processors 2902 includes a medium access control (MAC) layer portion 2903. The medium access control (MAC) layer portion 2903 may implement one or more medium access control (MAC) layer functions.

The one or more communication device processors 2902 further include a communication device interface module 2904 which connects the one or more communication device processors 2902 to a communication interface. In an example, the communication interface may include a digital communication interface. In an example, the communication interface may include a Serial Time Encoded Protocol (STEP) interface. In examples, the Serial Time Encoded Protocol (STEP) interface may be digitally coupled to the one or more communication device processors 2902 and configured to transmit digital communication over the digital link in between. In examples, this digital link may provide bi-directional digital communications in accordance with an asynchronous time-based protocol, and may therefore provide for communications employing time division multiplexing.

The communication device 2901 further includes a first radiohead 2905. The first radiohead 2905 may include a first physical (PHY) layer portion 2906 to perform at least one physical (PHY) layer function based on an instruction received at the medium access control (MAC) layer portion 2903. In an example, the first physical (PHY) layer portion 2906 performs tasks related to the physical (PHY) layer functions of the first radiohead 2905. In an example, the tasks may relate to transmitting a wireless communication signal in a transmitting mode, or receiving a wireless communication signal in a receiving mode.

The first physical (PHY) layer portion 2906 may include the radiohead radio frequency front end, the analog-to-digital/digital-to-analog (AD/DA) converters, the up/down converters, line conditioning or impedance matching circuit, amplifiers, filters, and such, which are the elements between the antenna and the one or more processors of the first radiohead 2905 which may be involved to finally provide packets to the medium access control (MAC) layer portion 2903. In an example, the first physical (PHY) layer portion 2906 may also include a first physical (PHY) layer processing unit for operation and management processing capabilities of the physical (PHY) layer portion.

In an example, the first radiohead 2905 may include a first communication interface module 2907 which connects the first radiohead 2905 to the communication interface and provides communication between the first radiohead 2905 and the one or more communication device processors 2902. In an example, one or more processors of the first radiohead 2905 may include at least a portion of the first communication interface module. Further, the first radiohead 2905 may include a first control module 2908, which controls the first physical (PHY) layer portion 2906 based on a received scheduling instruction.

The communication device 2901 further includes a second radiohead 2909. The second radiohead 2909 may include a second physical (PHY) layer portion 2910 to perform at least one physical (PHY) layer function based on a service received at the medium access control (MAC) layer portion 2903. In an example, the second physical (PHY) layer portion 2910 performs tasks related to the physical (PHY) layer functions of the second radiohead 2909. In an example, the tasks may relate to transmit a wireless communication signal in a transmitting mode, or receive a wireless communication signal in a receiving mode.

The second physical (PHY) layer portion 2910 may include the radiohead radio frequency front end, the analog-to-digital/digital-to-analog (AD/DA) converters, the up/down converters, line conditioning or impedance matching circuit, amplifiers, filters and such, which are the elements between the antenna and the one or more processors of the second radiohead 2909 which may be involved to finally provide packets to the medium access control (MAC) layer portion 2903. In an example, the second physical (PHY) layer portion 2910 may also include a second physical (PHY) layer processing unit for operation and management processing capabilities of the physical (PHY) layer portion.

In an example, the second radiohead 2909 may include a second communication interface module 2911 which connects the second radiohead 2909 to the communication interface and provides communication between the second radiohead 2909 and the one or more communication device processors 2902. In an example, one or more processors of the second radiohead 2909 may include at least a portion of the second communication interface module. Further, the second radiohead 2909 may include a second control module 2912, which controls the second physical (PHY) layer portion 2910 based on a received scheduling instruction.

The communication device 2901 may further include a third radiohead 2913. The third radiohead 2913 may include a third physical (PHY) layer portion 2914 to perform at least one physical (PHY) layer function based on a service received at the medium access control (MAC) layer portion 2903. In an example, the third physical (PHY) layer portion 2914 performs tasks related to the physical (PHY) layer functions of the third radiohead 2913. In an example, the tasks may relate to transmit a wireless communication signal in a transmitting mode, or receive a wireless communication signal in a receiving mode.

The third physical (PHY) layer portion 2914 may include the radiohead radio frequency front end, the analog-to-digital/digital-to-analog (AD/DA) converters, the up/down converters, line conditioning or impedance matching circuit, amplifiers, filters, and such, which are the elements between the antenna and the one or more processors of the third radiohead 2913 which may be involved to finally provide packets to the medium access control (MAC) layer portion 2903. In an example, the third physical (PHY) layer portion 2914 may also include a third physical (PHY) layer processing unit for operation and management processing capabilities of the physical (PHY) layer portion.

In an example, the third radiohead 2913 may include a third communication interface module which connects the third radiohead 2913 to the communication interface and provides communication between the third radiohead 2913 and the one or more communication device processors 2902. In an example, one or more processors of the third radiohead 2913 may include at least a portion of the third communication interface module. Further, the third radiohead 2913 may include a third control module, which controls the second physical (PHY) layer portion 2910 based on a received scheduling instruction.

In an example, a physical (PHY) layer portion, which may be any of the first physical (PHY) layer portion, and/or the second physical (PHY) layer portion 2910, and/or the third physical (PHY) layer portion 2914 may receive MAC layer data units which may include medium access control (MAC) layer service data units (MSDUs) or medium access control (MAC) layer protocol data units (MPDUs). from the medium access control (MAC) layer portion 2903. In an example, a physical (PHY) layer portion may encapsulate the MAC layer data units to generate physical (PHY) layer data units including physical (PHY) layer protocol data units (PPDUs) for transmission. In an example, a physical (PHY) layer portion may receive physical (PHY) layer data units that were received. In an example, a physical (PHY) layer portion may extract MAC layer data units encapsulated within the physical (PHY) layer data units.

In an example, the medium access control (MAC) layer portion 2903 implements at least one medium access control (MAC) function related to a medium access control (MAC) layer according to a telecommunication protocol in accordance with various aspects of this disclosure. In an example, the medium access control (MAC) layer portion 2903 may control a physical (PHY) layer portion for the physical (PHY) layer portion to perform a task. In an example, the medium access control (MAC) layer portion 2903 may provide signals to control a physical (PHY) layer portion. In an example, the medium access control (MAC) layer portion 2903 may generate MAC layer data units including medium access control (MAC) layer service data units (MSDUs). In an example, the medium access control (MAC) layer portion 2903 may generate medium access control (MAC) layer protocol data units (MPDUs). In an example, the medium access control (MAC) layer portion 2903 may provide the MAC layer data units to a physical (PHY) layer portion, so that the physical (PHY) layer portion may encapsulate the data units.

In an example, the medium access control (MAC) layer portion 2903 may select communication channels which medium access control (MAC) layer data units should be transmitted and to control a physical (PHY) layer portion based on the selection. In an example, the medium access control (MAC) layer portion 2903 may determine when a communication channel is ready for transmission and the medium access control (MAC) layer portion 2903 may control a physical (PHY) layer portion based on the determination.

In an example, the medium access control (MAC) layer portion 2903 may determine when to scan a communication channel and control a physical (PHY) layer portion based on the determination. In an example, the medium access control (MAC) layer portion 2903 may determine which channels to be scanned and control a physical (PHY) layer portion based on the determination. In an example, the medium access control (MAC) layer portion 2903 may determine the configuration for a physical (PHY) layer portion to transmit or receive communication signals and provides the configuration to the physical (PHY) layer portion.

In an example, the medium access control (MAC) layer portion 2903 may determine the configuration for a plurality of the physical (PHY) layer portions to perform a maximal ratio combining functions. In an example, the medium access control (MAC) layer portion 2903 may determine for a physical (PHY) layer portion based on a signal quality of reception and/or transmission of a plurality of physical (PHY) layer portions. In an example, the medium access control (MAC) layer portion 2903 may determine when to schedule a task for a physical (PHY) layer portion related to any function of the medium access control (MAC) layer portion 2903.

In an example, the one or more communication device processors 2902 may send a scheduling instruction to one of the radioheads 2905, 2909, 2913 for performing a function related to the physical (PHY) layer portion of the respective radiohead. In an example, the scheduling instruction relates to a task which the medium access control (MAC) layer portion 2903 schedules for the physical (PHY) layer portion of the one of the radioheads. In an example, the task may be related to a function of the physical (PHY) layer portion of the one of the radioheads. In an example, the one or more communication device processors 2902 may send a scheduling instruction to one of the radioheads to schedule a task for one or more physical (PHY) layer functions of the one of the radioheads.

In an example, the one or more communication device processors 2902 may send a first scheduling instruction to the first radiohead 2905 for performing a function related to the first physical (PHY) layer portion. In an example, the first scheduling instruction relates to a task which the medium access control (MAC) layer portion 2903 schedules for the first physical (PHY) layer portion. In an example, the task may be related to a function of the first physical (PHY) layer portion. In an example, the one or more communication device processors 2902 may send the first scheduling instruction to the first radiohead 2905 to schedule a first task for one or more physical (PHY) layer functions of the first radiohead 2905.

In an example, the one or more communication device processors 2902 may send a second scheduling instruction to the second radiohead 2909 for performing a function related to the second physical (PHY) layer portion 2910. In an example, the second scheduling instruction relates to a task which the medium access control (MAC) layer portion 2903 schedules for the second physical (PHY) layer portion 2910. In an example, the task may be related to a function of the second physical (PHY) layer portion 2910. In an example, the one or more communication device processors 2902 may send the second scheduling instruction to the one or more processors of the second radiohead 2909 to schedule a second task for one or more physical (PHY) layer functions of the second radiohead 2909.

In an example, the one or more communication device processors 2902 may send a first scheduling instruction to the one or more processors of the first radiohead 2905 and the scheduling instruction may include an indication for the one or more processors of the first radiohead 2905 to transmit a wireless communication signal based on a first set of communication settings. In an example, the first set of communication settings include information related to a communication channel which the medium access control (MAC) layer portion 2903 requests the wireless communication signal to be transmitted by the first radiohead 2905.

In an example, the one or more communication device processors 2902 may further provide the medium access control (MAC) layer protocol data unit (MPDU) to be transmitted to the first radiohead 2905. In an example, the one or more processors of the first radiohead 2905 may receive the medium access control (MAC) layer protocol data unit (MPDU) and encapsulate the medium access control (MAC) layer protocol data unit (MPDU) based on the first scheduling instruction to a physical (PHY) layer protocol data unit (PPDU).

In an example, the one or more communication device processors 2902 may send a first scheduling instruction to the one or more processors of the first radiohead 2905 and the scheduling instruction may include an indication for the one or more processors of the first radiohead 2905 to receive a wireless communication signal based on a first set of communication settings. In an example, the first set of communication settings include information related to a communication channel which the medium access control (MAC) layer portion 2903 requests the wireless communication signal to be received by the first radiohead 2905.

In an example, the one or more communication device processors 2902 may send a second scheduling instruction to the one or more processors of the second radiohead 2909 and the scheduling instruction may include an indication for the one or more processors of the second radiohead 2909 to transmit a wireless communication signal based on a second set of communication settings. In an example, the second set of communication settings include information related to a communication channel which the medium access control (MAC) layer portion 2903 requests the wireless communication signal to be transmitted by the second radiohead 2909.

In an example, the one or more communication device processors 2902 may further provide the medium access control (MAC) layer protocol data unit (MPDU) to be transmitted to the second radiohead 2909. In an example the one or more processors of the second radiohead 2909 may receive the medium access control (MAC) layer protocol data unit (MPDU) and encapsulate the medium access control (MAC) layer protocol data unit (MPDU) based on the second scheduling instruction to a physical (PHY) layer protocol data unit (PPDU).

In an example, the one or more communication device processors 2902 may send a second scheduling instruction to the one or more processors of the second radiohead 2909 and the scheduling instruction may include an indication for the one or more processors of the second radiohead 2909 to receive a wireless communication signal based on a second set of communication settings. In an example, the second set of communication settings include information related to a communication channel which the medium access control (MAC) layer portion 2903 requests the wireless communication signal to be received by the second radiohead 2909.

Accordingly, the one or more communication device processors 2902 may instruct the first radiohead 2905 to transmit or receive communication signals based on a first set of communication settings as the first task, and the second radiohead 2909 to transmit or receive based on a second set of communication settings as the second task. The one or more processors of the first radiohead 2905 accordingly control transmitting or receiving communication signals based on the first set of communication settings, and the one or more processors of the second radiohead 2909 control transmitting or receiving communication signals based on the second set of communication settings.

In an example, the first radiohead 2905 receives communication signals from a first communication channel, and the second radiohead 2909 transmits communication signals to a second communication channel. Alternatively, the first radiohead 2905 may receive communication signals from the first communication channel, and the second radiohead 2909 may transmit communication signals to the first communication channel.

In an example, the one or more communication device processors 2902 may instruct the first radiohead 2905 to perform a first scanning function with a first set of scanning parameters, and the second radiohead 2909 to perform a second scanning function with a second set of scanning parameters. In an example, the one or more communication device processors 2902 may instruct the first radiohead 2905 to perform an active scanning at a first communication channel, and the second radiohead 2909 to perform a passive scanning at a second communication channel.

Accordingly, the one or more processors of the first radiohead 2905 perform the active scanning at the first communication channel based on the first scheduling instruction with the first physical (PHY) layer portion, and the one or more processors of the second radiohead 2909 performs the passive scanning at the second communication channel based on the second scheduling instruction with the second physical (PHY) layer portion 2910.

In an example, the first radiohead 2905 performs a scanning function, and the second radiohead 2909 performs an advertising function. In an example, the first radiohead 2905 performs the scanning function at a first communication channel and the second radiohead 2909 performs the advertising function at a second communication channel.

In an example, the one or more communication device processors 2902 may instruct the first radiohead 2905 to transmit a first data packet using the one or more physical (PHY) layer functions of the first radiohead 2905, and the second radiohead 2909 to transmit a second data packet using the one or more physical (PHY) layer functions of the second radiohead 2909. In an example, the one or more communication device processors 2902 may further send a first medium access control (MAC) layer protocol data unit (MPDU) to the first radiohead 2905, for the first radiohead 2905 to encapsulate the first medium access control (MAC) layer protocol data unit (MPDU) with the one or more physical (PHY) layer functions of the first radiohead 2905.

In an example, the one or more communication device processors 2902 may further send a second medium access control (MAC) layer protocol data unit (MPDU) to the second radiohead 2909, for the second radiohead 2909 to encapsulate the second medium access control (MAC) layer protocol data unit (MPDU) with the one or more physical (PHY) layer functions of the second radiohead 2909.

FIG. 30 shows schematically an example of a communication flow related to the scheduling instructions. The provided schematic relates to a communication flow between a first radiohead 3001, a second radiohead 3002, and one or more processors of the communication device 3003.

The one or more processors of the communication device 3003 send a first scheduling instruction 3004 to the first radiohead 3001. As an example, the first scheduling instruction 3004 includes an indication to select a first communication channel to transmit a first data unit as a broadcast. The first scheduling instruction 3004 includes an information related to the first communication channel. In an example, the one or more processors of the communication device 3003 may further provide the first data unit to be broadcasted based on the first scheduling instruction 3004.

The first radiohead 3001 receives the first scheduling instruction and performs the task 3005 of selecting the first communication channel to transmit a first data unit as a broadcast. The one or more processors of the first radiohead 3001 control the physical (PHY) layer portion of the first radiohead 3001 to select the first communication channel. In an example, the one or more processors of the first radiohead 3001 may receive the information related to the first communication channel from the first scheduling instruction, and adjust the reference frequency of the local oscillator and the symbol rate of the digital demodulator based on the information related to the first communication channel.

In an example, the one or more processors of the first radiohead 3001 may adjust the equalizer and the amplifier based on the information related to the first communication channel. Further, the one or more processors of the first radiohead 3001 may arrange the antenna interface based on the information related to the first communication channel. The one or more processors may adjust the settings of the digital-to-analog converter based on the symbol rate.

The one or more processors of the communication device 3003 may send a second scheduling instruction 3006 to the second radiohead 3002. As an example, the second scheduling instruction 3006 includes an indication to select a second communication channel to receive a communication signal. The second scheduling instruction 3006 includes an information related to the second communication channel.

The second radiohead 3002 receives the second scheduling instruction and performs the task 3007 of selecting the second communication channel to receive a communication signal. The one or more processors of the second radiohead 3002 control the physical (PHY) layer portion of the second radiohead 3002 to select the second communication channel. In an example, the one or more processors of the second radiohead 3002 may receive the information related to the second communication channel from the second scheduling instruction, and adjust the reference frequency of the local oscillator and the symbol rate of the digital demodulator based on the information related to the second communication channel.

In an example, the one or more processors of the second radiohead 3002 may adjust the equalizer and the amplifier based on the information related to the second communication channel. Further, the one or more processors of the second radiohead 3002 may arrange the antenna interface based on the information related to the second communication channel. The one or more processors may adjust the settings of the analog-to-digital converter based on the symbol rate.

The one or more processors of the communication device 3003 may send a third scheduling instruction 3008 to the first radiohead 3001 to initiate the transmission of the first data unit as broadcast for the communication channel previously arranged 3005. In an example, the one or more processors of the communication device 3003 may further provide the first data unit to be broadcasted based on the first scheduling instruction 3008 with the third scheduling instruction.

The first radiohead 3001 receives the third scheduling instruction and performs the task 3009 of transmitting the first data unit as broadcast for the arranged communication channel. Accordingly, the one or more processors of the first radiohead 3001 control the physical (PHY) layer portion of the first radiohead 3001 to transmit the first data unit as broadcast. In an example, the one or more processors may encapsulate the first data unit based on the scheduling instruction, and provide the encapsulated data to a digital demodulator. The digital demodulator provides the data to the digital-to-analog converter. The digital-to-analog converter converts the digital signal to an analog signal. An up-converter up converts the analog signal and an amplifier amplifies the analog signal. Finally, the antenna transmits the signal which includes the first data unit as a broadcast.

The one or more processors of the communication device 3003 may send a fourth scheduling instruction 3010 to the second radiohead 3002 to initiate the receive the communication signal from the second communication channel previously arranged 3007. The second radiohead 3002 receives the fourth scheduling instruction and performs the task 3011 of receiving the communication signal.

Accordingly, the one or more processors of the second radiohead 3002 control the physical (PHY) layer portion of the second radiohead 3002 to receive the communication signal. In an example, the one or more processors of the second radiohead 3002 may detect the preamble, and perform an automatic gain control function. In an example, the second radiohead 3002 may perform digital demodulation for the received communication signal. In an example, the one or more processors may receive the PCLP protocol data unit and decapsulate the PLCP protocol data unit to a PLCP service data unit and send the PLCP service data unit to the one or more processors of the communication device 3003.

The one or more processors of the communication device 3003 may send a fifth scheduling instruction 3012 to the first radiohead 3001 to perform a passive scan for a third communication channel. In an example, the fifth scheduling instruction 3012 may include information related to the third communication channel. In an example, the fifth scheduling instruction may include information related to the passive scan to be performed.

Accordingly, the first radiohead 3001 receives the fifth scheduling instruction and performs the task 3013 of performing the passive scan at the third communication channel based on the fifth scheduling instruction. The one or more processors of the first radiohead 3001 may set up the physical (PHY) layer portion of the first radiohead 3001 for the third communication channel, and one or more processors of the first radiohead 3001 may start listening to the third communication channel for the passive scan.

The one or more processors of the communication device 3003 may send a sixth scheduling instruction 3014 to the second radiohead 3002 to perform an active scan. In an example, the one or more processors of the communication device 3003 may also perform the active scan frame to be sent by the second radiohead 3002 with the sixth scheduling instruction 3014. Accordingly, the second radiohead 3002 may receive the sixth scheduling instruction and the active scan frame and performs the task 3015 of performing the active scan based on the sixth scheduling instructions.

In an example, the one or more communication device processors 3003 may provide a timing information in the scheduling instruction. In an example, the timing information indicates the time of the task to be performed. In an example, the one or more processors of the respective radiohead which receives the scheduling instruction including the timing information may schedule the task instructed with the scheduling instruction based on the timing information.

In an example, the one or more communication device processors 3003 may provide a first scheduling instruction to the first radiohead 3001 to perform a signal quality measurement for a first communication channel at a first time. In an example, the one or more communication device processors 3003 may provide a second scheduling instruction to the second radiohead 3002 to perform the same signal quality measurement for the first communication channel at a second time.

Accordingly, the one or more processors of the first radiohead 3001 receive the first scheduling instruction and the first physical (PHY) layer portion performs the signal quality measurement at the first time, and the one or more processors of the second radiohead 3002 receive the second scheduling instruction and the second physical (PHY) layer portion performs the signal quality measurement at the second time.

In an example, the respective radiohead which receives the scheduling instruction may include a timing module to schedule the task to be performed based on the scheduling instruction. In an example, the control module may control the respective element of the physical (PHY) layer portion based on the timing information which the scheduling instruction includes. In an example, the control module includes the timing module. In an example, the control module may send an indication to the physical (PHY) layer processing unit based on the timing information, so that the physical (PHY) layer portion performs the provided task at the time which the timing information provides.

In an example, the timing information may include a specific time to perform the task. In an example, the timing information may include a relative time based on a second task to be performed. In an example, the timing information may include a relative time based on a second task that has been already performed. In an example, the timing information may include estimated duration of the task to be performed, and the one or more processors of the radiohead may schedule the task based on its duration. In an example, the timing information may indicate to perform the task at a first time which the physical (PHY) layer portion is idle.

FIG. 31 shows schematically an example of a communication flow related to the scheduling instructions. The provided schematic relates to a communication flow between a first radiohead 3101, a second radiohead 3102, and one or more processors of the communication device 3103.

In this example, the one or more processors of the communication device 3103 send a first scheduling instruction 3104 and a second scheduling instruction 3105 to the first radiohead 3101. In this example, the first scheduling instruction 3104 includes an information related to a first task with a first timing information to perform the first task, and the second scheduling instruction 3105 includes an information related to a second task with a second timing information to perform the second task.

Further, the one or more processors of the communication device 3103 send a third scheduling instruction 3106, a fourth scheduling instruction 3107, and a fifth scheduling instruction 3108 to the second radiohead 3102. In this example, the third scheduling instruction 3106 includes an information related to a third task with a third timing information to perform the third task, the fourth scheduling instruction 3107 includes an information related to a fourth task with a fourth timing information to perform the fourth task, and the fifth scheduling instruction 3108 includes an information related to a fifth task with a fifth timing information to perform the fifth task.

Accordingly, the first radiohead 3101 receives the first scheduling instruction 3104 and the second scheduling instruction 3105. The one or more processors of the first radiohead 3101 check the first timing information related to the first task and schedules the first task based on the first timing information. Further, the second radiohead 3102 checks the second timing information related to the second task and schedules the second task based on the second timing information.

The physical (PHY) layer portion of the first radiohead 3101 performs the first task 3109 at a first time which the first scheduling instruction 3104 indicates with the first timing information. The physical (PHY) layer portion of the first radiohead performs the second task 3110 at a second time which the second scheduling instruction 3105 indicates with the second timing information.

In an example, a control module of the one or more processors of the first radiohead 3101 determines the time to send a control signal to the physical (PHY) layer portion based on the first timing information of the first scheduling instruction 3104, and the control module of the one or more processors of the first radiohead 3101 sends the control signal to the physical (PHY) layer portion based on the determination of the time. In an example, the control module of the one or more processors of the first radiohead 3101 determines the time to send a control signal to the physical (PHY) layer portion based on the second timing information of the second scheduling instruction 3105, and the control module of the one or more processors of the first radiohead 3101 sends the control signal to the physical (PHY) layer portion based on the determination of the time.

Further, the second radiohead 3102 receives the third scheduling instruction 3106, the fourth scheduling instruction 3107, and the fifth scheduling instruction 3108. The one or more processors of the second radiohead 3102 check the third timing information related to the first task and schedules the third task based on the third timing information. Further, the second radiohead 3102 checks the fourth timing information related to the fourth task and schedules the fourth task based on the fourth timing information.

Further, the second radiohead 3102 checks the fifth timing information related to the fifth task and schedules the fifth task based on the fifth timing information. The physical (PHY) layer portion of the second radiohead 3102 performs the third task 3113 at the third time which the third scheduling instruction 3106 indicates with the third timing information.

The physical (PHY) layer portion of the second radiohead 3102 performs the fourth task 3114 at a fourth time, which the fourth scheduling instruction 3107 indicates with the fourth timing information The physical (PHY) layer portion of the second radiohead 3102 performs the fifth task 3115 at a fifth time which the fifth scheduling instruction 3108 indicates with the fifth. timing information.

In an example, a control module of the one or more processors of the second radiohead 3102 determines the time to send a control signal to the physical (PHY) layer portion based on the third timing information of the third scheduling instruction 3106, and the control module of the one or more processors of the second radiohead 3102 sends the control signal to the physical (PHY) layer portion based on the determination of the time.

In an example, the control module of the one or more processors of the second radiohead 3102 determines the time to send a control signal to the physical (PHY) layer portion based on the fourth timing information of the fourth scheduling instruction 3107, and the control module of the one or more processors of the second radiohead 3102 sends the control signal to the physical (PHY) layer portion based on the determination of the time.

In an example, the control module of the one or more processors of the second radiohead 3102 determines the time to send a control signal to the physical (PHY) layer portion based on the fifth timing information of the fifth scheduling instruction 3108, and the control module of the one or more processors of the second radiohead 3102 sends the control signal to the physical (PHY) layer portion based on the determination of the time.

Further, the one or more processors of the communication device 3103 send a sixth scheduling instruction 3112 to the first radiohead 3101 after the first radiohead 3101 has performed the first task based on the first scheduling instruction 3104, and the second task based on the second scheduling instruction 3105.

Accordingly, the first radiohead 3101 receives the sixth scheduling instruction 3112. The one or more processors of the first radiohead 3101 check a timing information related to the sixth task which the sixth scheduling instruction 3112 includes, and schedules the sixth task related to the sixth scheduling instruction 3112 based on the sixth timing information. The physical (PHY) layer portion of the first radiohead 3101 performs the sixth task at a sixth time which the sixth scheduling instruction 3112 indicates with the sixth timing information.

FIG. 32 shows schematically an example of a communication flow in accordance with various aspects of this disclosure. The provided schematic relates to a communication flow between a first radiohead 3201, a second radiohead 3202, and one or more processors of the communication device 3203.

In this example, the one or more processors of the communication device 3203 sends a scheduling instruction 3204 to the first radiohead 3201. The scheduling instruction 3204 may include an instruction to the first radiohead 3201 to provide a response to the scheduling instruction 3204. In an example, the response may include an acknowledgment signal. In an example, the response may include a data related to the task which the scheduling instruction 3204 relates to. In this example, the scheduling instruction 3204 includes a query for the first radiohead 3201 whether the first radiohead 3201 is idle or not.

The first radiohead 3201 provides a response 3205 to the scheduling instruction 3204. In the response 3205 the first radiohead 3201 indicates that the first radiohead 3201 is idle. The one or more processors of the communication device 3203 receive a data related to the scheduling instruction 3204. In this example, the one or more processors of the communication device 3203 receive the response 3205 from the first radiohead that the first radiohead 3201 is indeed idle.

Following the idle response 3205 of the first radiohead 3201, the one or more processors of the communication device 3203 send a first scheduling instruction 3206 to the first radiohead 3201, and a second scheduling instruction 3207 to the second radiohead 3202 to schedule a first signal measurement by the first radiohead 3201 and a second signal measurement by the second radiohead 3202. In an example, the first signal measurement and the second signal measurement may be performed at the same time.

In an example, the tasks which are indicated by the first scheduling instruction 3206 and the second scheduling instruction 3207 further include an instruction for the respective radiohead to provide a response signal to the one or more processors of the communication device 3203, wherein the response signal includes information related to the respective signal measurement of the respective radiohead. In an example, the one or more processors of the communication device 3203 may also send another instruction to a radiohead to request a response signal based on a scheduling instruction at a later stage.

Accordingly, the first radiohead 3201 performs the first signal measurement 3208 based on the first scheduling instruction 3206 and provides a first response signal 3210 to the one or more communication device processors 3203. In an example, the first response signal 3210 includes at least one metric regarding the first signal measurement. Further, the second radiohead 3202 performs the second signal measurement 3209 based on the second scheduling instruction 3207 and provides a second response signal 3211 to the one or more communication device processors 3203. In an example, the second response signal 3211 includes at least one metric regarding the second signal measurement.

The one or more processors of the communication device 3203 receive the first response signal 3210 and the second response signal 3211. Based on the first response signal 3210 and the second response signal, the one or more processors of the communication device 3203 perform calculations 3212 based on the at least one metric regarding the first signal measurement and the at least one metric regarding the second signal measurement. Based on the calculations, the one or more processors of the communication device 3203 may define a first receiver configuration to be provided to the first radiohead 3201, and a second receiver configuration to be provided to the second radiohead 3202 in order to perform a diversity combining based on a first communication signal to be received by the first radiohead 3201 and a second communication signal to be received by the second radiohead 3202.

Accordingly, the one or more processors of the communication device 3203 send another scheduling instruction 3213 which may include the first receiver configuration and an instruction to receive a communication signal based on the first receiver configuration to the first radiohead 3201. The one or more processors of the communication device 3203 send another scheduling instruction 3214 which may include the second receiver configuration and an instruction to receive a communication signal based on the second receiver configuration to the second radiohead 3202.

The first radiohead 3201 receives the scheduling instruction 3213, and configures the receiving portion of physical (PHY) layer portion 3215 based on the first receiver configuration, and initiate receiving the communication signal based on the scheduling instruction 3213. The second radiohead 3202 receives the scheduling instruction 3214, and configures the receiving portion of physical (PHY) layer portion 3216 based on the second receiver configuration, and initiate receiving the communication signal based on the scheduling instruction 3214.

The first radiohead 3201, and the second radiohead 3202 provide their response 3217, 3218 to the one or more communication device processors 3203. Further, the first radiohead 3201 and the second radiohead 3202 also send the communication signals which they receive based on the first receiver configuration and the second receiver configuration. In an example, the one or more processors of the communication device 3203 may perform diversity combining 3219 with the communication signals which the first radiohead 3201 and the second radiohead 3202 receive.

In an example, the one or more processors of the communication device 3203 may send a first set of signal configuration information to the first radiohead, and a second set of signal configuration information to the second radiohead. In an example, the first set of signal configuration information and the second set of signal configuration information may include gain information to provide maximal-ratio combining.

In accordance with various aspects of this disclosure, a device, in particular, a communication device may include a memory, and one or more processors, such as processing circuitry 810 and memory 820 referring back to FIG. 8 and the communication device includes a first radiohead and a second radiohead. The memory 820 may be implemented as one or more computer-readable medium including one or more instructions that when executed on at least one processor implement a method including sending a first scheduling instruction to one or more first radiohead processors of a first radiohead to implement one or more first circuit physical layer (PHY) functions and to schedule a first task for the one or more first radiohead physical layer (PHY) functions, and sending a second scheduling instruction to one or more second radiohead processors of a second radiohead to implement one or more second physical layer (PHY) functions and to schedule a second task for the one or more second radiohead physical layer (PHY) functions.

In accordance with various aspects of this disclosure, one may consider that the remote nature of a radiohead with respect to a modem, or one or more processors of a communication device might be further adapted based on the requirements of the communication protocol, or certain aspects may be adapted according to the needs to provide an ideal communication system for the circumstances. In certain examples, less power consumption for a communication device may be desired.

The remote nature of the radiohead and the presence of a communication interface between the radiohead and the communication device result to power consumption to transfer information between the radiohead and the communication device. The power consumption to transfer information between the radiohead and the communication device may increase with a new radiohead being added to the communication device.

Since the radiohead is a remote unit to the one or processors of the communication device, in certain aspects the communication interface between the one or more processors of the communication device and the radiohead should be kept open, so that the radiohead may always receive a service from the one or more processors of the communication device.

In accordance with various aspects of this disclosure, at least one service will be needed when a communication signal is received by the radiohead, because the radiohead may rely on the modem in order to demodulate or decode the communication signal. Accordingly, a further power saving mechanism related to the communication interface may be preferable for a radiohead, and a communication device including the radiohead.

Many modern communication systems follow the Open Systems Interconnection (OSI) model, which characterizes the communication in abstract layers between the physical implementation of transmitting and receiving communication signals, and representation of data at the highest level in an application. The first two layers of the model from a perspective of a communication channel, such as a wireless communication channel, are the physical (PHY) layer, and the data link layer. The data link layer includes a sublayer called the medium access control (MAC) layer, which is the consecutive layer to the physical (PHY) layer.

The physical (PHY) layer relates to the transmission and reception of data between a communication device and the communication channel. The physical (PHY) layer may include converting digital bits into analog communication signals. Although the definition of medium access control (MAC) layer may differ based on a communication protocol, the medium access control (MAC) layer may include functions that may control how the communication device access the communication channel and when and how it transmits information.

FIG. 33 shows schematically a representation of the physical layer and data link layer according to certain communication protocols. 3301 shows the direction of transmission of data. The data link layer (DLL) 3302 is the second layer, and the data link layer (DLL) 3302, in general, is responsible for transferring data between network entities during communication. The data link layer (DLL) 3302 provides the functions and procedures which may be needed to transfer the data while detecting and correcting certain errors that may be linked to the physical (PHY) layer 3303.

The data link layer (DLL) 3302 may be considered to include two sub layers. The layer which is the neighbor of the third layer is the logical link control (LLC) sublayer 3304. The logical link control (LLC) sublayer 3304 is generally responsible for providing flow control, acknowledgment, error notification, addressing, and control of the data link. Further, the logical link control (LLC) sublayer 3304 provides addressing and control of the data to be exchanged.

medium access control (MAC) layer 3305 generally provides services to determine who is going to access the medium and to control the hardware. medium access control (MAC) layer exchange medium access control (MAC) layer Service Data Unit between layers. Further, medium access control (MAC) layer 3305 provides services for using the physical (PHY) layer services to transport a MAC service data unit (MSDU) to another medium access control (MAC) layer entity. Further, medium access control (MAC) layer 3305 provides security services, such as Counter Mode Cipher Block Chaining Message Authentication Code Protocol (CCMP), Glois/Counter Mode Protocol (GCMP), Bearer Independent Protocol (BIP). medium access control (MAC) layer 3305 further reorder MSDUs to support Quality of Services (QoS).

physical (PHY) layer 3303 is the first layer and includes the means of transmitting/receiving data from the communication medium. It generally includes the electronic circuits to convert the frame data to a communication signal. It may include functions to map the MPDUs into a frame format for transmitting and receiving data, and defines methods of transmitting and receiving data.

The physical (PHY) layer performs tasks related to the physical (PHY) layer functions. In an example, the tasks may relate to transmitting a wireless communication signal in a transmitting mode or receiving a wireless communication signal in a receiving mode. The physical (PHY) layer may contain the radiohead RF circuit, the analog-to-digital/digital-to-analog (AD/DA) converters, the up/down converters, line conditioning or impedance matching circuit, and a physical (PHY) layer processing unit. In an example, the physical (PHY) layer portion may also have a circuit for operation and management processing capabilities.

Conceptually, it may be considered that the physical (PHY) layer 3303 includes three sublayers. The Physical Coding Sublayer (PCS) 3307 mainly provides services related to data encoding, decoding, scrambling and descrambling, alignment marker insertion and removal and such, the Physical Medium Attachment Sublayer (PMA) 3308 which mainly provides services related to collision detection, clock recovery, reset, transmit, receive, carrier sense, and such, and Physical Medium Dependent Sublayer (PMD) 3309 which generally provides services related to bit timing, signal encoding, physical medium instructions and such.

FIG. 34 shows schematically a representation of management entities in accordance with various aspects of this disclosure. The medium access control (MAC) layer 3401 conceptually includes a management entity medium access control (MAC) layer Management Entity (MLME) 3402, and the physical (PHY) layer 3403 conceptually includes a management entity called physical (PHY) layer Management Entity (PLME) 3404. Similar to the representation with respect to the layers in FIG. 33, each management entity of the respective layer may provide and/or receive a service to the other layer.

Further, the medium access control (MAC) layer Management Entity (MLME) 3402 and the physical (PHY) layer Management Entity (PLME) 3402 may also provide and/or receive a service from an entity called station management entity (SME) 3405, which is another management plane in a communication device. According to the layered structure, each layer, and each processing unit related to each of the layers, may provide a service to an upper layer or a lower layer.

FIG. 35 shows schematically an example of a radiohead in accordance with various aspects of this disclosure. The radiohead 3501 includes an antenna interface 3502 which may be coupled to an antenna 3503. The antenna interface 3502 may include an antenna port to couple to the antenna 3503. In an example, the antenna interface 3502 may include a duplexer to provide switching between the transmitting portion of the radiohead 3501 for the transmitting function, and the receiving portion of the radiohead 3501 for the receiving function. The radiohead 3501 uses the transmitting portion in a transmitting mode and the receiving portion in a receiving mode.

The antenna interface 3502 further includes an antenna port. The antenna port couples the antenna 3503 to the antenna interface 3502. The radiohead 3501 further includes a radio frequency front end portion 3504. The radiohead 3501 may receive and/or transmit wireless communication signals via the radio frequency front end 3504 and the antenna interface 3502. The radio frequency front end 3504 may include an amplifier 3505 and a band-pass filter 3506 for the receiving function. The radio frequency front end 3504 may further include a power amplifier 3507, and a band-pass filter 3508 for the transmitting function.

In this example, for the receiving function, the transceiver chain 3509 includes a down-converter including a mixer 3510 and a local oscillator 3511, an amplifier 3512, and an analog-to-digital converter 3513 as signal converter to output digital communication signals to one or more processors 3514.

For the transmitting function, the transceiver chain 3509 may include a digital-to-analog converter 3516 as signal converter to convert the digital signals which the digital-to-analog converter 3516 receives from the one or more processors 3514. The transceiver chain 3509 may also include an amplifier 3517 and an up-converter which may include another mixer 3518. In this example, the up-converter and the down-converter use the same local oscillator 3511 to provide the reference signal to the respective mixers. In an example, the transceiver chain 3509 may further include another local oscillator.

Accordingly, the signal converter block of the transceiver chain 3509 includes a signal converter including at least one of an analog-digital converter (ADC) 3513 configured to output digital communication signals in a receiving mode to the one or more processors 3514 or a digital-to-analog converter (DAC) 3516 configured to receive digital communication signals in a transmitting mode from the one or more processors 3514;

Further, the one or more processors 3514 may include a communication interface module 3519 which connects the one or more processors 3514 of the radiohead 3501 to one or more external radiohead processors external to the radiohead 3501 via a communication interface 3520. In an example, the one or more external radiohead processors may include one or more processors of a communication device which the radiohead 3501 is coupled to.

In an example, the communication interface 3520 may include a digital interface. In an example, the communication interface 3520 includes a serial digital interface. In an example, the communication interface 3520 may include a serial time encoded protocol (STEP) interface. In an example, a communication module may control the communication interface 3520.

The radiohead 3501 further includes a portion of the transceiver chain 3509 which may be coupled to the other portion of the transceiver chain external to the radiohead 3501. In an example, the one or more processors 3514 may include a physical (PHY) layer unit. In an example, the transceiver chain 3509 may include a lower medium access control (MAC) layer unit 3521 and the other portion of the transceiver chain external to the radiohead 3501 may include an upper medium access control (MAC) layer unit.

In an example, the lower medium access control (MAC) layer unit 3521 includes an interface between an upper medium access control (MAC) layer unit external to the radiohead 3501 and the physical (PHY) layer portion of the radiohead 3501. In an example, one or more processors external to the radiohead include the upper medium access control (MAC) layer unit. In an example, the one or more processors external to the radiohead include one or more communication device processors.

FIG. 36 schematically shows a representation of a portioning of medium access control (MAC) layer in accordance with various aspects of this disclosure. medium access control (MAC) layer receives and provides services to the upper layer Logical Link Layer 3601 with a portion of its functions. The medium access control (MAC) layer includes an upper medium access control (MAC) layer 3602 and a lower medium access control (MAC) layer 3603. Each portion of the medium access control (MAC) layer includes certain functions according to the partitioning of the medium access control (MAC) layer to provide and receive services from neighboring layers.

In an example, the upper medium access control (MAC) layer 3602 provides and receives services that are independent of controlling physical (PHY) layer 3604. In an example, the upper medium access control (MAC) layer 3602 provides and receives services that relate to queueing transmission, authentication, encryption and decryption, scanning, authentication, association, categorization of traffic, power management, queue management, fragmentation and defragmentation, and such. The upper medium access control (MAC) layer 3602 may manage link status and buffers before they are available for the lower medium access control (MAC) layer 3603.

In an example, the lower medium access control (MAC) layer 3603 provides and receives services that are dependent to the control of physical (PHY) layer 3604. In an example, the lower medium access control (MAC) layer 3603 may provide and receive services that relate to channel accessing, receiving validation, channel coding and decoding of air interface data blocks, and functions that involve real-time part of the functions and services that relate to physical (PHY) layer implementation, including response controls and management of real-time protocols.

Accordingly, the lower medium access control (MAC) layer 3603 and the upper medium access control (MAC) layer 3602 may provide services to each other, and receive services from each other based on their functions and services according to the partitioning. For example, the upper medium access control (MAC) layer 3602 may provide services to the lower medium access control (MAC) layer 3603 for the functions of the upper medium access control (MAC) layer 3602. Further, the lower medium access control (MAC) layer 3603 may provide services to the upper medium access control (MAC) layer 3602 for the functions of the lower medium access control (MAC) layer 3603.

Referring back to FIG. 35, the one or more processors 3514 may include a physical (PHY) layer processing unit and a lower medium access control (MAC) layer processing unit which may perform functions for the related layers. In an example, the one or more processors 3514 may implement one or more physical (PHY) layer functions and one or more lower medium access control (MAC) layer functions. In an example, the one or more processors 3514 may provide services which relate to the respective layers. In an example, the one or more processors 3514 may provide services that relate to the physical (PHY) layer using one or more physical (PHY) layer functions, and the one or more processors 3514 may provide services that relate to the lower medium access control (MAC) layer using one or more lower medium access control (MAC) layer functions.

In an example, the one or more processors 3514 may implement one or more lower medium access control (MAC) layer functions, and the one or more lower medium access control (MAC) layer functions may receive a data from the one or more physical (PHY) layer functions. In an example, the one or more lower medium access control (MAC) layer functions may receive a data from the one or more physical (PHY) layer functions when the radiohead 3501 is in the receiving mode for receiving communication signals. In an example, the one or more lower medium access control (MAC) layer functions may transmit a data to the one or more physical (PHY) layer functions, when the radiohead 3501 is in the transmitting mode for transmitting communication signals.

In accordance with various aspects of this disclosure, the one or more processors 3514 are coupled to the one or more radiohead external processors external to the radiohead 3501 via the communication interface 3520. In an example, the one or more processors 3514 may provide a service to the one or more radiohead external processors external to the radiohead 3501 which relates to one or more lower medium access control (MAC) layer functions. In an example, the one or more processors 3514 may receive a service from the one or more radiohead external processors. In an example, the one or more radiohead external processors include one or more communication device processors.

In an example, the one or more processors 3514 perform one or more lower medium access control (MAC) layer functions which may provide a service to the one or more upper medium access control (MAC) layer functions in the receiving mode. In an example, the one or more processors 3514 perform one or more lower medium access control (MAC) layer functions which receive a service from the one or more upper medium access control (MAC) layer functions in the transmitting mode.

In accordance with various aspects of this disclosure, the one or more communication device processors may provide the one or more upper medium access control (MAC) layer functions to receive a service from the one or more processors 3514 when the radiohead 3501 is in the receiving mode, and to provide a service to the one or more processors 3514 when the radiohead 3501 is in the transmitting mode.

In an example, the lower medium access control (MAC) layer unit 3521 may perform a decapsulating function to decapsulate a medium access control (MAC) layer protocol data unit (MPDU) to obtain a medium access control (MAC) layer service data unit (MSDU). In an example, the one or more processors 3514 may receive a wireless communication signal and decapsulate the PLCP protocol data unit (PPDU). The lower medium access control (MAC) layer unit 3521 may provide a service related to the decapsulating function to the upper medium access control (MAC) layer.

In an example, the lower medium access control (MAC) layer unit 3521 may receive the medium access control (MAC) layer protocol data unit (MPDU) corresponding to the PLCP protocol data unit (PPDU) and decapsulate the medium access control (MAC) layer protocol data unit (MPDU) to obtain the medium access control (MAC) layer service data unit (MSDU). After providing the decapsulating function in the receiving mode, the lower medium access control (MAC) layer unit 3521 provides the medium access control (MAC) layer service data unit (MSDU) to a function of the upper medium access control (MAC) layer unit via the communication interface 3520.

In an example, the lower medium access control (MAC) layer unit 3521 may receive a service message from the one or more communication device processors that implement the one or more upper medium access control (MAC) layer functions. In an example, the service message which the lower medium access control (MAC) layer unit 3521 receives may have an indication related to the request of the service. In this example, the lower medium access control (MAC) layer unit 3521 may receive the service message from the upper medium access control (MAC) layer unit which includes an indication to provide a service relating to the decapsulation of the received data.

FIG. 37 shows schematically an example of service communication between the lower medium access control (MAC) layer and upper medium access control (MAC) layer in accordance with various aspects. In this example, a communication device 3701 may include a radiohead 3702 in accordance with various aspects of this disclosure. The radiohead 3702 may include a lower medium access control (MAC) layer unit 3703 which is connected to an upper medium access control (MAC) layer unit 3704 via a communication interface 3705.

In an example, one or more processors of the radiohead 3702 include the lower medium access control (MAC) layer unit 3703, and one or more processors of the communication device 3701 include the upper medium access control (MAC) layer unit 3704. In an example, the communication interface 3705 may include a digital interface. In an example, the communication interface 3705 includes a serial digital interface. In an example, the communication interface 3705 may include a serial time encoded protocol (STEP) interface.

In an example, the one or more processors of the radiohead 3702 may include an RH interface module 3706 which may control the communication interface 3705 for the radiohead 3702, and the one or more communication device processors of the communication device 3701 may include a device interface module 3707 which may control the communication interface 3705 for the device interface module.

In an example, the radiohead 3702 may be in the receiving mode for receiving wireless communication signals. Accordingly, the radiohead 3702 may receive a wireless communication signal via an antenna port and a radio frequency front end. After analog demodulation, a signal converter which includes an analog-to-digital converter, converts the received wireless communication signal and the one or more processors of the radiohead 3702 receive digital communication signals in the receiving mode.

The one or more processors may further include a baseband processor to receive the digital communication signals which are baseband signals in the receiving mode, and obtains a PLCP protocol data unit (PPDU). One or more processors may further include a physical (PHY) layer unit which implements a decapsulation function for the physical (PHY) layer, obtains a medium access control (MAC) layer protocol data unit (MPDU). The one or more processors provide the medium access control (MAC) layer protocol data unit (MPDU) to the lower medium access control (MAC) layer unit 3703.

The lower medium access control (MAC) layer unit 3703 receives the medium access control (MAC) layer protocol data unit (MPDU) from the physical (PHY) layer unit from its output of the decapsulation function. The lower medium access control (MAC) layer unit 3703 implements at least one lower medium access control (MAC) layer function to provide an output to the upper medium access control (MAC) layer unit 3703. In an example, the lower medium access control (MAC) layer unit 3703 may need to perform a medium access control filtering function, however, the lower medium access control (MAC) layer unit 3703 does not possess the required information to perform the medium access control filtering function. The lower medium access control (MAC) layer unit 3703 may determine sending a service message to the upper medium access control (MAC) layer unit 3704 indicating that the lower medium access control (MAC) layer unit 3703 requests a service from the upper medium access control (MAC) layer unit 3704.

In order to send the service message to the upper medium access control (MAC) layer unit 3704, the lower medium access control (MAC) layer unit 3703 may indicate to the RH interface module 3706 that the lower medium access control (MAC) layer unit 3703 requests to communicate with the upper medium access control (MAC) layer unit 3704. The RH interface module 3706 may receive the request of the lower medium access control (MAC) layer unit 3703 and detects whether the communication interface 3705 is available. In an example, the communication interface 3705 may be in low power mode, and the communication interface may not be able to provide communication between the lower medium access control (MAC) layer unit 3703 and the upper medium access control (MAC) layer unit 3704.

The RH interface module 3706 may detect that the communication interface 3705 operates in low power mode and sends a wake-up signal to the device interface module 3707 which controls the communication interface 3705 and which may be responsible for waking up the communication interface. In an example, the communication interface 3705 may not transfer data in the low power mode, but it may transfer a wake-up signal. Accordingly, the device interface module 3707 may wake up the communication interface 3705 from its low power mode based on the wake-up signal sent by the RH interface module 3706.

In an example, the RH interface module 3706 may detect that the communication interface 3705 operates in low power mode and sends a wake-up signal to the communication interface 3705. In an example, the communication interface may include a wake-up signal detection module which detects the wake-up signal sent by the RH interface module 3706. Accordingly, the communication device 3701 starts to operate in a normal mode. In an example, the RH interface module 3706 may be configured to wake up the communication interface, and based on a reception of the indication from the lower medium access control (MAC) layer unit 3703, the RH interface module 3706 may wake up the communication interface 3705.

In an example, the RH interface module 3706 may detect that the upper medium access control (MAC) layer unit 3704, or the one or more communication device processors operate in a low power mode. In this example, the RH interface module 3706 may send a wake-up signal directly to the upper medium access control (MAC) layer unit 3704, or to the one or more communication device processors in order to remove the upper medium access control (MAC) layer unit 3704 or the one or more communication device processors from the low power mode. In an example, the RH interface module 3706 may receive a wake-up condition from the one or more communication device processors indicating whether the upper medium access control (MAC) layer unit 3704 operates in the low power mode.

In an example, the service message itself may include a wake-up signal to wake up the upper medium access control (MAC) layer unit 3704. In this example, the one or more communication device processors may detect the wake-up signal which the lower medium access control (MAC) layer unit 3703 provides, and wake up the upper medium access control (MAC) layer unit 3704 from its low power mode. In an example, the one or more processors may detect the wake-up signal via signal detection.

In an example, following the sending of the wake-up signal, the one or more processors of the radiohead 3701 send the service message to the upper medium access control (MAC) layer unit 3704 indicating that the lower medium access control (MAC) layer unit 3703 requests a service from the upper medium access control (MAC) layer unit 3704. The upper medium access control (MAC) layer unit 3704 receives the service request which indicates that the lower medium access control (MAC) layer unit 3703 of the radiohead 3702 requests a service of providing configuration information related to the medium access control filtering function. In response to the service request message, the upper medium access control (MAC) layer provides the service of providing configuration information to the lower medium access control (MAC) layer unit 3703.

In response to the service message, the one or more processors of the radiohead 3702 receive the configuration information. Accordingly, the lower medium access control (MAC) layer unit 3703 provides the function of the medium access control filtering and provides their services, and then transfer the data after providing its services by implementing one or more lower medium access control (MAC) layer functions, to the one or more upper medium access control (MAC) layer functions via the communication interface 3705.

FIG. 38 shows schematically an example of service communication between the lower medium access control (MAC) layer and upper medium access control (MAC) layer in accordance with various aspects. In this example, a communication device 3801 may include a radiohead 3802 in accordance with various aspects of this disclosure. The radiohead 3802 may include a lower medium access control (MAC) layer unit 3803 which is connected to an upper medium access control (MAC) layer unit 3804 via a communication interface 3805.

In an example, one or more processors of the radiohead 3802 include the lower medium access control (MAC) layer unit 3803, and one or more processors of the communication device 3801 include the upper medium access control (MAC) layer unit 3804. In an example, the communication interface 3805 may include a digital interface. In an example, the communication interface 3805 includes a serial digital interface. In an example, the communication interface 3805 may include a serial time encoded protocol (STEP) interface.

In an example, the one or more processors of the radiohead 3802 may include an RH interface module 3806 which may control the communication interface 3805 for the radiohead 3802, and the one or more communication device processors of the communication device 3801 may include a device interface module 3807 which may control the communication interface for the device interface module.

Further, the radiohead 3802 may include a memory 3808 to store data in accordance with various aspects of this disclosure.

In an example, the one or more processors of the communication device 3801 determine to use the radiohead 3802 for transmitting communication signals, and the one or more processors of the communication device 3801 process data for the applicable layers related to the data to be sent including performing one or more upper medium access control (MAC) layer functions for the medium access control (MAC) layer via the upper medium access control (MAC) layer unit 3804.

The one or more processors of the communication device 3801 send a service message to the one or more processors of the radiohead 3802. In an example, the service message includes an indication of a provision of a service related to one or more upper medium access control (MAC) layer functions for the lower medium access control (MAC) layer to transmit communication signals. In an example, the one or more processors of the communication device 3801 send a data to be transmitted by the communication signals.

In an example, the data to be transmitted sent by the one or more processors of the communication device 3801 may include a MAC service data unit (MSDU). In an example, the data to be transmitted may include a MAC protocol data unit (MPDU). In an example, the data to be transmitted may include an aggregated frame including a plurality of MSDUs. In an example, the data to be transmitted may include an aggregated frame including a plurality of MPDUs. In an example the data to be transmitted may include a plurality of MSDUs or a plurality of MPDUs. In an example, the service message may also include an indication that the service has been provided for one or more upper medium access control (MAC) layer functions for a plurality of data packets.

In an example, after sending the service message and the data related to the service message, the one or more processors of the communication device 3801 may operate in a low power mode. In an example, after sending the service message and the data related to the service message, the one or more processors of the communication device 3801 control the communication interface 3805 to operate in a low power mode. In an example, the one or more processors of the radiohead 3802 may control the communication interface 3805 to operate in a low power mode after receiving the service message.

In an example, the one or more processors of the radiohead 3802 receive the service message indicating a provision of the one or more upper medium access control (MAC) layer functions by the upper medium access control (MAC) layer, and the data related to the service and the one or more processors of the radiohead 3802 store the data to be transmitted to the memory 3808 for transmitting the data to be transmitted based on the service message. In an example, the data to be transmitted includes the data to be transmitted to the one or more physical (PHY) layer functions.

In an example, after receiving the service message indicating that the provision of the one or more upper medium access control (MAC) layer functions by the upper medium access control (MAC) layer, the one or more processors of the radiohead 3802 may provide access to the memory 3808 to the one or more processors of the communication device 3801, so that the one or more processors of the communication device 3801 directly store the data to be transmitted into the memory 3808 via the communication interface 3805.

In an example, the service message may indicate a time period for each of the data to be transmitted. In an example, the service message may include configuration data to configure the lower medium access control (MAC) layer unit 3803 for the one or more lower medium access control (MAC) layer functions for transmitting each of the data to be transmitted. In an example, the service message may include an indication for the one or more processors of the radiohead 3802 to send a wake-up signal after the services of the lower medium access control (MAC) layer functions which may be provided to physical (PHY) layer functions.

Accordingly, the one or more processors of the radiohead 3802 may configure the lower medium access control (MAC) layer unit 3803 to perform one or more lower medium access control (MAC) layer functions to transmit data to the one or more physical (PHY) layer functions based on the service message which the one or more processors of the radiohead 3802 receive from the one or more processors of the communication device 3801 in the transmitting mode.

The lower medium access control (MAC) layer unit 3803 may provide its services based on the received service message from the upper medium access control (MAC) layer unit 3804. In an example, the lower medium access control (MAC) layer unit 3803 functions may receive the services provided by the upper medium access control (MAC) layer functions. The lower medium access control (MAC) layer unit 3803 may perform the lower medium access control (MAC) layer functions based on the received services from the upper medium access control (MAC) layer functions service message. The lower medium access control (MAC) layer functions transmit the data to the one or more physical (PHY) layer functions after performing the lower medium access control (MAC) layer functions.

Accordingly, the one or more physical (PHY) layer functions of the one or more processors of the radiohead 3802 receive the data which the lower medium access control (MAC) layer functions transmit and implement one or more physical (PHY) layer functions to transmit the communication signal which includes at least a portion of the data to be transmitted based on the service message received from the one or more processors of the communication device 3801.

FIG. 39 shows schematically an example of a communication device in accordance with various aspects of this disclosure. The communication device 3901 includes one or more communication device processors 3902. The one or more communication device processors 3902 may include a higher layer unit 3903 for providing processing for the upper layers of the communication layers between the application layer and the logical link layer, and the one or more communication device processors 3902 may include a logical link layer unit 3905 for providing processing for the logical link layer by implementing one or more logical link layer functions.

In an example, the one or more communication device processors 3902 include an upper medium access control (MAC) layer unit 3905 which implements one or more upper medium access control (MAC) layer functions in accordance with various aspects of this disclosure. The upper medium access control (MAC) layer unit 3905 provides services to the logical link layer unit 3905 and receives services from the logical link layer unit 3905. Further, the upper medium access control (MAC) layer unit 3905 may provide services to a lower medium access control (MAC) layer unit and receive services from the lower medium access control (MAC) layer unit.

The one or more communication device processors 3902 are connected to a communication interface 3906. In an example, the communication interface 3906 may include a digital interface. In an example, the communication interface 3906 includes a serial digital interface. In an example, the communication interface 3906 may include a serial time encoded protocol (STEP) interface.

The communication device 3901 further includes a first radiohead 3907 which includes a first lower medium access control (MAC) layer unit 3908 to implement one or more lower medium access control (MAC) layer functions for the first radiohead 3907, and a first physical (PHY) layer unit 3909 to implement one or more physical (PHY) layer functions for the first radiohead 3907.

The first radiohead 3907 may be operating in a transmitting mode and a receiving mode and the one or more lower medium access control (MAC) layer functions of the first lower medium access control (MAC) layer unit 3908 may receive data from the one or more physical (PHY) layer functions of the first physical (PHY) layer unit 3909 in the receiving mode, and the one or more lower medium access control (MAC) layer functions of the first lower medium access control (MAC) layer unit 3908 may transmit data to the one or more physical (PHY) layer functions of the first physical (PHY) layer unit 3909 in the transmitting mode.

The first radiohead 3907 may be connected to the communication interface 3906, which couples the one or more processors of the first radiohead 3907 to the one or more communication device processors 3902, and in particular, to the upper medium access control (MAC) layer unit 3905. In an example the first radiohead 3907 includes a radiohead in accordance with various aspects of this disclosure. In an example, the first radiohead 3907 may include a memory to store digital communication signals or the data related to the communication signals. In an example, the first radiohead 3907 may include an interface module in accordance with various aspects of this disclosure to control the communication interface 3906.

The communication device 3901 may further include a second radiohead 3910 which includes a second lower medium access control (MAC) layer unit 3911 to implement one or more lower medium access control (MAC) layer functions for the second radiohead 3910, and a second physical (PHY) layer unit 3912 to implement one or more physical (PHY) layer functions for the second radiohead 3910.

The second radiohead 3910 may be operating in a transmitting mode and a receiving mode and the one or more lower medium access control (MAC) layer functions of the second lower medium access control (MAC) layer unit 3911 may receive data from the one or more physical (PHY) layer functions of the second physical (PHY) layer unit 3912 in the receiving mode, and the one or more lower medium access control (MAC) layer functions of the second lower medium access control (MAC) layer unit 3911 may transmit data to the one or more physical (PHY) layer functions of the second physical (PHY) layer unit 3912 in the transmitting mode.

The second radiohead 3910 may be connected to the communication interface 3906, which couples the one or more processors of the second radiohead 3910 to the one or more communication device processors 3902, and in particular, to the upper medium access control (MAC) layer unit 3905. In an example the second radiohead 3910 includes a radiohead in accordance with various aspects of this disclosure. In an example, the second radiohead 3910 may include a memory to store digital communication signals or the data related to the communication signals. In an example, the second radiohead 3910 may include an interface module in accordance with various aspects of this disclosure to control the communication interface 3906.

The communication device 3901 may further include a third radiohead 3913 which includes a third lower medium access control (MAC) layer unit 3914 to implement one or more lower medium access control (MAC) layer functions for the third radiohead 3913, and a third physical (PHY) layer unit 3915 to implement one or more physical (PHY) layer functions for the third radiohead 3913.

The third radiohead 3913 may be operating in a transmitting mode and a receiving mode and the one or more lower medium access control (MAC) layer functions of the third lower medium access control (MAC) layer unit 3914 may receive data from the one or more physical (PHY) layer functions of the third physical (PHY) layer unit 3915 in the receiving mode, and the one or more lower medium access control (MAC) layer functions of the third lower medium access control (MAC) layer unit 3914 may transmit data to the one or more physical (PHY) layer functions of the third physical (PHY) layer unit 3915 in the transmitting mode.

The third radiohead 3913 may be connected to the communication interface 3906, which couples the one or more processors of the third radiohead 3913 to the one or more communication device processors 3902, and in particular, to the upper medium access control (MAC) layer unit 3905. In an example the second radiohead 3910 includes a radiohead in accordance with various aspects of this disclosure. In an example, the third radiohead 3913 may include a memory to store digital communication signals or the data related to the communication signals. In an example, the third radiohead may include an interface module in accordance with various aspects of this disclosure to control the communication interface 3906.

In an example, the upper medium access control (MAC) layer unit 3905 may perform the one or more upper medium access control (MAC) layer functions for the first radiohead 3907, the second radiohead 3910 and the third radiohead 3913. Accordingly, the upper medium access control (MAC) layer unit 3905 may perform the one or more upper medium access control (MAC) layer functions to configure the first radiohead 3907, the second radiohead 3910, and the third radiohead 3913 for receiving communication signals.

The one or more communication device processors 3902 transmit from the upper medium access control (MAC) layer unit 3905 a first service message which includes an indication of the provision of a service from the one or more upper medium access control (MAC) layer functions for the first radiohead 3907 to the first radiohead 3907. The one or more communication device processors 3902 may transmit from the upper medium access control (MAC) layer unit 3905 a second service message which includes an indication of the provision of a service from the one or more upper medium access control (MAC) layer functions for the second radiohead 3910 to the second radiohead 3910. The one or more communication device processors 3902 may transmit from the upper medium access control (MAC) layer unit 3905 a third service message which includes an indication of the provision of a service from the one or more upper medium access control (MAC) layer functions for the third radiohead 3913 to the third radiohead 3913.

Accordingly, the upper medium access control (MAC) layer functions provide service messages to each of the radioheads to receive communication signals based on the respective service messages. In an example, the one or more communication device processors 3902 further provide information to the each of the radioheads an indication with respect to wake-up conditions to provide wake-up signals to the communication interface 3906 and/or to the one or more communication device processors 3902. In an example, the wake-up conditions include at least one condition to send a wake-up signal to the communication interface 3906 and/or to the one or more communication device processors 3902.

In an example, the wake-up condition may include at least one predefined condition which is related to the receiving of communication signals based on each of the respective service messages. In an example, the wake-up condition may include a time information indicating the time of the wake-up signal to be sent by the respective radiohead. In an example, the wake-up condition may include an indication to transmit wake-up signals at a predetermined temporal periodicity.

In an example, the wake-up condition may already be stored in the memory of the respective radiohead. In an example, the wake-up condition may be determined by the radiohead based on the service message. In an example the wake-up condition may be received from a communication signal, such that the wake-up condition may be obtained by using the lower medium access control (MAC) layer functions from the received communication signal.

The rest of the examples related to the FIG. 39 may be provided by referring to the first radiohead 3907, but it should also be considered that the references for the first radiohead 3907 with respect to the FIG. 39 may also apply to the second radiohead 3910 and the third radiohead 3913 at their broadest extent.

Accordingly, following the provision of the first service message, the second service message, and the third service message by performing at least one upper medium access control (MAC) layer functions related to the respective radioheads, the one or more communication device processors 3902 may start operating at least the upper medium access control (MAC) layer unit 3905 in a low power mode. In an example, the one or more communication device processors 3902 may instruct the communication interface 3906 to operate in a low power mode to reduce power consumption. In an example, the upper medium access control (MAC) layer unit 3905 may not provide services to the respective lower medium access control (MAC) layer units in the low power mode.

Based on the first service message, the first radiohead 3907 may perform one or more medium access control (MAC) layer functions which transmit data to one or more physical (PHY) layer functions to receive communication signals in the receiving mode. In an example, the data which the one or more medium access control (MAC) layer functions transmit to the one or more physical (PHY) layer functions to receive communication signals may include configuration information which the first service message includes.

Accordingly, the first radiohead 3907 receives communication signals via its antenna port and radio frequency front end, a signal converter of the first radiohead 3907 converts the analog signals to digital communication signals and provides the digital communication signals to the one or more processors of the first radiohead.

In an example, the one or more processors of the first radiohead 3907 implement one or more physical (PHY) layer functions for the digital communication signals. In an example, the one or more processors decapsulate the data according to the physical (PHY) layer and the one or more physical (PHY) layer functions provide the decapsulated data to the first lower medium access control (MAC) layer. The first lower medium access control (MAC) layer receives the data which the one or more physical (PHY) layer functions provide, and implements one or more lower medium access control (MAC) layer functions. After the first lower medium access control (MAC) layer implemented one or more lower medium access control (MAC) layer functions and provide its output data, the one or more processors of the first radiohead 3907 store the output data in the memory, in order to send the output data later when the communication interface 3906 and/or the one or more communication device processors 3902 do not operate in the low power mode.

Accordingly, in an example, the one or more processors of the first radiohead 3907 may store a plurality of medium access control (MAC) layer service data units, and/or medium access control (MAC) layer protocol data units in the memory which the one or more lower medium access control (MAC) layer functions provide as a service to the one or more upper medium access control (MAC) layer functions of the upper medium access control (MAC) layer based on the wake-up condition.

In an example, the one or more processors store the digital communication signals before implementing the one or more physical (PHY) layer functions and the one or more processors may implement the one or more physical (PHY) layer functions based on the wake-up condition. In an example, the one or more processors store the output of the one or more physical (PHY) layer functions in the memory, and the first lower medium access control (MAC) layer unit 3908 may start implementing one or more lower medium access control (MAC) layer functions on the stored data in the memory based on the wake-up condition.

Accordingly, the one or more processors of the first radiohead 3907 may include an RH interface module in accordance with various aspects of this disclosure and the RH interface module may also detect whether the wake-up condition is met. In an example, the RH interface module may include a timer and may detect whether the wake-up condition is met based on the timer. In an example, the RH interface module may receive an indication signal from the one or more physical (PHY) layer functions indicating that the receiving service is completed. In an example, the RH interface module may receive an indication signal from the one or more lower medium access control (MAC) layer functions indicating that the receiving service is completed. In an example, the RH interface module may detect that the communication interface 3906 operates in normal mode, which is not the low power mode.

In an example, the RH interface module sends a wake-up signal to the communication interface 3906 to wake up the communication interface 3906 or the one or more communication device processors 3902 coupled to the communication interface 3906. Accordingly, if the RH interface module detects that the wake-up condition is met, the RH module sends the wake-up signal to the communication interface 3906. In an example, the RH interface module may detect that the wake-up condition is met, and sends a wake-up signal to the communication interface 3906. In an example, the RH interface may detect that the wake-up condition is met, and sends a wake-up signal directly to the upper medium access control (MAC) layer, or to the one or more communication device processors 3902 in order to remove the upper medium access control (MAC) layer or the one or more communication device processors 3902 from the low power mode.

Further, the one or more processors of the first radiohead 3907 may send a service message after the wake-up signal is sent. In an example, the one or more processors of the first radiohead 3907 may send the service message based on the wake-up condition. In an example, the RH interface module may detect whether the wake-up condition is met, and sends the service message based on the wake-up condition. In an example, the service message may indicate that the lower medium access control (MAC) layer functions of the first radiohead 3907 is going to provide services to the upper medium access control (MAC) layer functions.

Accordingly, the one or more processors of the first radiohead 3907 may send the data which is stored in the memory after the first lower medium access control (MAC) layer unit 3908 implements the one or more lower medium access control (MAC) layer functions to the upper medium access control (MAC) layer. Accordingly, the upper medium access control (MAC) layer unit 3905 receives the service which the first lower medium access control (MAC) layer unit 3908 provided and the upper medium access control (MAC) layer implements one or more upper medium access control (MAC) layer functions to provide services related to the upper medium access control (MAC) layer functions to the logical link layer unit.

In an example, a radiohead may include a computer-readable medium including instructions stored thereon, that if executed by one or more processors, cause a radiohead to receive and/or transmit wireless communication signals; output digital communication signals in a receiving mode to the one or more processors, or to receive digital communication signals in a transmitting mode from the one or more processors; implement one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; couple the one or more processors with an interface to one or more radiohead circuit-external processors implementing one or more upper medium-access control (MAC) functions, wherein the one or more lower medium-access control (MAC) functions are configured to provide a service from the one or more upper medium-access control (MAC) functions in the receiving mode and wherein the one or more lower medium-access control (MAC) functions are configured to receive a service from the one or more upper medium-access control (MAC) functions in the transmitting mode.

In accordance with various aspects of this disclosure, a device, in particular, a communication device may include a memory, and one or more processors, such as processing circuitry 810 and memory 820 referring back to FIG. 8. The memory 820 may be implemented as one or more computer-readable medium including one or more instructions that when executed on at least one processor cause a radiohead to receive and/or transmit wireless communication signals; output digital communication signals in a receiving mode to the one or more processors, or to receive digital communication signals in a transmitting mode from the one or more processors; implement one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; couple the one or more processors with an interface to one or more radiohead circuit-external processors implementing one or more upper medium-access control (MAC) functions, wherein the one or more lower medium-access control (MAC) functions are configured to provide a service from the one or more upper medium-access control (MAC) functions in the receiving mode and wherein the one or more lower medium-access control (MAC) functions are configured to receive a service from the one or more upper medium-access control (MAC) functions in the transmitting mode.

FIG. 40 shows schematically an example of method steps in accordance with various aspects of this disclosure. The method may include outputting 4001 digital communication signals in a receiving mode to one or more processors, or receiving digital communication signals in a transmitting mode from the one or more processors; implementing 4002 one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; coupling 4003 the one or more processors with an interface to one or more radiohead circuit-external processors implementing one or more upper medium-access control (MAC) functions, wherein the one or more lower medium-access control (MAC) functions are configured to provide a service from the one or more upper medium-access control (MAC) functions in the receiving mode and wherein the one or more lower medium-access control (MAC) functions are configured to receive a service from the one or more upper medium-access control (MAC) functions in the transmitting mode.

The subject matter of example 1A includes a radiohead circuit. In example 1A, a radiohead circuit including: an antenna interface; a radio frequency front end configured to receive a wireless communication signal via the antenna interface; one or more processors configured to perform an initial signal detection to detect if a wireless communication signal has been received based on whether a signal the one or more processors received from the radio frequency front end fulfill one or more predefined radiohead circuit detection criteria; generate an initial signal detection information including an information as to whether the wireless communication signal has been received based on the initial signal detection; and provide the initial signal detection information to a communication interface for a final signal detection; the communication interface configured to couple the one or more processors to one or more radiohead circuit-external processors external to the radiohead circuit.

In example 2A, the subject matter example 1A, may further include that the one or more processors are configured to detect an existence of a predefined preamble of the signal the one or more processors received from the radio frequency front end. In example 3A, the subject matter any of examples 1A or 2A, may further include that the one or more processors are configured to calculate an autocorrelation of the signal the one or more processors received from the radio frequency front end. In example 4A, the subject matter any one of examples 1A to 3A, may further include that the one or more processors are configured to calculate a signal strength of the signal the one or more processors received from the radio frequency front end.

In example 5A, the subject matter example 4A, may further include that the one or more processors are configured to calculate a mathematical function based on the calculated autocorrelation of the signal the one or more processors received from the radio frequency front end, and the calculated signal strength of the signal the one or more processors received from the radio frequency front end. In example 6A, the subject matter any one of examples 3A to 5A, may further include that the one or more processors are configured to detect if the wireless communication signal has been received based on the ratio of the calculated autocorrelation of the signal the one or more processors received from the radio frequency front end, and the calculated signal strength of the signal the one or more processors received from the radio frequency front end.

In example 7A, the subject matter any one of examples 1A to 6A, may further include that the one or more processors are configured not to generate the initial signal detection information if no wireless communication signal is detected according to the initial signal detection or not to provide the initial signal detection information if no wireless communication signal is detected according to the initial signal detection. In example 8A, the subject matter any one of examples 3A to 7A, may further include that the one or more processors are configured to provide the initial signal detection information including at least one of the calculated autocorrelation information of the received wireless communication signal, and/or the calculated signal strength information of the received wireless communication signal, and/or the calculated mathematical function information based on the calculated autocorrelation of the received wireless communication signal and the calculated signal strength of the received wireless communication signal, and/or the ratio information of the calculated autocorrelation of the wireless communication signal and the calculated signal strength of the wireless communication signal.

In example 9A, the subject matter any one of examples 1A to 8A, may further include at least one antenna coupled to the antenna interface. In example 10A, the subject matter any one of examples 1A to 9A, may further include that the one or more radiohead circuit processors are further configured to provide the initial signal detection information in response to a received initial signal detection information request signal. In example 11A, the subject matter any one of examples 1A to 10A, may further include that the communication interface is configured to operate in a low power mode; and may further include that the one or more processors are further configured to send an indication to the communication interface to wake up the communication interface from the low power mode.

In example 12A, A communication device including: a plurality of radiohead circuits of any one of examples 1A to 11A, including a first radiohead circuit and a second radiohead circuit; one or more communication device processors configured to receive the initial signal detection information from the first radiohead circuit and the initial signal detection information from the second radiohead circuit; to perform the final signal detection based on the initial signal detection information of the first radiohead circuit and the initial signal detection information of the second radiohead circuit.

In example 13A, the subject matter of example 12A, may further include that the one or more communication device processors are configured to at least one of send an initial signal detection information request signal to the first radiohead circuit, in case the one or more communication device receives the initial signal detection information of the second radiohead circuit, or send an initial signal detection information request signal to the second radiohead circuit, in case the one or more communication device receives the initial signal detection information of the first radiohead circuit.

In example 14A, the subject matter of example 13A, may further include that the one or more communication device processors are configured to calculate a mathematical function based on the calculated autocorrelation information of the of the initial signal detection information of the first radiohead circuit, the calculated autocorrelation information of the initial signal detection information of the second radiohead circuit, the calculated signal strength of the initial signal detection information of the first radiohead circuit, and the calculated signal strength of the initial signal detection information of the second radiohead circuit.

In example 15A, the subject matter of example 14A, may further include that the one or more communication device processors are further configured to determine for the final signal detection based on the ratio of the sum of the calculated autocorrelation information of the initial signal detection information of the first radiohead circuit and the calculated autocorrelation information of the initial signal detection information of the second radiohead circuit, over the sum of the calculated signal strength of the initial signal detection information of the first radiohead circuit and the calculated signal strength of the initial signal detection information of the second radiohead circuit.

In example 16A, the subject matter of example 15A, may further include that the one or more communication device processors are further configured to determine for the final signal detection based on the ratio being above a predefined final detection threshold. In example 17A, the subject matter of any one of examples 12A to 16A, may further include one or more communication device processors are configured to send a first wake up indication to the communication interface of the first radiohead circuit to wake up the communication interface of the first radiohead circuit from its low power mode, or to send a second wake up indication to the communication interface of the second radiohead circuit to wake up the communication interface of the second radiohead circuit.

In example 18A, the subject matter includes a computer-readable medium. In example 18A, the computer-readable medium including instructions stored thereon, that if executed by one or more processors, implement a method including: performing an initial signal detection to detect if a wireless communication signal has been received based on whether a signal the one or more processors received from a radio frequency front end fulfill one or more predefined radiohead circuit detection criteria; generating an initial signal detection information including an information as to whether the wireless communication signal has been received based on the initial signal detection; and providing the initial signal detection information to a communication interface for a final signal detection; the communication interface configured to couple the one or more processors to one or more radiohead circuit-external processors external to the radiohead circuit.

In example 19A, the subject matter of example 18A, the method may further include detecting an existence of a predefined preamble of the signal the one or more processors received from the radio frequency front end. In example 20A, the subject matter of any one of examples 18A or 19A, the method may further include calculating an autocorrelation of the signal the one or more processors received from the radio frequency front end.

In example 21A, the subject matter of any one of examples 18A to 21A, the method may further include calculating a signal strength of the signal the one or more processors received from the radio frequency front end. In example 22A, the subject matter of any one of examples 20A or 21A, the method may further include calculating a mathematical function based on the calculated autocorrelation of the signal the one or more processors received from the radio frequency front end, and the calculated signal strength of the signal the one or more processors received from the radio frequency front end.

In example 23A, the subject matter of any one of examples 20A to 22A, the method may further include detecting if the wireless communication signal has been received based on the ratio of the calculated autocorrelation of the signal the one or more processors received from the radio frequency front end, and the calculated signal strength of the signal the one or more processors received from the radio frequency front end. In example 24A, the subject matter of any one of examples 18A to 23A, the method may further include providing the initial signal detection information related to the wireless communication if the wireless communication signal is detected according to the initial signal detection.

In example 25A, the subject matter of any one of examples 18A to 24A, the method may further include providing the initial signal detection information including at least one of the calculated autocorrelation information of the received wireless communication signal, and/or the calculated signal strength information of the received wireless communication signal, and/or the calculated mathematical function information based on the calculated autocorrelation of the received wireless communication signal and the calculated signal strength of the received wireless communication signal, and/or the ratio information of the calculated autocorrelation of the wireless communication signal and the calculated signal strength of the wireless communication signal.

In example 26A, the subject matter of any one of examples 18A to 25A, the method may further include providing the initial signal detection information in response to a received initial signal detection information request signal. In example 27A, the subject matter of any one of examples 18A to 26A, the method may further include sending an indication to the communication interface to wake up the communication interface from the low power mode.

In example 28A, the subject matter of any one of examples 18A to 27A, the method may further include receiving an initial signal detection information of a first radiohead circuit, and an initial signal detection information of a second radiohead circuit, and to perform the final signal detection based on the initial signal detection information of the first radiohead circuit, and the initial signal detection information of the second radiohead circuit.

In example 29A, the subject matter of example 28A, the method may further include to at least one of sending an initial signal detection information request signal to the first radiohead circuit, in case the one or more communication device receives the initial signal detection information of the second radiohead circuit, or sending an initial signal detection information request signal to the second radiohead circuit, in case the one or more communication device receives the initial signal detection information of the first radiohead circuit.

In example 30A, the subject matter of any one of examples 28A or 29A, the method may further include calculating a mathematical function based on the calculated autocorrelation information of the of the initial signal detection information of the first radiohead circuit, the calculated autocorrelation information of the initial signal detection information of the second radiohead circuit, the calculated signal strength of the initial signal detection information of the first radiohead circuit, and the calculated signal strength of the initial signal detection information of the second radiohead circuit.

In example 31A, the subject matter of example 30A, the method may further include determining for the final signal detection based on the ratio of the sum of the calculated autocorrelation information of the initial signal detection information of the first radiohead circuit and the calculated autocorrelation information of the initial signal detection information of the second radiohead circuit, over the sum of the calculated signal strength of the initial signal detection information of the first radiohead circuit and the calculated signal strength of the initial signal detection information of the second radiohead circuit.

In example 32A, the subject matter of example 31A, the method may further include determining for the final signal detection based on the ratio being above a predefined final detection threshold. In example 33A, the subject matter of any one of examples 28A to 32A, the method may further include sending a first wake up indication to the communication interface of the first radiohead circuit to wake up the communication interface of the first radiohead circuit from its low power mode, or to send a second wake up indication to the communication interface of the second radiohead circuit to wake up the communication interface of the second radiohead circuit.

In example 34A, the subject matter includes a method of detecting a wireless communication signal. In example 34A, the subject matter including: performing an initial signal detection to detect if a wireless communication signal has been received based on whether a signal received from a radio frequency front end fulfill one or more predefined radiohead circuit detection criteria; generating an initial signal detection information including an information as to whether the wireless communication signal has been received based on the initial signal detection; and providing the initial signal detection information to a communication interface for a final signal detection.

In example 36A, the subject matter of example 35A, may further include detecting an existence of a predefined preamble of the signal received from the radio frequency front end. In example 37A, the subject matter of any one of examples 35A or 36A, may further include calculating an autocorrelation of the signal received from the radio frequency front end, and In example 38A, the subject matter of any one of examples 35A to 37A, may further include calculating a signal strength of the signal received from the radio frequency front end.

In example 39A, the subject matter of any one of examples 37A or 38A, may further include calculating a mathematical function based on the calculated autocorrelation of the signal received from the radio frequency front end, and the calculated signal strength of the signal received from the radio frequency front end. In example 40A, the subject matter of any one of examples 37A to 39A, may further include detecting if the wireless communication signal has been received based on the ratio of the calculated autocorrelation of the signal received from the radio frequency front end, and the calculated signal strength of the signal received from the radio frequency front end.

In example 41A, the subject matter of any one of examples 35A to 40A, may further include providing the initial signal detection information related to the wireless communication if the wireless communication signal is detected according to the initial signal detection. In example 42A, the subject matter of any one of examples 35A to 41A, may further include providing the initial signal detection information including at least one of the calculated autocorrelation information of the received wireless communication signal, or the calculated signal strength information of the received wireless communication signal, or the calculated mathematical function information based on the calculated autocorrelation of the received wireless communication signal and the calculated signal strength of the received wireless communication signal, or the ratio information of the calculated autocorrelation of the wireless communication signal and the calculated signal strength of the wireless communication signal.

In example 43A, the subject matter of any one of examples 35A to 42A, may further include providing the initial signal detection information in response to a received initial signal detection information request signal. In example 44A, the subject matter of any one of examples 35A to 43A, may further include send an indication to the communication interface to wake up the communication interface from the low power mode.

In example 45A, A the subject matter of any one of examples 35A to 44A, may further include receiving an initial signal detection information of a first radiohead circuit, and an initial signal detection information of a second radiohead circuit, and to perform the final signal detection based on the initial signal detection information of the first radiohead circuit, and the initial signal detection information of the second radiohead circuit.

In example 46A, the subject matter of example 45A, may further include sending an initial signal detection information request signal to the first radiohead circuit, in case the one or more communication device receives the initial signal detection information of the second radiohead circuit, or send an initial signal detection information request signal to the second radiohead circuit, in case the one or more communication device receives the initial signal detection information of the first radiohead circuit.

In example 47A, the subject matter of any one of examples 44A or 45A, may further include may further include that the first initial signal detection information includes the calculated autocorrelation of the first received wireless communication signal, and the calculated signal strength of the first received wireless communication signal, and the second initial signal detection information includes the calculated autocorrelation of the second received wireless communication signal, and the calculated signal strength of the second received wireless communication signal.

In example 48A, the subject matter of example 46A, may further include calculating a mathematical function based on the calculated autocorrelation information of the of the initial signal detection information of the first radiohead circuit, the calculated autocorrelation information of the initial signal detection information of the second radiohead circuit, the calculated signal strength of the initial signal detection information of the first radiohead circuit, and the calculated signal strength of the initial signal detection information of the second radiohead circuit.

In example 49A, the subject matter of example 47A, may further include determining for the final signal detection based on the ratio of the sum of the calculated autocorrelation information of the initial signal detection information of the first radiohead circuit and the calculated autocorrelation information of the initial signal detection information of the second radiohead circuit, over the sum of the calculated signal strength of the initial signal detection information of the first radiohead circuit and the calculated signal strength of the initial signal detection information of the second radiohead circuit.

In example 50A, the subject matter of any one of examples 44A to 48A, may further include determining for the final signal detection based on the ratio being above a predefined final detection threshold. In example 51A, the subject matter of any one of examples 44A to 49A, may further include providing a first wake up indication to the communication interface of the first radiohead circuit to wake up the communication interface of the first radiohead circuit from its low power mode, or to send a second wake up indication to the communication interface of the second radiohead circuit to wake up the communication interface of the second radiohead circuit.

In example 52A, a radiohead circuit including: an antenna interface; a radio frequency front end for receiving a wireless communication signal via the antenna interface; one or more processing means are configured to perform an initial signal detection to detect if a wireless communication signal has been received based on whether a signal the one or more processors received from the radio frequency front end fulfill one or more predefined radiohead circuit detection criteria; generate an initial signal detection information including an information as to whether the wireless communication signal has been received based on the initial signal detection; and provide the initial signal detection information to a communication interface for a final signal detection; the communication interface configured to couple the one or more processors to one or more radiohead circuit-external processors external to the radiohead circuit.

In example 53A, a communication device including: a plurality of radiohead circuits according to example 52A, including a first radiohead circuit and a second radiohead circuit; one or more communication device processing means configured to receive the initial signal detection information of the first radiohead circuit, and the initial signal detection information of the second radiohead circuit, and to perform the final signal detection based on the initial signal detection information of the first radiohead circuit, and the initial signal detection information of the second radiohead circuit.

The subject matter of example 1B includes a radiohead circuit. In example 1B, the subject matter including: an antenna interface; a radio frequency (RF) front end configured to receive a wireless communication signal; one or more amplifiers configured to amplify the received wireless communication signal based on a configuration of the one or more amplifiers; an analog-digital converting structure configured to output digital communication signals to one or more processors; the one or more processors configured to detect a rotation of the modulation constellation between a first symbol of the received wireless communication signal and a consecutive second symbol of the received wireless communication signal, and configured to perform an automatic gain control function with a third symbol based on the detection of the rotation of the modulation constellation between the first symbol and the second consecutive symbol.

In example 2B, the subject matter of example 1B, further including: a rotation detection circuit configured to detect the rotation of the modulation constellation between the first symbol of the received wireless communication signal and the consecutive second symbol of the received wireless communication signal; and the one or more processors are further configured to send an instruction to the rotation detection circuit to detect the rotation. In example 3B, the subject matter of any one of examples 1B or 2B, may further include that the rotation detection circuit is configured to detect the rotation of the modulation constellation based on the rotation of the second consecutive symbol of the received wireless communication signal according to the first symbol of the received wireless communication signal.

In example 4B, the subject matter of any one of examples 1B to 3B, may further include that the one or more processors are further configured to perform a fast fourier transform (FFT) for the first symbol and the consecutive second symbol to detect the rotation of the modulation constellation between the first symbol of the received wireless communication signal and the consecutive second symbol of the received wireless communication signal.

In example 5B, the subject matter of example 4B, may further include that the one or more processors are further configured to perform a fast fourier transform (FFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 6B, the subject matter of example 3B, may further include that the one or more processors are further configured to perform a discrete fourier transform (DFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 7B, the subject matter of example any one of examples 3B to 6B, may further include that the one or more processors are further configured to calculate a first tone for the first symbol, to calculate a second tone for the second symbol, and to determine for the rotation of the modulation constellation between the first symbol of the received wireless communication signal and the consecutive second symbol of the received wireless communication signal based on the first tone and the second tone.

In example 8B, the subject matter of example 3B to 6B, may further include that the one or more processors are further configured to multiply at least one of the first tone with the conjugate of the second tone, or the second tone with the conjugate of the first tone, to obtain a sum of real part of the result of the multiplication and a sum of imaginary part of the result of the multiplication, and to determine for the rotation of the modulation constellation between the first symbol of the received wireless communication signal and the consecutive second symbol of the received wireless communication signal based on the result of the multiplication.

In example 9B, the subject matter of example 8B, may further include that the one or more processors are further configured to calculate a plurality of tones of the first symbol; to calculate a plurality of the tones of the second symbol, to multiply each of the tones of the second symbol by conjugate of the each of the respective tones of the first symbol, and to obtain a sum of real part of the result of the multiplication and a sum of imaginary part of the result of the multiplication, and to determine for the rotation of the modulation constellation between the first symbol of the received wireless communication signal and the consecutive second symbol of the received wireless communication signal based on the result of the multiplication.

In example 10B, the subject matter of any one of examples 8B or 9B, may further include that the one or more processors are further configured to determine for the rotation of the modulation constellation between the first symbol of the received wireless communication signal and the consecutive second symbol of the received wireless communication signal, in case the sum of the imaginary part of the result of the multiplication is greater than the sum of the real part of the result of the multiplication.

In example 11B, the subject matter of example 3B, may further include that the one or more processors are further configured to perform a channel equalization to obtain a transfer function for the received wireless communication signal; to perform a fast fourier transform (FFT) for the consecutive second symbol, to equalize the consecutive second symbol based on the transfer function to obtain equalized transform of the consecutive second symbol, and to determine for the rotation of the modulation constellation between the first symbol of the received wireless communication signal and the consecutive second symbol of the received wireless communication signal, in case the sum of the imaginary part of the equalized transform of the consecutive second symbol is greater than the sum of the real part of the equalized transform of the consecutive second symbol.

In example 12B, the subject matter of any one of examples 1B to 11B, may further include that the one or more processors are further configured to perform the power estimation with the third symbol in case the one or more processors detects the rotation of the modulation constellation between the first symbol of the received wireless communication signal and the consecutive second symbol of the received wireless communication signal.

In example 13B, the subject matter of any one of examples 1B to 12B, may further include that the one or more processors are further configured to identify the third symbol based on the first symbol. In example 14B, the subject matter of example 13B, may further include that the one or more processors are further configured to identify the third symbol based on the receiving time of the first symbol. In example 15B, the subject matter of example 14B, may further include that the one or more processors are further configured to identify the third symbol based on the receiving time of the first symbol relative to a legacy long training field (L-LTF) symbol.

In example 16B, the subject matter of any one of examples 9B to 15B, may further include that the one or more processors are further configured to perform a correlation detection on a portion of the received wireless communication signal of a symbol to identify the third symbol. In example 17B, the subject matter of any one of examples 1 to 16B, may further include that the one or more processors are further configured to set the amplifier configuration based on the power estimation using the third symbol. In example 18B, the subject matter of example 17B, may further include that the one or more processors are further configured to send the amplifier configuration to a second radiohead circuit.

In example 19B, the subject matter of any one of examples 17B or 18B, may further include that the one or more processors are further configured to send the amplifier configuration to one or more radiohead circuit external processors.

The subject matter of example 20B includes a computer-readable medium. In example 20B, the subject matter including instructions stored thereon, that if executed by one or more processors, cause a radiohead circuit including an antenna interface; a radio frequency (RF) front end, and one or more amplifiers configured to amplify a received wireless communication signal based on a configuration of the one or more amplifiers; and an analog-digital converting structure configured to output digital communication signals to one or more processors to; detect a rotation of the modulation constellation between a first symbol of the received wireless communication signal and a consecutive second symbol of the received wireless communication signal; and perform an automatic gain control function with a third symbol based on the detection of the rotation of the modulation constellation between the first symbol and the second consecutive symbol.

In example 21B, the subject matter of example 20B, may further include that the radiohead circuit further including: a rotation detection circuit configured to detect the rotation of the modulation constellation between the first symbol of the received wireless communication and the consecutive second symbol of the received wireless communication; and may further include that the instructions further include to send an instruction to the rotation detection circuit to detect the rotation.

In example 22B, the subject matter of any one of examples 20B or 21B, may further include that the rotation detection circuit is configured to detect the rotation of the modulation constellation based on the rotation of the consecutive second symbol of the received wireless communication signal according to the first symbol of the received wireless communication signal.

In example 23B, the subject matter of any one of examples 20B to 22B, may further include that the instructions further include to perform a fast fourier transform (FFT) for the first symbol and the consecutive second symbol to detect the rotation of the modulation constellation between the first symbol of the received wireless communication signal and the consecutive second symbol of the received wireless communication signal.

In example 24B, the subject matter of example 22B, may further include that the instructions further include to perform a fast fourier transform (FFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 25B, the subject matter of example 24B, may further include that the instructions further include to perform a discrete fourier transform (DFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 26B, the subject matter of any one of examples 23B to 25B, may further include that the instructions further include to calculate a first tone for the first symbol, to calculate a second tone for the second symbol, and to determine for the rotation of the modulation constellation between the first symbol of the received wireless communication signal and the consecutive second symbol of the received wireless communication signal based on the first tone and the second tone.

In example 27B, the subject matter of example 26B, may further include that the instructions further include to multiply at least one of the first tone with the conjugate of the second tone, or the second tone with the conjugate of the first tone, to obtain a sum of real part of the result of the multiplication and a sum of imaginary part of the result of the multiplication, and to determine for the rotation of the modulation constellation between the first symbol of the received wireless communication signal and the consecutive second symbol of the received wireless communication signal based on the result of the multiplication.

In example 28B, the subject matter of example 27B, may further include that the instructions further include to calculate a plurality of tones of the first symbol; to calculate a plurality of the tones of the second symbol, to multiply each of the tones of the second symbol by conjugate of the each of the respective tones of the first symbol, and to obtain a sum of real part of the result of the multiplication and a sum of imaginary part of the result of the multiplication, and to determine for the rotation of the modulation constellation between the first symbol of the received wireless communication signal and the consecutive second symbol of the received wireless communication signal based on the result of the multiplication.

In example 29B, the subject matter of any one of examples 27B or 28B, may further include that the instructions further include to determine for the rotation of the modulation constellation between the first symbol of the received wireless communication signal and the consecutive second symbol of the received wireless communication signal, in case the sum of the imaginary part of the result of the multiplication is greater than the sum of the real part of the result of the multiplication.

In example 30B, the subject matter of example 23B, may further include that the instructions further include to perform a channel equalization to obtain a transfer function for the received wireless communication signal; to perform a fast fourier transform (FFT) for the consecutive second symbol, to equalize the consecutive second symbol based on the transfer function to obtain equalized transform of the consecutive second symbol, and to determine for the rotation of the modulation constellation between the first symbol of the received wireless communication signal and the consecutive second symbol of the received wireless communication signal, in case the sum of the imaginary part of the equalized transform of the consecutive second symbol is greater than the sum of the real part of the equalized transform of the consecutive second symbol.

In example 31B, the subject matter of any one of examples 20B to 30B, may further include that the instructions further include to perform the power estimation with the third symbol in case the one or more processors detects the rotation of the modulation constellation between the first symbol of the received wireless communication signal and the consecutive second symbol of the received wireless communication signal.

In example 32B, the subject matter of any one of examples 20B or 31B, may further include that the instructions further include to identify the third symbol based on the first symbol. In example 33B, the subject matter of example 32B, may further include that the instructions further include to identify the third symbol based on the receiving time of the first symbol. In example 34B, the subject matter of example 33B, may further include that the instructions further include to identify the third symbol based on the receiving time of the first symbol relative to a legacy long training field (L-LTF) symbol.

In example 35B, the subject matter of any one of examples 20B to 34B, may further include that the instructions further include to perform a correlation detection on a portion of the received wireless communication signal of a symbol to identify the third symbol. In example 36B, the subject matter of any one of examples 20B to 35B, may further include that the instructions further include to set the amplifier configuration based the power estimation with the third symbol In example 37B, the subject matter of example 36B, may further include that the instructions further include to send the amplifier configuration to a second radiohead circuit. In example 38B, the subject matter of any one of examples 36B or 37B, may further include that the instructions further include to send the amplifier configuration to one or more radiohead circuit external processors.

In example 39B the subject matter includes a method of amplifying a wireless communication signal. In example 39B, the subject matter including an antenna interface; a radio frequency (RF) front end, and one or more amplifiers for amplifying a received wireless communication signal based on a configuration of the one or more amplifiers; and an analog-digital converting structure for outputting digital communication signals to one or more processors including: detecting a rotation of the modulation constellation between a first symbol of the received wireless communication signal and a consecutive second symbol of the received wireless communication signal; and performing an automatic gain control function with a third symbol based on the detection of the rotation of the modulation constellation between the first symbol and the second consecutive symbol.

In example 40B, the subject matter of example 39B, further including: sending an instruction to a rotation detection circuit to detect the rotation, may further include that the radiohead circuit further including the rotation detection circuit configured to detect the rotation of the modulation constellation between the first symbol of the received wireless communication and the consecutive second symbol of the received wireless communication.

In example 41B, the subject matter of any one of examples 39B or 40B, further including: detecting the rotation of the modulation constellation based on the rotation of the consecutive second symbol of the received wireless communication signal according to the first symbol of the received wireless communication signal. In example 42B, the subject matter of any one of examples 39B to 41B, further including: performing a fast fourier transform (FFT) for the first symbol and the consecutive second symbol to detect the rotation of the modulation constellation between the first symbol of the received wireless communication signal and the consecutive second symbol of the received wireless communication signal.

In example 43B, the subject matter of example 41B, further including: performing a fast fourier transform (FFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 44B, the subject matter of example 43B, further including: performing a discrete fourier transform (DFT) for a portion of the first symbol and a respective portion of the consecutive second symbol, may further include that the portion of the first symbol includes a plurality of signals of the first symbol at a selected frequency, and the portion of the second symbol includes a plurality of signals of the second symbol at the selected frequency.

In example 45B, the subject matter of example any one of examples 42B to 44B, further including: calculating a first tone for the first symbol, to calculate a second tone for the second symbol, and to determine for the rotation of the modulation constellation between the first symbol of the received wireless communication signal and the consecutive second symbol of the received wireless communication signal based on the first tone and the second tone.

In example 46B, the subject matter of example 45B, further including: multiplying at least one of the first tone with the conjugate of the second tone, or the second tone with the conjugate of the first tone, to obtain a sum of real part of the result of the multiplication and a sum of imaginary part of the result of the multiplication, and to determine for the rotation of the modulation constellation between the first symbol of the received wireless communication signal and the consecutive second symbol of the received wireless communication signal based on the result of the multiplication.

In example 47B, the subject matter of example 45B, further including: calculating a plurality of tones of the first symbol; calculating a plurality of the tones of the second symbol; multiplying each of the tones of the second symbol by conjugate of the each of the respective tones of the first symbol; obtaining a sum of real part of the result of the multiplication and a sum of imaginary part of the result of the multiplication; determining for the rotation of the modulation constellation between the first symbol of the received wireless communication signal and the consecutive second symbol of the received wireless communication signal based on the result of the multiplication.

In example 48B, the subject matter of examples 46B, further including: determining for the rotation of the modulation constellation between the first symbol of the received wireless communication signal and the consecutive second symbol of the received wireless communication signal, in case the sum of the imaginary part of the result of the multiplication is greater than the sum of the real part of the result of the multiplication.

In example 49B, the subject matter of example 41B, further including: performing a channel equalization to obtain a transfer function for the received wireless communication signal; performing a fast fourier transform (FFT) for the consecutive second symbol; equalizing the consecutive second symbol based on the transfer function to obtain equalized transform of the consecutive second symbol; determining for the rotation of the modulation constellation between the first symbol of the received wireless communication signal and the consecutive second symbol of the received wireless communication signal, in case the sum of the imaginary part of the equalized transform of the consecutive second symbol is greater than the sum of the real part of the equalized transform of the consecutive second symbol.

In example 50B, the subject matter of any one of examples 39B to 49B, further including: performing the power estimation with the third symbol in case the one or more processors detects the rotation of the modulation constellation between the first symbol of the received wireless communication signal and the consecutive second symbol of the received wireless communication signal.

In example 51B, the subject matter of any one of examples 39B or 50B, further including: identifying the third symbol based on the first symbol. In example 52B, the subject matter of example 51B, further including: identifying the third symbol based on the receiving time of the first symbol. In example 53B, the subject matter of example 52B, further including: identifying the third symbol based on the receiving time of the first symbol relative to a legacy long training field (L-LTF) symbol.

In example 54B, the subject matter of any one of examples 39B to 53B, further including: performing a correlation detection on a portion of the received wireless communication signal of a symbol to identify the third symbol. In example 55B, the subject matter of any one of examples 39B to 54B, further including: setting the amplifier configuration based the power estimation with the third symbol. In example 56B, the subject matter of example 55B, further including: sending the amplifier configuration to a second radiohead circuit. In example 57B, the subject matter of any one of examples 55B or 56B, further including: sending the amplifier configuration to one or more radiohead circuit external processors.

In example 58B, a radiohead circuit including: an antenna interface means; a radio frequency (RF) front end for receiving a wireless communication signal; one or more amplifiers for amplifying the wireless communication signal based on a configuration of the one or more amplifiers; an analog-digital converting means for outputting digital communication signals to one or more processing means; the one or more processing means for detecting a rotation of the modulation constellation between a first symbol of the received wireless communication signal and a consecutive second symbol of the received wireless communication signal, and for performing an automatic gain control function with a third symbol based on the detection of the rotation of the modulation constellation between the first symbol and the second consecutive symbol.

The subject matter of example 1C includes a communication device. In example 1C, a communication device including: a first radiohead circuit including a first antenna port and a first radio frequency (RF) front end configured to receive and/or transmit first wireless communication signals; a first signal converter including at least one of an analog-digital converter (ADC) configured to output first digital communication signals in a receiving mode to one or more first radiohead circuit processors, or a digital-to analog converter (DAC) configured to receive first digital communication signals in a transmitting mode from the one or more first radiohead processors; the one or more first radiohead circuit processors configured to implement one or more first radiohead circuit physical layer (PHY) functions; a second radiohead circuit including a second antenna port and a second radio frequency (RF) front end configured to receive and/or transmit second wireless communication signals; a second signal converter including at least one of an analog-digital converter (ADC) configured to output second digital communication signals in a receiving mode to one or more second radiohead circuit processors, or a digital-to analog converter (DAC) configured to receive second digital communication signals in a transmitting mode from the one or more second radiohead circuit processors; the one or more second radiohead circuit processors configured to implement one or more second radiohead circuit physical layer (PHY) functions; one or more communication device processors configured to send a first scheduling instruction to the one or more first radiohead circuit processors to schedule a first task for the one or more first radiohead circuit physical layer (PHY) functions, and to send a second scheduling instruction to the one or more second radiohead circuit processors to schedule a second task for the one or more second radiohead circuit physical layer (PHY) functions.

In example 2C, the subject matter of example 1C, may further include that the one or more communication device processors are configured to implement one or more medium access control (MAC) functions, and the one or more medium access control (MAC) functions are configured to determine the first task for the one or more first radiohead circuit physical layer (PHY) functions, and the second task for the one or more second radiohead circuit physical layer (PHY) functions. In example 3C, the subject matter of any one of examples 1C or 2C, may further include that at least one of the first scheduling instruction includes a timing information indicating the time of the performing the first task, or the second scheduling instruction includes a timing information indicating the time of the performing the second task.

In example 4C, the subject matter of any one of examples 1C to 3C, may further include that at least one of the first scheduling instruction includes a configuration information indicating the configuration for the one or more first radiohead circuit physical layer (PHY) functions, or the second scheduling instruction includes a configuration information indicating the configuration for the one or more second radiohead circuit physical layer (PHY) functions.

In example 5C, the subject matter of any one of examples 1C to 4C, may further include that the first task includes to transmit or receive communication signals based on a first set of communication settings, and the second task includes to transmit or receive communication signals based on a second set of communication settings. In example 6C, the subject matter of any one of examples 1C to 5C, may further include that the first task includes to schedule to transmit communication signals at an instance of time, and the second task includes to schedule to receive communication signals at the instance of time.

In example 7C, the subject matter of any one of examples 1C to 6C, may further include that at least one of the first task or the second task include to perform a scanning function. In example 8C, the subject matter of any one of examples 1C to 7C, may further include that the first task includes to perform a first scanning function with a first set of scanning parameters, and the second task includes to perform a second scanning function with a second set of scanning parameters.

In example 9C, the subject matter of any one of examples 1C to 8C, may further include that the first task includes to perform a scanning function, and the second task includes to perform an advertising function. In example 10C, the subject matter of any one of examples 1C to 9C, may further include that at least one of the first tasks includes to allocate a first channel for the one or more first radiohead circuit physical layer (PHY) functions, or the second task includes to allocate a second channel for the one or more second radiohead circuit physical layer (PHY) functions.

In example 11C, the subject matter of any one of examples 1C to 10C, may further include that at least one of the first tasks includes to transmit a first data packet using the one or more first radiohead circuit physical layer (PHY) functions, or the second task includes to transmit a second data packet using the one or more second radiohead circuit physical layer (PHY) functions. In example 12C, the subject matter of any one of examples 1C to 11C, may further include that the one or more communication device processors are further configured to at least one of receive data from the one or more first radiohead circuit processors related to the first task, or receive data from the one or more second radiohead circuit processors related to the second task.

In example 13C, the subject matter of any one of examples 1C to 12C, may further include that the one or more first radiohead circuit physical layer (PHY) functions and the one or more second radiohead circuit physical layer (PHY) functions are configured to provide signal quality information; and may further include that the one or more communication device processors are configured to provide a signal configuration information based on the provided signal quality information.

In example 14C, the subject matter of example 13C, may further include that the one or more communication device processors are configured to send a first set of signal configuration information to the one or more first radiohead circuit physical layer (PHY) functions, and a second set of signal configuration information to the one or more second radiohead circuit physical layer (PHY) functions, may further include that the first set of signal configuration information and the second set of signal configuration information includes gain information to provide maximal-ratio combining.

The subject matter of example 15C includes a computer-readable medium including instructions stored thereon, that if executed by one or more processors, cause a communication device to: send a first scheduling instruction to one or more first radiohead circuit processors of a first radiohead circuit including a first antenna port and a first radio frequency (RF) front end configured to receive and/or transmit first wireless communication signals, a first signal converter including at least one of an analog-digital converter (ADC) configured to output first digital communication signals in a receiving mode to the one or more first radiohead circuit processors, or a digital-to analog converter (DAC) configured to receive first digital communication signals in a transmitting mode from the one or more first radiohead processors; the one or more first radiohead circuit processors configured to implement one or more first radiohead circuit physical layer (PHY) functions to schedule a first task for the one or more first radiohead circuit physical layer (PHY) functions, and send a second scheduling instruction to one or more second radiohead circuit processors of a second radiohead circuit including a second antenna port and a second radio frequency (RF) front end configured to receive and/or transmit second wireless communication signals, a second signal converter including at least one of an analog-digital converter (ADC) configured to output second digital communication signals in a receiving mode to the one or more second radiohead circuit processors, or a digital-to analog converter (DAC) configured to receive second digital communication signals in a transmitting mode from the one or more second radiohead circuit processors; the one or more second radiohead circuit processors configured to implement one or more second radiohead circuit physical layer (PHY) functions to schedule a second task for the one or more second radiohead circuit physical layer (PHY) functions.

In example 16C, the subject matter of example 15C, may further include that the instructions further include to implement one or more medium access control (MAC) functions, and the one or more medium access control (MAC) functions are configured to determine the first task for the one or more first radiohead circuit physical layer (PHY) functions, and the second task for the one or more second radiohead circuit physical layer (PHY) functions.

In example 17C, the subject matter of any one of examples 15C or 16C, may further include that at least one of the first scheduling instruction includes a timing information indicating the time of the performing the first task, or the second scheduling instruction includes a timing information indicating the time of the performing the second task. In example 18C, the subject matter of any one of examples 15C to 17C, may further include that at least one of the first scheduling instruction includes a configuration information indicating the configuration for the one or more first radiohead circuity physical layer (PHY) functions, or the second scheduling instruction includes a configuration information indicating the configuration for the one or more second radiohead circuity physical layer (PHY) functions.

In example 19C, the subject matter of any one of examples 15C to 18C, may further include that the first task includes to transmit or receive communication signals based on a first set of communication settings, and the second task includes to transmit or receive communication signals based on a second set of communication settings. In example 20C, the subject matter of any one of examples 15C to 19C, may further include that the first task includes to schedule to transmit communication signals at an instance of time, and the second task includes to schedule to receive communication signals at the instance of time.

In example 21C, the subject matter of any one of examples 15C to 20C, may further include that at least one of the first task or the second task include to perform a scanning function. In example 22C, the subject matter of any one of examples 15C to 21C, may further include that the first task includes to perform a first scanning function with a first set of scanning parameters, and the second task includes to perform a second scanning function with a second set of scanning parameters.

In example 23C, the subject matter of any one of examples 15C to 22C, may further include that the first task includes to perform a scanning function, and the second task includes to perform an advertising function. In example 24C, the subject matter of any one of examples 15C to 23C, may further include that at least one of the first tasks includes to allocate a first channel for the one or more first radiohead circuit physical layer (PHY) functions, or the second task includes to allocate a second channel for the one or more second radiohead circuit physical layer (PHY) functions.

In example 25C, the subject matter of any one of examples 15C to 24C, may further include that at least one of the first tasks includes to transmit a first data packet using the one or more first radiohead circuit physical layer (PHY) functions, or the second task includes to transmit a second data packet using the one or more second radiohead circuit physical layer (PHY) functions. In example 26C, the subject matter of any one of examples 15C to 25C, may further include that the one or more communication device processors are further configured to at least one of receive data from the one or more first radiohead circuit processors related to the first task, or receive data from the one or more second radiohead circuit processors related to the second task.

In example 27C, the subject matter of any one of examples 15C to 26C, may further include that the one or more first radiohead circuit physical layer (PHY) functions and the one or more second radiohead circuit physical layer (PHY) functions are configured to provide signal quality information; and may further include that the one or more communication device processors are configured to provide a signal configuration information based on the provided signal quality information.

In example 28C, the subject matter of any one of examples 15C to 27C, may further include that the one or more communication device processors are configured to send a first set of signal configuration information to the one or more first radiohead circuit physical layer (PHY) functions, and a second set of signal configuration information to the one or more second radiohead circuit physical layer (PHY) functions, may further include that the first set of signal configuration information and the second set of signal configuration information includes gain information to provide maximal-ratio combining.

In example 29C, the subject matter includes a method of scheduling radiohead circuits, including: sending a first scheduling instruction to one or more first radiohead circuit processors of a first radiohead circuit including a first antenna port and a first radio frequency (RF) front end configured to receive and/or transmit first wireless communication signals, a first signal converter including at least one of an analog-digital converter (ADC) configured to output first digital communication signals in a receiving mode to the one or more first radiohead circuit processors, or a digital-to analog converter (DAC) configured to receive first digital communication signals in a transmitting mode from the one or more first radiohead processors; the one or more first radiohead circuit processors configured to implement one or more first radiohead circuit physical layer (PHY) functions to schedule a first task for the one or more first radiohead circuit physical layer (PHY) functions, and sending a second scheduling instruction to one or more second radiohead circuit processors of a second radiohead circuit including a second antenna port and a second radio frequency (RF) front end configured to receive and/or transmit second wireless communication signals, a second signal converter including at least one of an analog-digital converter (ADC) configured to output second digital communication signals in a receiving mode to the one or more second radiohead circuit processors, or a digital-to analog converter (DAC) configured to receive second digital communication signals in a transmitting mode from the one or more second radiohead circuit processors; the one or more second radiohead circuit processors configured to implement one or more second radiohead circuit physical layer (PHY) functions to schedule a second task for the one or more second radiohead circuit physical layer (PHY) functions.

In example 30C, A communication device including: a first radiohead circuit including a first antenna port and a first radio frequency (RF) front end for receiving and/or transmitting first wireless communication signals; a first signal converter including at least one of an analog-digital converter (ADC) for outputting first digital communication signals in a receiving mode to one or more first radiohead circuit processors, or a digital-to analog converter (DAC) for receiving first digital communication signals in a transmitting mode from the one or more first radiohead processors; the one or more first radiohead circuit processors configured to implement one or more first radiohead circuit physical layer (PHY) functions; a second radiohead circuit including a second antenna port and a second radio frequency (RF) front end configured for receiving and/or transmitting second wireless communication signals; a second signal converter including at least one of an analog-digital converter (ADC) for outputting second digital communication signals in a receiving mode to one or more second radiohead circuit processors, or a digital-to analog converter (DAC) for receiving second digital communication signals in a transmitting mode from the one or more second radiohead circuit processors; the one or more second radiohead circuit processors configured to implement one or more second radiohead circuit physical layer (PHY) functions; one or more communication device processing means for sending a first scheduling instruction to the one or more first radiohead circuit processors to schedule a first task for the one or more first radiohead circuit physical layer (PHY) functions, and for sending a second scheduling instruction to the one or more second radiohead circuit processors to schedule a second task for the one or more second radiohead circuit physical layer (PHY) functions.

In example 1D, the subject matter includes a radiohead circuit including: an antenna port and a radio frequency (RF) front end configured to receive and/or transmit wireless communication signals; a signal converter including at least one of an analog-digital converter (ADC) configured to output digital communication signals in a receiving mode to one or more processors, or a digital-to analog converter (DAC) configured to receive digital communication signals in a transmitting mode from the one or more processors; the one or more processors configured to implement one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; an interface configured to couple the one or more processors to one or more radiohead circuit-external processors implementing one or more upper medium-access control (MAC) functions, may further include that the one or more lower medium-access control (MAC) functions are configured to provide a service from the one or more upper medium-access control (MAC) functions in the receiving mode and may further include that the one or more lower medium-access control (MAC) functions are configured to receive a service from the one or more upper medium-access control (MAC) functions in the transmitting mode.

In example 2D, the subject matter of example 1D, may further include that the service includes to encapsulate a MAC Service Data Unit (MSDU) to be transmitted to the one or more physical layer (PHY) functions. In example 3D, the subject matter of any one of examples 1D or 2D, may further include that the service includes to decapsulate a MAC Protocol Data Unit (MPDU) received from the one or more physical layer (PHY) functions.

In example 4D, the subject matter of any one of examples 1D to 3D; may further include that the one or more processors are further configured to transmit a service message to the one or more radiohead circuit-external processors implementing the one or more upper medium-access control (MAC) functions to indicate the provision or the request of the service. In example 5D, the subject matter of example 4D, may further include that the interface is configured to get into a low power mode; and may further include that the one or more processors are further configured to transmit a wake-up signal to the interface to wake the interface up from the low power mode before transmitting the service message.

In example 6D, the subject matter of example 5D, may further include that the one or more processors are further configured to place the interface into the low power mode.

In example 7D, the subject matter of any one of examples 4D to 6D; may further include that the service message includes a wake-up signal configured to wake up the one or more upper medium-access control (MAC) functions.

In example 8D, the subject matter of any one of examples 5D to 7D may further include that the one or more processors are further configured to transmit the wake-up signal based on a wake-up condition. In example 9D, the subject matter of clam 8D, may further include that the wake-up condition includes to transmit the wake-up signals at a predetermined temporal periodicity. In example 10D, the subject matter of any one of examples 8D or 9D, may further include that the one or more processors are further configured to receive the wake-up condition from the one or more radiohead circuit external processors.

In example 11D, the subject matter of any one of examples 1D to 10D, further including: a memory configured to store a digital communication signal which is related to the service. In example 12D, the subject matter of any one of examples 1D to 10D, further including: a memory configured to store the at least one of the data received from the one or more physical layer (PHY) functions in the receiving mode, or the data to be transmitted to the one or more physical layer (PHY) functions in the transmitting mode.

In example 13D, the subject matter of any one of examples 11D or 12D, may further include that the one or more processors are configured to provide access to the memory using the interface for the one or more radiohead circuit external processors. In example 14D, the subject matter of any one of examples 11D or 12D, may further include that the one or more processors are configured to transmit information stored in the memory using the interface to the one or more radiohead circuit external processors.

In example 15D, the subject matter of any one of examples 1D to 14D, may further include that the one or more processors are configured to receive a medium-access control (MAC) configuration data to configure the lower medium-access control (MAC) functions from the one or more radiohead circuit external processors. In example 16D, the subject matter of any one of examples 1D to 15D, may further include that the interface includes a high-throughput Serial Time Encoded Protocol (STEP) interface.

In example 17D, the subject matter of any one of examples 1D to 16D, may further include that the lower medium access control (MAC) functions include Cyclic Redundancy Check (CRC) functions, header checking functions, encryption/decryption functions, RF interfacing functions, scanning functions, Medium-Access Control (MAC) filtering functions, In example 18D, the subject matter of any one of examples 1D to 17D, may further include that the upper medium access control (MAC) functions include encapsulating and decapsulating data packets, priority handling functions, authentication functions, scheduling functions, coordination functions, power management functions, addressing functions.

In example 19D, A communication device including: the subject matter of any one of examples 1 to 18; the one or more radiohead circuit external processors implementing the one or more upper medium-access control (MAC) functions. In example 20D, the communication device of example 19D, may further include that the one or more radiohead circuit external processors are configured to place the upper medium-access control (MAC) functions into a low power mode, and wake the upper medium-access control (MAC) functions from the low power mode based on a received wake-up signal.

In example 21D the subject matter includes a computer-readable medium including instructions stored thereon, that if executed by one or more processors, cause a radiohead circuit to: receive and/or transmit wireless communication signals; output digital communication signals in a receiving mode to the one or more processors, or to receive digital communication signals in a transmitting mode from the one or more processors; implement one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; couple the one or more processors with an interface to one or more radiohead circuit-external processors implementing one or more upper medium-access control (MAC) functions, may further include that the one or more lower medium-access control (MAC) functions are configured to provide a service from the one or more upper medium-access control (MAC) functions in the receiving mode and may further include that the one or more lower medium-access control (MAC) functions are configured to receive a service from the one or more upper medium-access control (MAC) functions in the transmitting mode.

In example 22D, the subject matter of example 21D, may further include that the service includes to encapsulate a MAC Service Data Unit (MSDU) to be transmitted to the one or more physical layer (PHY) functions. In example 23D, the subject matter of any one of examples 21D or 22D, may further include that the service includes to decapsulate a MAC Protocol Data Unit (MPDU) received from the one or more physical layer (PHY) functions. In example 24D, the subject matter of any one of examples 21D to 23D, may further include that the instructions further include to transmit a service message to the one or more radiohead circuit-external processors implementing the one or more upper medium-access control (MAC) functions to indicate the provision or the request of the service.

In example 25D, the subject matter of example 24D, may further include that the instructions further include to transmit a wake-up signal to the interface to wake the interface up from the low power mode before transmitting the service message. In example 26D, the subject matter of example 25D, may further include that the instructions further include to place the interface into the low power mode.

In example 27D, the subject matter of any one of examples 24D to 2426 may further include that the service message includes a wake-up signal configured to wake up the one or more upper medium-access control (MAC) functions. In example 28D, the subject matter of any one of examples 25D to 27D, may further include that the instructions further include to transmit the wake-up signal based on a wake-up condition.

In example 29D, the subject matter of example 28D, may further include that the instructions further include to receive the wake-up condition from the one or more radiohead circuit external processors. In example 30D, the subject matter of any one of examples 21D to 29D, may further include that the instructions further include to store a digital communication signal which is related to the service. In example 31D, the subject matter of any one of examples 21D to 29D, may further include that the instructions further include to store the at least one of the data received from the one or more physical layer (PHY) functions in the receiving mode, or the data to be transmitted to the one or more physical layer (PHY) functions in the transmitting mode.

In example 32D, the subject matter of any one of examples 30D or 31D, may further include that the instructions further include to provide access to the memory using the interface for the one or more radiohead circuit external processors. In example 33D, the subject matter of any one of examples 28D or 29D, may further include that the instructions further include to transmit information stored in the memory using the interface to the one or more radiohead circuit external processors.

In example 34D, the subject matter of any one of examples 21D to 33D, may further include that the instructions further include to receive a medium-access control (MAC) configuration data to configure the lower medium-access control (MAC) functions from the one or more radiohead circuit external processors. In example 35D, the subject matter of any one of examples 21D to 34D, may further include that the interface includes a high-throughput Serial Time Encoded Protocol (STEP) interface.

In example 36D, the subject matter includes a computer-readable medium including instructions stored thereon, that if executed by one or more processors, cause a communication device to: receive and/or transmit wireless communication signals; output digital communication signals in a receiving mode to the one or more processors, or to receive digital communication signals in a transmitting mode from the one or more processors; implement one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; couple the one or more processors with an interface to one or more radiohead circuit-external processors implementing one or more upper medium-access control (MAC) functions, may further include that the one or more lower medium-access control (MAC) functions are configured to provide a service from the one or more upper medium-access control (MAC) functions in the receiving mode and may further include that the one or more lower medium-access control (MAC) functions are configured to receive a service from the one or more upper medium-access control (MAC) functions in the transmitting mode.

In example 37D, the subject matter of example 36D, may further include that the instructions further include to place the upper medium-access control (MAC) functions into a low power mode, and wake the upper medium-access control (MAC) functions from the low power mode based on a received wake-up signal.

In example 38D, The subject matter includes a method of receiving and/or transmitting wireless communication signals, including: outputting digital communication signals in a receiving mode to one or more processors, or receiving digital communication signals in a transmitting mode from the one or more processors; implementing one or more physical layer (PHY) functions and one or more lower medium-access control (MAC) functions, the one or more lower medium-access control (MAC) functions configured to receive a data from the one or more physical layer (PHY) functions in the receiving mode, or the one or more lower medium-access control functions (MAC) configured to transmit a data to the one or more physical layer (PHY) functions in the transmitting mode; coupling the one or more processors with an interface to one or more radiohead circuit-external processors implementing one or more upper medium-access control (MAC) functions, may further include that the one or more lower medium-access control (MAC) functions are configured to provide a service from the one or more upper medium-access control (MAC) functions in the receiving mode and may further include that the one or more lower medium-access control (MAC) functions are configured to receive a service from the one or more upper medium-access control (MAC) functions in the transmitting mode.

In example 39D, a radiohead circuit including: an antenna connection means and a radio frequency (RF) front end means for receiving and/or transmitting wireless communication signals; a signal converting means including at least one of an analog-digital converter (ADC) for outputting digital communication signals in a receiving mode to one or more processors, or a digital-to analog converter (DAC) for receiving digital communication signals in a transmitting mode from the one or more processors; the one or more processing means for implementing one or more physical layer (PHY) functions and one or more lower medium-access control (MAC) functions, the one or more lower medium-access control (MAC) functions are configured to receive a data from the one or more physical layer (PHY) functions in the receiving mode, or the one or more lower medium-access control functions (MAC) are configured to transmit a data to the one or more physical layer (PHY) functions in the transmitting mode; an interface means for coupling the one or more processors to one or more radiohead circuit-external processors implementing one or more upper medium-access control (MAC) functions, may further include that the one or more lower medium-access control (MAC) functions are configured to provide a service from the one or more upper medium-access control (MAC) functions in the receiving mode and may further include that the one or more lower medium-access control (MAC) functions are configured to receive a service from the one or more upper medium-access control (MAC) functions in the transmitting mode.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired (e.g., target) behavior are corrected. Further illustratively, the term calibration may describe a process in which the operation of a device or of one of its components is aligned with a predefined or desired (e.g., target) operation of the device or of the component. By way of example, a calibration may describe a process in which nonlinearities are eliminated and/or in which mismatches are eliminated. In some aspects, a calibration may be understood as the process through which transmission (TX) and/or reception (RX) parameters and/or circuitry may be tuned to optimize TX power and signal integrity (e.g., EVM) and RX signal quality (e.g., RSSI, or signal-to-interference-plus-noise-ratio SINR).

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device comprising:
   a communication device processor; and
   a plurality of radiohead circuits comprising a first radiohead circuit and a second radiohead circuit, wherein each of the radiohead circuits comprises:
      a radio frequency front end configured to receive a wireless signal via an antenna interface; and
      a processor configured to:
         perform an initial signal detection to determine whether an autocorrelation of the wireless signal with a predefined preamble of a wireless communication signal of interest to the communication device fulfills a predefined radiohead circuit detection criterion comprising a degree of the autocorrelation;
         generate based on the initial signal detection an initial signal detection information comprising the autocorrelation of the wireless signal with the predefined preamble of the wireless communication signal of interest; and
         provide the initial signal detection information to a communication interface for a final signal detection, wherein the communication interface is configured to couple the processor of the radiohead circuit to the communication device processor,
   wherein the communication device processor is configured to:
      receive a first initial signal detection information comprising the initial signal detection information of the first radiohead circuit and a second initial signal detection information comprising the initial signal detection information of the second radiohead circuit; and
      perform the final signal detection based on the first initial signal detection information of the first radiohead circuit and the second initial signal detection information of the second radiohead circuit, wherein the final signal detection determines whether the wireless signal comprises the wireless communication signal of interest to the communication device.

2. The communication device of claim 1, wherein the communication device processor is configured to send an initial signal detection information request signal to the first radiohead circuit, in case the communication device processor receives the second initial signal detection information, and/or send an initial signal detection information request signal to the second radiohead circuit, in case the communication device processor receives the second initial signal detection information.

3. The communication device of claim 1,
wherein the communication device processor is further configured to determine the final signal detection based on a ratio of a sum of the autocorrelation of the first initial signal detection information and the autocorrelation of the second initial signal detection information, over a sum of a signal strength of the first initial signal detection information and a signal strength of the second initial signal detection information,
wherein the communication device processor is further configured to determine the final signal detection based on whether the ratio is above a predefined final detection threshold.

4. The communication device of claim 1, wherein the communication device processor is configured to send a first wake up indication to the communication interface of the first radiohead circuit to wake up the communication interface of the first radiohead circuit from a low power mode, and/or to send a second wake up indication to the communication interface of the second radiohead circuit to wake up the communication interface of the second radiohead circuit.

5. A non-transitory computer-readable medium comprising instructions stored thereon, that if executed by a processor, cause the processor to:
perform an initial signal detection to determine whether an autocorrelation of a predefined preamble of a wireless communication signal of interest with a wireless signal received at a first radio frequency front end fulfills a predefined radiohead circuit detection criterion comprising a extent of the autocorrelation;
perform a second initial signal detection to determine whether a second autocorrelation of the predefined preamble of the wireless communication signal of interest with the wireless signal received at a second radio frequency front end fulfills the predefined radiohead circuit detection criterion;
generate based on the initial signal detection an initial signal detection information comprising the autocorrelation;
generate based on the second initial signal detection a second initial signal detection information comprising the second autocorrelation; and
provide the initial signal detection information and the second initial signal detection information to a communication interface for a final signal detection, wherein the final signal detection determines, based on the initial signal detection information and the second initial signal detection information, whether the wireless signal comprises the wireless communication signal of interest.

6. The non-transitory computer-readable medium of claim 5,
wherein the instructions are further configured to cause the processor to calculate a signal strength of the wireless signal received at the first radio frequency front end and at the second radio frequency front end, wherein the final signal detection is further based on the signal strengths.

7. The non-transitory computer-readable medium of claim 6,
wherein the final signal detection is further based on a mathematical function that relates the autocorrelation, the second autocorrelation, and the signal strength.

8. The non-transitory computer-readable medium of claim 6,
wherein final signal detection is further based on a ratio of a sum of the autocorrelation and the second autocorrelation to the signal strength.

9. The non-transitory computer-readable medium of claim 5,
wherein the instructions are further configured to cause the processor not to generate the initial signal detection information if the initial signal detection determines that the autocorrelation fails to fulfill the predefined circuit detection criterion and/or not to provide the initial signal detection information if the initial signal detection determines that the autocorrelation fails to fulfill predefined radiohead circuit detection criterion.

10. The non-transitory computer-readable medium of claim 5,
wherein the instructions are further configured to cause the processor to send an indication to the communication interface to wake up from a low power mode in which the communication interface is configured to operate.

11. A communication device comprising:
a communication device processor; and
a plurality of radiohead circuits comprising a first radiohead circuit and a second radiohead circuit, wherein each of the radiohead circuits comprises:
a radio frequency front end configured to receive a wireless signal via an antenna interface; and
a processor configured to:
perform an initial signal detection to detect if a wireless communication signal has been received based on whether a signal the processor received from the radio frequency front end fulfills a predefined radiohead circuit detection criterion;
generate an initial signal detection information comprising an information as to whether the wireless communication signal has been received based on the initial signal detection; and
provide the initial signal detection information to a communication interface for a final signal detection, wherein the communication interface is configured to couple the processor of the radiohead circuit to the communication device processor,
wherein the communication device processor is configured to:
receive a first initial signal detection information comprising the initial signal detection information of the first radiohead circuit and a second initial signal detection information comprising the initial signal detection information of the second radiohead circuit; and
perform the final signal detection based on the first initial signal detection information of the first radiohead circuit and the second initial signal detection information of the second radiohead circuit, wherein the communication device processor is further configured to determine the final signal detection based on a ratio of a sum of an autocorrelation of the first initial signal detection information and an autocorrelation of the second initial signal detection information, over a sum of a signal strength of the first initial signal detection information and a signal strength of the second initial signal detection information, wherein the communication device processor is further configured to determine the final signal detection based on whether the ratio is above a predefined final detection threshold.

* * * * *